US008388829B2

(12) United States Patent  
Hallen et al.

(10) Patent No.: US 8,388,829 B2  
(45) Date of Patent: Mar. 5, 2013

(54) DEOXYGENATION OF FATTY ACIDS FOR PREPARATION OF HYDROCARBONS

(75) Inventors: Richard T. Hallen, Richland, WA (US); Karl O. Albrecht, Richland, WA (US); Heather M. Brown, Kennewick, WA (US); James F. White, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/620,268

(22) Filed: Sep. 14, 2012

(65) Prior Publication Data

US 2013/0008080 A1 Jan. 10, 2013

Related U.S. Application Data

(62) Division of application No. 12/848,887, filed on Aug. 2, 2010.

(51) Int. Cl.
*C10M 101/00* (2006.01)
*C10M 177/00* (2006.01)
*C10G 71/00* (2006.01)

(52) U.S. Cl. ............. 208/18; 208/63; 585/734; 585/737

(58) Field of Classification Search .................. 585/734, 585/737
See application file for complete search history.

(56) References Cited

U.S. PATENT DOCUMENTS

| 1,953,232 A | 4/1934 | Jaeger |
| 1,964,516 A | 6/1934 | Jaeger |
| 2,816,905 A | 12/1957 | Gilbert et al. |
| 2,816,906 A | 12/1957 | Gilbert et al. |
| 2,902,512 A | 9/1959 | Verheyden et al. |
| 3,391,191 A | 7/1968 | Velde |
| 3,476,803 A | 11/1969 | Pine |
| 3,530,198 A | 9/1970 | Fenton |
| 3,632,822 A | 1/1972 | Conroy |
| 3,660,491 A | 5/1972 | Thigpen et al. |
| 3,732,263 A | 5/1973 | Berman |
| 3,856,876 A | 12/1974 | Burnett |
| 3,962,035 A | 6/1976 | Antos |
| 4,102,938 A | 7/1978 | Rao |
| 4,262,157 A | 4/1981 | Hori et al. |
| 4,303,486 A | 12/1981 | Bard et al. |
| 4,320,241 A | 3/1982 | Frankiewicz |
| 4,554,397 A | 11/1985 | Stern et al. |
| 4,950,763 A | 8/1990 | Schommer et al. |
| 4,992,605 A | 2/1991 | Craig et al. |
| 5,077,447 A | 12/1991 | Miller et al. |
| 5,228,982 A | 7/1993 | Scouten et al. |
| 5,233,109 A | 8/1993 | Chow |
| 5,290,325 A | 3/1994 | Kanne et al. |
| 5,344,975 A | 9/1994 | Zeiler |
| 5,364,949 A | 11/1994 | Neuss et al. |
| 5,412,120 A | 5/1995 | Fischer et al. |
| 5,422,327 A | 6/1995 | Soled et al. |
| 6,187,903 B1 | 2/2001 | Elsasser et al. |
| 6,864,398 B2 | 3/2005 | O'Rear |
| 6,946,567 B2 | 9/2005 | Zhang et al. |
| 7,001,964 B2 | 2/2006 | Small |
| 7,002,044 B2 | 2/2006 | Erkey et al. |
| 7,229,481 B2 | 6/2007 | Clark et al. |
| 7,459,597 B2 | 12/2008 | Koivusalmi et al. |
| 7,491,858 B2 | 2/2009 | Murzin et al. |
| 7,511,181 B2 | 3/2009 | Petri et al. |
| 7,967,973 B2 * | 6/2011 | Myllyoja et al. ................ 208/64 |
| 2004/0006912 A1 | 1/2004 | Krull |
| 2004/0074760 A1 | 4/2004 | Portnoff et al. |
| 2005/0272941 A1 | 12/2005 | Zhang et al. |
| 2006/0016723 A1 | 1/2006 | Tang et al. |
| 2006/0161032 A1 | 7/2006 | Murzin et al. |
| 2006/0207166 A1 | 9/2006 | Herskowitz et al. |
| 2006/0264684 A1 | 11/2006 | Petri et al. |
| 2007/0010682 A1 | 1/2007 | Myllyoja et al. |
| 2007/0100166 A1 | 5/2007 | Beavers et al. |
| 2007/0131579 A1 | 6/2007 | Koivusalmi et al. |
| 2007/0135669 A1 | 6/2007 | Koivusalmi et al. |
| 2007/0244343 A1 | 10/2007 | Brevoord et al. |

(Continued)

FOREIGN PATENT DOCUMENTS

| CA | 1201080 | 2/1986 |
| EP | 0478075 | 4/1992 |

(Continued)

OTHER PUBLICATIONS

Ai, M., "Activities for the decomposition of formic acid and the acid-base properties of metal oxide catalysts," *Journal of Catalysis*, 50, (2), 291-300, 1977.

Ai, M., "The activity of WO$_3$-based mixed-oxide catalysts: I. Acidic properties of WO$_3$-based catalysts and correlation with catalytic activity," *Journal of Catalysis*, 49, (3), 305-312, 1977.

Ai, M., "The oxidation activity and acid-base properties of SnO$_2$-based binary catalysts : I. The SnO$_2$—V$_2$O$_5$ system," *Journal of Catalysis*, 40, (3), 318-326, 1975.

Ai, M.; Ikawa, T., The acid-base properties of MoO$_3$—Bi$_2$O$_3$—P$_2$O$_5$ catalysts and their correlation with catalytic activity and selectivity. *Journal of Catalysis*, 40, (2), 203-211, 1975.

Ai, M.; Suzuki, S., "Oxidation activity and acidity of MoO$_3$—P$_2$O$_5$ catalysts," *Journal of Catalysis*, 30, (3), 362-371, 1973.

(Continued)

*Primary Examiner* — Shawquia Young
(74) *Attorney, Agent, or Firm* — Klarquist Sparkman, LLP

(57) ABSTRACT

Embodiments of methods for making renewable diesel by deoxygenating (decarboxylating/decarbonylating/dehydrating) fatty acids to produce hydrocarbons are disclosed. Fatty acids are exposed to a catalyst selected from a) Pt and MO$_3$ on ZrO$_2$ (M is W, Mo, or a combination thereof), or b) Pt/Ge or Pt/Sn on carbon, and the catalyst decarboxylates at least 10% of the fatty acids. In particular embodiments, the catalyst consists essentially of 0.7 wt % Pt and 12 wt % WO$_3$, relative to a mass of catalyst, or the catalyst consists essentially of a) 5 wt % Pt and b) 0.5 wt % Ge or 0.5 wt % Sn, relative to a mass of catalyst. Deoxygenation is performed without added hydrogen and at less than 100 psi. Disclosed embodiments of the catalysts deoxygenate at least 10% of fatty acids in a fatty acid feed, and remain capable of deoxygenating fatty acids for at least 200 minutes to more than 350 hours.

16 Claims, 31 Drawing Sheets

U.S. PATENT DOCUMENTS

| | | | |
|---|---|---|---|
| 2007/0281875 | A1 | 12/2007 | Scheibel et al. |
| 2008/0034645 | A1 | 2/2008 | Bressler |
| 2008/0071125 | A1 | 3/2008 | Li |
| 2008/0177114 | A1 | 7/2008 | Goossen et al. |
| 2008/0216391 | A1 | 9/2008 | Cortright et al. |
| 2008/0308457 | A1 | 12/2008 | Dindi et al. |
| 2008/0308458 | A1 | 12/2008 | Dindi et al. |
| 2008/0312346 | A1 | 12/2008 | McCall et al. |
| 2008/0312479 | A1 | 12/2008 | McCall et al. |
| 2008/0312480 | A1 | 12/2008 | Dindi et al. |
| 2009/0031617 | A1 | 2/2009 | O'Rear |
| 2009/0041646 | A1 | 2/2009 | Ikeda et al. |
| 2009/0062578 | A1 | 3/2009 | Koivusalmi et al. |
| 2009/0069610 | A1 | 3/2009 | Roberts, IV et al. |
| 2009/0077867 | A1 | 3/2009 | Marker et al. |
| 2009/0077868 | A1 | 3/2009 | Brady et al. |
| 2009/0247799 | A1 | 10/2009 | Myllyoja et al. |
| 2009/0283442 | A1 | 11/2009 | McCall et al. |
| 2010/0076233 | A1 | 3/2010 | Cortright et al. |
| 2010/0113848 | A1 | 5/2010 | Strege et al. |
| 2010/0137663 | A1 | 6/2010 | Chen et al. |
| 2010/0145117 | A1 | 6/2010 | Seames et al. |
| 2010/0151535 | A1 | 6/2010 | Franklin et al. |

FOREIGN PATENT DOCUMENTS

| | | |
|---|---|---|
| EP | 1489157 | 12/2004 |
| EP | 1681337 | 7/2006 |
| EP | 1741767 | 1/2007 |
| EP | 1741768 | 1/2007 |
| EP | 1911735 | 4/2008 |
| GB | 1074265 | 7/1967 |
| GB | 1524781 | 9/1978 |
| GB | 2039943 | 8/1980 |
| WO | WO 03/082464 | 10/2003 |
| WO | WO 2006/075057 | 7/2006 |
| WO | WO 2007/003708 | 1/2007 |
| WO | WO 2007/068795 | 6/2007 |
| WO | WO 2007/068798 | 6/2007 |
| WO | WO 2007/068799 | 6/2007 |
| WO | WO 2007/068800 | 6/2007 |
| WO | WO 2007/107337 | 9/2007 |
| WO | WO 2007/136873 | 11/2007 |
| WO | WO 2008/029301 | 3/2008 |
| WO | WO 2008/040973 | 4/2008 |
| WO | WO 2008/103204 | 8/2008 |
| WO | WO 2008/138861 | 11/2008 |
| WO | WO 2008/157165 | 12/2008 |
| WO | WO 2008/157465 | 12/2008 |
| WO | WO 2009/008893 | 1/2009 |
| WO | WO 2009/011160 | 1/2009 |
| WO | WO 2009/011639 | 1/2009 |
| WO | WO 2009/025635 | 2/2009 |
| WO | WO 2009/025663 | 2/2009 |
| WO | WO 2009/035689 | 3/2009 |
| WO | WO2010/032748 | 3/2010 |
| WO | WO 2010/043765 | 4/2010 |
| WO | WO2010/068904 | 6/2010 |

OTHER PUBLICATIONS

Aizenshtat, Z.; Miloslavsky, I.; Heller-Kallai, L., "The effect of montmorillonite on the thermal decomposition of fatty acids under "bulk flow" conditions," *Organic Geochemistry* 7, (1), 85-90, 1984.

Alencar, J. W.; Alves, P. B.; Craveiro, A. A., "Pyrolysis of tropical vegetable oils," *Journal of Agricultural and Food Chemistry*, 31, (6), 1268-1270, 1983.

Almon, W. R.; Johns, W. D., "Petroleum forming reactions: clay catalyzed fatty acid decarboxylation," *Proc. Int. Clay Conf.*, 399-409, 1975.

Almon, W. R.; Johns, W. D., "Petroleum forming reactions: the mechanism and rate of clay catalyzed fatty acid decarboxylation," *Adv. Org. Geochem., Proc. Int. Meet*, 7th, 157-71, 1977.

Araujo, L. R. R. d.; Scofield, C. F.; Pastura, N. M. R.; Gonzalez, W. d. A., "$H_3PO_4/Al_2O_3$ catalysts: characterization and catalytic evaluation of oleic acid conversion to biofuels and biolubricant," *Materials Research*, 9, (2),181-184, 2006.

Bacha, J. D.; Kochi, J. K., "Alkenes from acids by oxidative decarboxylation," *Tetrahedron*, 24, (5), 2215-2226, 1968.

Bernas, A.; Kumar, N.; Maki-Arvela, P.; Kul'kova, N. V.; Holmbom, B.; Salmi, T.; Murzin, D. Y., "Isomerization of linoleic acid over supported metal catalysts," *Applied Catalysis A: General*, 245, (2), 257-275, 2003.

Besson, M.; Gallezot, P., "Selective oxidation of alcohols and aldehydes on metal catalysts," *Catalysis Today*, 57, (1-2), 127-141, 2000.

Billaud, F.; Dominguez, V.; Broutin, P.; Busson, C, "Production of Hydrocarbons by Pyrolysis of Methyl Esters from Rapeseed Oil," *Journal of the American Oil Chemists Society*, 72, (10), 11491154, 1995.

Boocock, D. G. B.; Konar, S. K.; Glaser, G., "The Formation of Petrodiesel by the Pyrolysis of Fatty Acid Methyl Esters over Activated Alumina," *Progress in Thermochemical Biomass Conversion*, Bridgwater, A. V., Ed. Blackwell Publishing, 1517-1524, 2001.

Centeno, A.; Laurent, E.; Delmon, B., "Influence of the Support of CoMo Sulfide Catalysts and of the Addition of Potassium and Platinum on the Catalytic Performances for the Hydrodeoxygenation of Carbonyl, Carboxyl, and Guaiacol-Type Molecules," *Journal of Catalysis*, 154, (2), 288-298, 1995.

Corma, A.; Renz, M.; Schaverien, C, "Coupling Fatty Acids by Ketonic Decarboxylation Using Solid Catalysts for the Direct Production of Diesel, Lubricants, and Chemicals," *ChemSusChem*,1, (8-9), 739-741, 2008.

de Lange et al. "Deoxygenation of benzoic acid on metal oxides: 1. The selective pathway to benzaldehyde," *Applied Catalysis A: General*, 220 (1-2), 41-49, 2001.

Dooley et al., "Ketones from acid condensation using supported $CeO_2$ catalysts: Effect of additives," *Applied Catalysis A: General*, 320,122-133, 2007.

Dos Anjos et al., "Catalytic decomposition of vegetable oil," *Applied Catalysis*, 5, (3), 299-308, 1983.

Dury et al., "The deoxygenation of benzoic acid as a probe reaction to determine the impact of superficial oxygen vacancies (isolated or twin) on the oxidation performances of Mo-based oxide catalysts" *Catalysis Today*, 117, 46-52, 2006.

Dury et al., "The influence of the hydrogen origin at the surface of Mo suboxide during the deoxygenation of carboxylic acid," *Catalysis Today*, 112, (1-4), 130-133, 2006.

Dury et al., "Probing the reduction state of Mo oxide catalysts by the deoxygenation of carboxylic acid," *Catalysis Today*, 91-92, 111-116, 2004.

Ferrari et al., "Influences of the hydrogen sulfide partial pressure and of a nitrogen compound on the hydrodeoxygenation activity of a CoMo/carbon catalyst," *Journal of Catalysis*, 198, (1), 47-55, 2001.

Foglia et al., "Decarbonylation Dehydration of Fatty Acids to Alkenes in the Presence of Transition Metal Complexes," *Journal of the American Oil Chemists' Society*, 53 (12), 713-782, 1976.

Fu et al., "Catalytic hydrothermal deoxygenation of palmitic acid," *Energy and Environmental Science*, 3 (3), 311-317, 2010.

Fu et al., "Catalytic decarboxylation of petroleum acids from high acid crude oils over solid acid catalysts," *Energy & Fuels*, 22, (3), 1923-1929, 2008.

Glinski et al., "Decarboxylative coupling of heptanoic acid. Manganese, cerium and zirconium oxides as catalysts."*Applied Catalysis A: General*, 190, (1-2), 87-91, 2000.

Glinski et al., "Ketones from monocarboxylic acids: Catalytic ketonization over oxide systems," *Applied Catalysis A: General*, 128, (2), 209-217, 1995.

Heynen et al., "The Catalytic Dimerization of Oleic Acid in a Continuous Flow Reactor," *Fette, Seifen, Anstrichmittel*, (12), 677-681, 1972.

Hrachová et al., "The effect of mechanical treatment on the structure of montmorillonite," *Materials Letters*, 61, (16), 3361-3365, 2007.

Idem et al., "Catalytic conversion of canola oil to fuels and chemicals: Roles of catalyst acidity, basicity and shape selectivity on product distribution," *Fuel Processing Technology*, 51, (1-2), 101-125, 1997.

Johns, "Clay Mineral Catalysis and Petroleum Generation," *Annual Review of Earth and Planetary Sciences*, 7, (1), 183-198, 1979.

Kalnes et al., "Green diesel: a second generation biofuel," *International Journal of Chemical Reactor Engineering*, 5, 10 pp., 2007.

Katikaneni et al, "Studies on the Catalytic Conversion of Canola Oil to Hydrocarbons: Influence of Hybrid Catalysts and Steam," *Energy & Fuels*, 9, (4), 599-609, 1995.
Khurshid et al., "Effects of Hydrogen on Heptane Isomerization Over Zirconium Oxide Modified with Tungsten Oxide and Platinum," *Applied Catalysis A: General 362*, pp. 75-81; 2009.
Knothe, "Biodiesel and renewable diesel: A comparison," *Progress in Energy and Combustion Science*, 26, 364-373, 2010.
Knothe et al., "*Biodiesel: The Use of Vegetable Oils and Their Derivatives as Alternative Diesel Fuels*," Fuels and Chemicals from Biomass, *ACS Symposium Series*, vol. 666, 172-208, 1997.
Konar et al., "Fuels and chemicals from sewage sludge: 3. Hydrocarbon liquids from the catalytic pyrolysis of sewage sludge lipids over activated alumina," *Fuel*, 73, (5), 642-646, 1994.
Koster et al., "Active sites in the clay catalysed dimerisation of oleic acid," *Journal of Molecular Catalysis A: Chemical*, 134, 159-169, 1998.
Kroumova et al., "Application of Improved Methods to Assess Pathways for Biosynthesis of Long- and Very-Long-Chain Fatty Acids," *Journal of Agricultural and Food Chemistry*, 45, (12), 4701-4705, 1997.
Kubicka et al., "Transformation of Vegetable Oils into Hydrocarbons over Mesoporous-Alumina-Supported CoMo Catalysts," *Topics in Catalysis*, 52, (1), 161-168, 2009.
Kubickova et al., "Hydrocarbons for diesel fuel via decarboxylation of vegetable oils," *Catalysis Today*, 106, 197-200, 2005.
Kumar et al., "Electroorganic synthesis: A novel route of green synthesis," *Journal of the Indian Chemical Society*, 86 (11), 1129-1142, 2009.
Kwak, "Applications of Heterogeneous Catalytic Processes to the Environmentally Friendly Synthesis of Fine Chemicals," *Catalysis Surveys from Asia*, 9, (2), 103-116, 2005.
Lashdaf et al., "Platinum catalysts on alumina and silica prepared by gas-and liquid-phase deposition in cinnamaldehyde hydrogenation," *Applied Catalysis A: General*, 276, (1-2), 129-137, 2004.
Laurent et al., "Study of the Hydrodeoxygenation of Carbonyl, Carboxylic and Guaiacyl Groups Over Sulfided CoMo/Gamma-$Al_2O_3$ and NiMo/Gamma-$Al_2O_3$ Catalysts .I. Catalytic Reaction Schemes," *Applied Catalysis A: General*, 109, (1), 77-96, 1994.
Laurent, "Study of the Hydrodeoxygenation of Carbonyl, Carboxylic and Guaiacyl Groups Over Sulfided CoMo/Gamma-$Al_2O_3$ and NiMo/Gamma-$Al_2O_3$ Catalyst .II. Influence of Water, Ammonia and Hydrogen-Sulfide," *Applied Catalysis A: General*, 109, (1), 97-115, 1994.
Lee et al., "Decarbonylation of methyl formate over heterogeneous catalysts," *Applied Catalysis A: General*, 83, 165-178, 1992.
Lestari et al., "Transforming Triglycerides and Fatty Acids into Biofuels," *ChemSusChem*, 2, (12), 1109-1119, 2009.
Lestari et al., "Catalytic Deoxygenation of Stearic Acid and Palmitic Acid in Semibatch Mode," *Catalysis Letters*, 130, (1), 48-51, 2009.
Lestari et al., "Catalytic Deoxygenation of Stearic Acid in a Continuous Reactor over a Mesoporous Carbon-Supported Pd Catalyst," *Energy & Fuels*, 23, (8), 3842-3845, 2009.
Lestari et al., "Synthesis of Biodiesel via Deoxygenation of Stearic Acid over Supported Pd/C Catalyst," *Catalysis Letters*, 122, (34), 247-251, 2008.
Leung et al., "Pathway for the Catalytic Conversion of Carboxylic Acids to Hydrocarbons over Activated Alumina," *Energy & Fuels*, 9, (5), 913-920, 1995.
Levasseur, et al., "Catalytic Wet Air Oxidation of Oleic Acid on Ceria-Supported Platinum Catalyst. Effect of pH," *React. Kinet. Catal. Lett.*, 87, (2), 269-279, 2006.
Li et al., "Catalytic Hydrothermal Conversion of Triglycerides to Non-ester Biofuels," *Energy Fuels*, 24, 1305-1315, 2010.
Li et al., "Catalytic decarboxylations of fatty acids in immature oil source rocks," *Science in China, Series D: Earth Sciences*, 46, (12), 1250-1260, 2003.
Lima et al., "Diesel-like fuel obtained by pyrolysis of vegetable oils," *Journal of Analytical and Applied Pyrolysis*, 71, (2), 987-996, 2004.
Liu et al., "Transition Metal-Catalyzed Nonoxidative Decarboxylation Reactions," *Biochemistry*, 45, (35), 10407-10411, 2006.

Maher et al., "Pyrolytic Decarboxylation and Cracking of Stearic Acid," *Industrial & Engineering Chemistry Research*, 47, (15), 5328-5336, 2008.
Maier et al., "Hydrogenolysis Gas-Phase Decarboxylation of Carboxylic-Acids," *Chemische Berichte-Recueil*, 115, (2), 808-812, 1982.
Maki-Arvela et al., "Catalytic deoxygenation of fatty acids and their derivatives," *Energy & Fuels*, 21, (1), 30-41, 2007.
Maki-Arvela et al., "Continuous decarboxylation of lauric acid over Pd/C catalyst," *Fuel*, 87, (17-18), 3543-3549, 2008.
Matsubara et al., "Palladium-catalyzed decarboxylation and decarbonylation under hydrothermal conditions: decarboxylative deuteration," *Organic Letters*, 6, (12), 2071-2073, 2004.
More et al., "Preliminary Investigations of the Catalytic Deoxygenation of Fatty Acids" *AIChE Annual Meeting*, San Francisco, CA, 2 pp., 2006.
Morgan et al., "Conversion of Triglycerides to Hydrocarbons Over Supported Metal Catalysts," *Topics in Catalysis*, 53, 820-829, 2010.
Na et al., "Hydrocarbon production from decarboxylation of fatty acid without hydrogen," *Catalysis Today*, In Press, Corrected Proof, 5 pp., 2009.
Naidja et al., "Oxidative decarboxylation of isocitric acid in the presence of montmorillonite," *Clay Minerals*, 25, (1), 27-37, 1990.
Nakano et al., "Thermal Alteration of Oleic Acid in the Presence of Clay Catalysts with Co-Catalysts," *Journal of the American Oil Chemists Society*, 62, (5), 888-891, 1985.
Negron-Mendoza et al., "Selective blocking sites in the structure clay-nanometric montmorillonite," *Nanostructured Materials*, 9, (1-8), 209-212, 1997.
Ng et al., "Conversion of Polyethylene to Transportation Fuels through Pyrolysis and Catalytic Cracking," *Energy & Fuels*, 9, (5), 735-742, 1995.
Ooi et al., "Catalytic Conversion of Fatty Acids Mixture to Liquid Fuel and Chemicals over Composite Microporous/Mesoporous Catalysts," *Energy & Fuels*, 19, (3), 736-743, 2005.
Parmon, "Catalytic technologies for energy production and recovery in the future," *Catalysis Today*, 35, (1-2), 153-162, 1997.
Pestman et al., "Reactions of Carboxylic Acids on Oxides: 2. Bimolecular Reaction of Aliphatic Acids to Ketones," *Journal of Catalysis*, 168, (2), 265-272, 1997.
Ping et al., "Highly dispersed palladium nanoparticles on ultra-porous silica mesocellular foam for the catalytic decarboxylation of stearic acid," *Microporous and Mesoporous Materials*, 132, (1-2), 174-180, 2010.
Rajadurai, "Pathways for Carboxylic Acid Decomposition on Transition Metal Oxides," *Catalysis Reviews—Science and Engineering*, 36, (3), 385-403, 1994.
Renz, "Ketonization of Carboxylic Acids by Decarboxylation: Mechanism and Scope," *European Journal of Organic Chemistry*, 2005 (6), 979-988, 2005.
Roberts et al., "Oxidative decarboxylation of retinoic acid in microsomes of rat liver and kidney." *J. Lipid Res.*, 9, (4), 501-508, 1968.
Sakata et al., "Reduction of benzoic acid on $CeO_2$ and, the effect of additives," *Applied Catalysis A: General*, 166, (1), 173-184, 1998.
Sakata et al., "Selectivity Problems in the Catalytic Deoxygenation of Benzoic Acid," *Journal of Catalysis*, 169, (1), 13-21, 1997.
Schwab et al., "Diesel Fuel from Thermal Decomposition of Soybean Oil," *Journal of the American Oil Chemists Society*, 65, (11), 1781-1786, 1988.
Senol et al., "Hydrodeoxygenation of methyl esters on sulphided NiMo/[gamma]-Al203 and CoMo/[gamma]-$Al_2O_3$ catalysts," *Catalysis Today*, 100, (3-4), 331-335, 2005.
Shimoyama et al., "Catalytic conversion of fatty acids to petroleum-like paraffins and their maturation," *Nature (London) Physical Science*, 232, (33), 140-144, 1971.
Simacek et al., "Hydroprocessed rapeseed oil as a source of hydrocarbon-based biodiesel," *Fuel*, 88, (3), 456-460, 2009.
Simakova et al., "Deoxygenation of palmitic and stearic acid over supported Pd catalysts: Effect of metal dispersion," *Applied Catalysis, A: General*, 355, (1-2), 100-108, 2009.

Smith et al., "Catalytic upgrading of tri-glycerides and fatty acids to transport biofuels," *Energy & Environmental Science*, 2, 262-271, 2009.

Snare et al., "Catalytic deoxygenation of unsaturated renewable feedstocks for production of diesel fuel hydrocarbons," *Fuel*, 87, 933-945, 2008.

Snare et al., "Heterogeneous catalytic deoxygenation of stearic acid for production of biodiesel," *Industrial & Engineering Chemistry Research*, 45, (16), 5708-5715, 2006.

Snare et al., "Continuous deoxygenation of ethyl stearate: a model reaction for production of diesel fuel hydrocarbons," *Chemical Industries*, 115, (Catalysis of Organic Reactions), 415-425, 2007.

Snare et al., "Production of diesel fuel from renewable feeds: Kinetics of ethyl stearate decarboxylation," *Chemical Engineering Journal*, 134, (1-3), 29-34, 2007.

Sooknoi et al., "Deoxygenation of methyl esters over CsNaX," *J. Catal.*, 258, (1), 199-209, 2008.

Sugiyama, et al., "Ketones from carboxylic acids over supported magnesium oxide and related catalysts," *Catalysis Letters*, 14, 127-133, 1992.

Takemura et al., "Catalytic decarboxylation of benzoic acid," *Industrial & Engineering Chemistry Product Research and Development*, 24, (2), 213-15, 1985.

Tolvanen, et al., "Thermal and catalytic oligomerisation of fatty acids," *Applied Catalysis A: General*, 330, 1-11, 2007.

Vitolo et al., "Catalytic upgrading of pyrolytic oils over HZSM-5 zeolite: behaviour of the catalyst when used in repeated upgrading—regenerating cycles," *Fuel*, 80, 17-26, 2001.

Vonghia et al., "Pathways for the Deoxygenation of Triglycerides to Aliphatic Hydrocarbons over Activated Alumina," *Energy Fuels*, 9, (6), 1090-1096, 1995.

Vu et al., "Platinum tungstated zirconia isomerization catalysts Part I: characterization of acid and metal properties," *Journal of Catalysis*, 231, 453-467, 2005.

Vu et al., "Platinum tungstated zirconia isomerization catalysts Part II: Effect of platinum and tungsten loading on the mechanism of isomerization of *n*-hexane: a kinetic study," *Journal of Catalysis*, 231, 468-479, 2005.

Watanabe et al., "Decomposition of a long chain saturated fatty acid with some additives in hot compressed water," *Energy Conversion & Management*, 47, 3344-3350, 2006.

Watanabe et al., "Catalytic decarboxylation of acetic acid with zirconia catalyst in supercritical water," *Applied Catalysis A: General*, 219, (1-2), 149-156, 2001.

Yokoyama et al., "Novel direct hydrogenation process of aromatic carboxylic acids to the corresponding aldehydes with zirconia catalyst," *Applied Catalysis A: General*, 88, (2), 149-161, 1992.

Zaher et al., "Thermally Decomposed Cottonseed Oil as a Diesel Engine Fuel," *Energy Sources*, 15, 499-504, 1993.

Zhang et al., "Naphthenic acid removal from crude oil through catalytic decarboxylation on magnesium oxide," *Applied Catalysis, A: General*, 303, (1), 103-109, 2006.

Zhang et al., "Skeletal isomerization of unsaturated fatty acids: the role of mesopores in HBeta zeolites," *Catalysis Letters*, 115, (3-4), 114-121, 2007.

International Search Report and Written Opinion issued in corresponding International Application No. PCT/US11/46152, dated Dec. 19, 2011.

* cited by examiner

DEOXYGENATION OF FATTY ACIDS FOR PREPARATION OF HYDROCARBONS

CROSS REFERENCE TO RELATED APPLICATION

This application is a divisional of U.S. application Ser. No. 12/848,887, filed Aug. 2, 2010, which is incorporated in its entirety herein.

FIELD

Disclosed herein are embodiments of fatty acid deoxygenation (decarboxylation/decarbonylation/dehydration) catalysts and methods of making and using the same.

BACKGROUND

The terms "green diesel" and "renewable diesel" broadly refer to diesel-quality, non-FAME (fatty acid methyl ester) fuels derived from renewable resources (e.g., plant and/or animal sources) that are suitable for direct use in most ordinary compression ignition diesel engines. Renewable diesel is chemically distinguishable from biodiesel, which is primarily composed of fatty-acid-derived mono alkyl esters. The oxygen content of biodiesel is too high to be suitable as a direct replacement for conventional petroleum diesel. In contrast, renewable diesel is substantially oxygen-free and is indistinguishable from petroleum diesel. Thus, renewable diesel can replace petroleum diesel and/or be used in blends with petroleum diesel. Renewable diesel also has higher energy content per volume compared to biodiesel. Renewable diesel may be used or blended in aircraft fuel where oxygen-containing fuels are not allowed.

Conventional processes for converting renewable oils or fats, such as vegetable oil or animal fat, to renewable diesel include catalytic or thermal decarboxylation (removal of carbon dioxide), catalytic decarbonylation (removal of carbon monoxide) and catalytic hydrocracking. The products are expected to be simple hydrocarbons or olefins. The feed for these processes can be a triglyceride or a free fatty acid.

Commercially available deoxygenation catalysts suffer from several disadvantages such as poor stability, low activity, undesirable side reactions, and/or a need to operate under high pressure conditions in the presence of hydrogen gas.

SUMMARY

Embodiments of methods for making renewable fuel (such as renewable gasoline, renewable diesel, or renewable aviation fuel) by deoxygenating fatty acids to produce hydrocarbons are disclosed. Embodiments of highly active, selective catalysts for deoxygenating fatty acids and embodiments of methods for making and using the catalysts also are disclosed. The disclosed catalysts comprise a Group VIII metal, a support material, and a transition metal oxide or a non-transition metal. In particular embodiments, the Group VIII metal is platinum. The support material is carbon, a metal oxide, or a metalloid oxide. In some embodiments, the support is a metal oxide, and the catalyst further includes a transition metal oxide. In other embodiments, the support is carbon, and the catalyst further includes one or more non-transition metals (e.g., Ge, Sn, Pb, Bi).

In certain embodiments, the catalyst is $MO_3/Pt/ZrO_2$ where M is W, Mo, or a combination thereof, Pt/Ge/C, Pt/Sn/C, or a mixture thereof. In some embodiments, the catalyst comprises 0.1 wt % to 1.5 wt % Pt and 6 wt % to 30 wt % $MO_3$ on $ZrO_2$, relative to the total mass of catalyst. In one embodiment, the catalyst comprises 0.7 wt % Pt and 12 wt % $WO_3$ on $ZrO_2$. In another embodiment, the catalyst consists essentially of 0.7 wt % Pt and 12 wt % $WO_3$ on $ZrO_2$. In one embodiment, the catalyst comprises 0.7 wt % Pt and 7.8 wt % $MoO_3$ on $ZrO_2$. In another embodiment, the catalyst consists essentially of 0.7 wt % Pt and 7.8 wt % $MoO_3$ on $ZrO_2$. In other embodiments, the catalyst comprises 1 wt % to 5 wt % Pt and 0.1 wt % to 5 wt % Ge and/or Sn on carbon. In certain embodiments, the catalyst comprises a) 5 wt % Pt and b) 0.5 wt % Ge, 0.5 wt % Sn, or 0.5 wt % of a combination of Ge and Sn, relative to the total mass of the catalyst. In particular embodiments, the catalyst consists essentially of a) 5 wt % Pt and b) either 0.5 wt % Ge or 0.5 wt % Sn on carbon, relative to the total mass of the catalyst.

Embodiments of methods for deoxygenating fatty acids with the disclosed catalysts are also disclosed. In one embodiment, fatty acids are exposed to a catalyst selected from a) Pt and $MO_3$ on $ZrO_2$ where M is W, Mo, or a combination thereof, or b) Pt/Ge or Pt/Sn on carbon, and the catalyst deoxygenates at least 10% of the fatty acids in a fatty acid composition. Some embodiments of the disclosed catalysts deoxygenate at least 80% of the fatty acids.

The fatty acids are obtained from a plant oil, a plant fat, an animal fat, or any combination thereof. In some embodiments, at least 90% of the fatty acids in the fatty acid composition are saturated fatty acids. In certain embodiments, the catalyst comprises 0.1-1.5 wt % Pt and 6-30 wt % $MO_3$ on $ZrO_2$, where M is W, Mo, or a combination thereof, relative to a total mass of the catalyst. In one embodiment, the catalyst consists essentially of 0.7 wt % Pt and 12 wt % $WO_3$ on $ZrO_2$, relative to the total mass of the catalyst. In another embodiment, the catalyst consists essentially of 0.7 wt % Pt and 7.8 wt % $MoO_3$ on $ZrO_2$, relative to the total mass of the catalyst.

In other embodiments, at least some of the fatty acids are unsaturated fatty acids having one or more double and/or triple bonds. In certain embodiments, the catalyst comprises a) 1-5 wt % Pt and b) 0.1-5 wt % Ge, 0.1-5 wt % Sn, or 0.1-5 wt % of a combination of Ge and Sn on carbon, relative to a total mass of the catalyst. In particular embodiments, the catalyst consists essentially of a) 5 wt % Pt and b) 0.5 wt % Ge or 0.5 wt % Sn on carbon, relative to the total mass of the catalyst. In some embodiments, exposing the unsaturated fatty acids to the catalyst results in cyclization and/or aromatization of up to 10% of the fatty acids. In certain embodiments, exposing the unsaturated fatty acids to the catalyst results in isomerization, cracking, alkylation, cyclization and/or aromatization of greater than 10% of the fatty acids.

In some embodiments, the fatty acids in the composition are free fatty acids, fatty acid esters, fatty acid monoglycerides, fatty acid diglycerides, fatty acid triglycerides, or any combination thereof. In certain embodiments, at least 90% of the fatty acids in the fatty acid composition are free fatty acids. The free fatty acids can be obtained, for example, by hydrolyzing triglycerides or fatty acid esters. In some embodiments, triglycerides are hydrolyzed to produce free fatty acids and glycerol. In certain embodiments, the free fatty acids are separated from the glycerol, and the glycerol is recovered. In some embodiments, the fatty acids include unsaturated fatty acids, and the unsaturated fatty acids are hydrogenated before exposure to the catalyst. In particular embodiments, triglycerides comprising unsaturated fatty acids are hydrogenated before hydrolyzing the triglycerides to produce free fatty acids and glycerol.

In certain embodiments, deoxygenation is performed at a temperature of at least 250° C. In one embodiment, the fatty acid composition is preheated to a temperature of at least 50°

C. before exposure to the catalyst. In another embodiment, the composition is not preheated before exposure to the catalyst. In yet another embodiment, the composition is heated in the presence of the catalyst at a temperature of at least 50° C., and deoxygenation is performed subsequently at a temperature of at least 250° C. In another embodiment, the composition is exposed to a first catalyst in a first catalyst bed at a temperature of at least 50° C., and at least 10% of the fatty acids are deoxygenated by subsequently exposing the composition to a second catalyst in a second catalyst bed at a temperature of at least 250° C. The first and second catalysts may have the same or different chemical compositions.

In certain embodiments, the catalyst is disposed within a column, and the composition is flowed through the column. In particular embodiments, deoxygenation is performed without added hydrogen and/or at a pressure of less than 250 psi. In one embodiment, deoxygenation is performed at less than 100 psi. In another embodiment, deoxygenation is performed at ambient pressure. In some embodiments, the fatty acids are flowed through a column at a weight hourly space velocity of 0.1-2.0 $hr^{-1}$ or 0.3-1.0 $hr^{-1}$. A gas may flow concurrently through the column with the composition. In certain embodiments, the gas is an inert gas (e.g., nitrogen or argon), hydrogen, air, or oxygen. In other embodiments, the gas is a mixture of inert gas with hydrogen, air, oxygen, or a combination thereof.

In certain embodiments, at least a portion of the hydrocarbons produced by exposure to the catalyst are unsaturated hydrocarbons, and the unsaturated hydrocarbons are further hydrogenated to produce saturated hydrocarbons. In some embodiments, the hydrocarbons produced by exposure to the catalyst are further fractionated to produce one or more hydrocarbon fractions.

In one embodiment, the hydrocarbons are utilized as a fuel in an engine. In another embodiment, the hydrocarbons are utilized as an aviation fuel. In yet another embodiment, the hydrocarbons are blended with petroleum fuel to produce a blended fuel. In another embodiment, at least a portion of the hydrocarbons are utilized as a reactant in a chemical synthesis reaction.

Some embodiments of the disclosed catalysts, when exposed to a composition comprising fatty acids, remain capable of deoxygenating at least 10% of the fatty acids in the composition for at least 200 minutes at a temperature of 200-500° C. and a WHSV of 0.1-2.0 $hr^{-1}$. Certain embodiments of the catalysts remain capable of deoxygenation for at least 15,000 minutes.

In some embodiments, exposing a composition comprising fatty acids to a catalyst comprising platinum and a non-transition metal on a support dehydrogenates at least 10% of the fatty acids to produce a product comprising branched, cyclic, and/or aromatic compounds. In certain embodiments, the catalyst also deoxygenates at least 10% of the product. In particular embodiments, at least 10% of the fatty acids in the composition are unsaturated fatty acids and transfer hydrogenation occurs.

Embodiments of mixtures suitable for use as a renewable fuel are disclosed. The mixtures are primarily comprised of hydrocarbons produced by fatty acid deoxygenation, primarily via decarboxylation. In some embodiments, the mixtures comprise greater than 70%, greater than 80%, or greater than 90% C15-C17 hydrocarbons.

The foregoing and other objects, features, and advantages of the invention will become more apparent from the following detailed description, which proceeds with reference to the accompanying figures.

DETAILED DESCRIPTION

Figure 1:
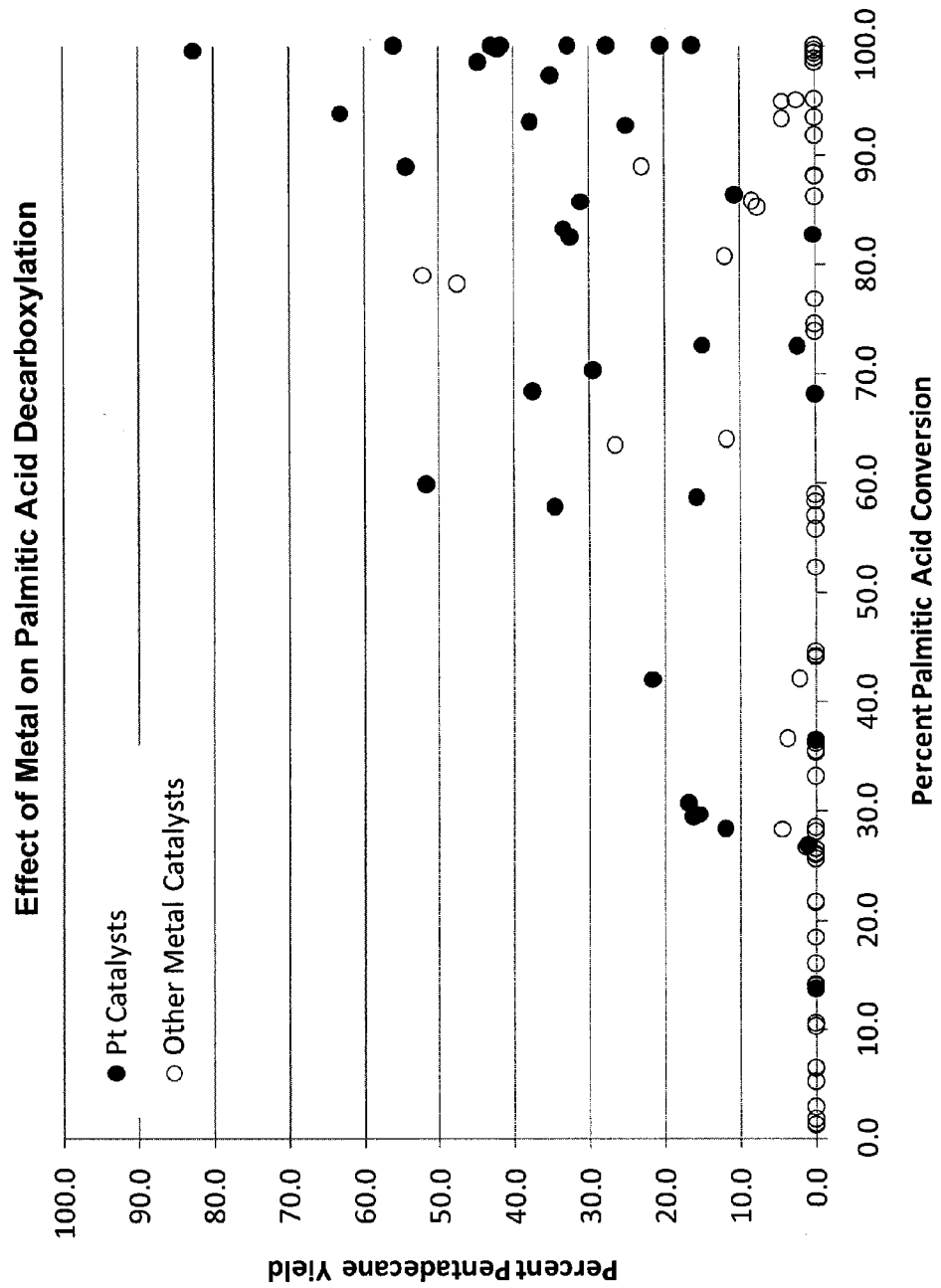
FIG. 1 is a graph of percent pentadecane yield versus percent palmitic acid conversion for various catalysts.

Disclosed herein are embodiments of methods for making renewable fuel (such as renewable gasoline, renewable diesel, or renewable aviation fuel) by deoxygenating fatty acids via decarboxylation, decarbonylation, and/or dehydration to produce hydrocarbons. Also disclosed are embodiments of highly active, selective catalysts for deoxygenating free fatty acids. Catalytic deoxygenation of free fatty acids directly produces diesel-fraction hydrocarbons suitable for various transportation fuels, including but not limited to personal and industrial diesel-powered devices such as cars, trucks, buses, trains, ferries, and airplanes. Renewable diesel has several advantages compared to biodiesel. For example, oxygen-containing biodiesel is unsuitable for use in aviation and typically is blended with petroleum diesel to be used in other applications. Renewable diesel produced by embodiments of the disclosed catalysts can be used without further modification or blending.

Embodiments of the disclosed catalysts are capable of deoxygenating fatty acids to produce hydrocarbons in the absence of added hydrogen, thus allowing economical production of hydrocarbons at sites without a readily available source of hydrogen. Deoxygenation of unsaturated free fatty acids in the absence of added hydrogen also has the potential to produce olefins of chemical value, such as building blocks for other products of value.

I. TERMS AND DEFINITIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Definitions of particular terms, not otherwise defined herein, may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Catalyst: A substance, usually present in small amounts relative to reactants, that increases the rate of a chemical reaction without itself being consumed or undergoing a chemical change. A catalyst also may enable a reaction to proceed under different conditions (e.g., at a lower temperature) than otherwise possible. Catalysts typically are highly specific with respect to the reactions in which they participate. Some catalysts have a limited lifetime, after which they must be replaced or regenerated. For example, reaction products or byproducts may deposit on the catalyst's surface, reducing its activity.

Cetane number: A measurement of a diesel fuel composition's combustion quality during compression ignition. The cetane number is comparable to the octane-number rating for gasoline. The higher the cetane number, the more easily the fuel can be ignited. The cetane number is the percentage of cetane ($C_{16}H_{34}$) that must be mixed with heptamethylnonane (cetane number=0) to give the same ignition performance under standard conditions as the fuel being rated.

Cloud point: The temperature at which a waxy solid material begins to appear as a diesel fuel is cooled, resulting in a cloudy appearance of the fuel. The presence of solidified waxes thickens the fuel and can clog fuel filters and fuel injectors. Wax also can accumulate on cold surfaces.

Cracking: A refining process involving decomposition and molecular recombination of long-chain hydrocarbons into shorter hydrocarbons. Thermal cracking exposes the hydrocarbons to temperatures of about 500-950° C. for varying periods of time. Catalytic cracking occurs when heated hydrocarbon vapors (about 400° C.) are passed over metal oxide and/or metallic catalysts (e.g., silica-alumina or platinum). In hydrocracking, a catalyst is used and hydrogen is added to produce primarily saturated hydrocarbons.

Decarboxylation: A chemical reaction in which carbon dioxide is removed from a chemical compound. For example, a fatty acid may be decarboxylated to produce a hydrocarbon and carbon dioxide: $R-COOH \rightarrow R-H + CO_2$.

Fatty acid: A carboxylic acid having a long, unbranched, aliphatic chain or tail. Naturally occurring fatty acids commonly contain from 4 to 28 carbon atoms (usually an even number) including the carbon atom in the carboxyl group. Free fatty acids can be represented by the general formula RCOOH, where R is a saturated (i.e., all single bonds) or unsaturated (i.e., contains one or more double or triple bonds) aliphatic chain. Saturated fatty acids have only single bonds in the carbon chain and can be described by the general formula $CH_3(CH_2)_xCOOH$. Unsaturated fatty acids have one or more double or triple bonds in the carbon chain. Most natural fatty acids have an aliphatic chain that has at least eight carbon atoms and an even number of carbon atoms (including the carbon atom in the carboxyl group). The fatty acid may be a liquid, semisolid, or solid. As used herein, the term "fatty acids" refers to a composition comprising molecules, mono-, di-, and/or triglycerides of a single fatty acid, e.g., oleic acid, or a composition comprising molecules, mono-, di-, and/or triglycerides of a mixture of fatty acids, e.g., oleic acid and palmitic acid.

Olefin: An unsaturated aliphatic hydrocarbon having one or more double bonds. Olefins with one double bond are alkenes; olefins with two double bonds are alkadienes or diolefins. Olefins typically are obtained by cracking petroleum fractions at high temperatures (e.g., 800-950° C.).

Pore: One of many openings or void spaces in a solid substance of any kind. Pores are characterized by their diameters. According to IUPAC notation, micropores are small pores with diameters less than 2 nm. A microporous material has pores with a mean diameter of less than 2 nm. Mesopores are mid-sized pores with diameters from 2 nm to 50 nm. A mesoporous material has pores with a mean diameter from 2 nm and 50 nm. Macropores are large pores with diameters greater than 50 nm. A macroporous material has pores with a mean diameter greater than 50 nm.

Porous: A term used to describe a matrix or material that is permeable to at least some fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua.

Pour point: The lowest temperature at which a liquid will pour or flow under prescribed conditions.

Renewable diesel: Diesel-quality, non-FAME (fatty acid methyl ester) fuels derived from renewable resources that are suitable for use in most ordinary compression ignition engines. Renewable diesel is substantially oxygen-free and is a direct replacement for petroleum diesel.

Renewable fuel: Fuel (e.g., gasoline, diesel, aviation) derived from renewable resources, e.g., plant and/or animal resources.

TOS: Time-on-stream. As used herein, TOS is the length of time that the catalyst has been converting feed to product.

Transfer hydrogenation: A reaction in which the hydrogen produced by dehydrogenating one molecule is transferred to a second molecule, thereby hydrogenating the second molecule.

WHSV: Weight hourly space velocity. As used herein, WHSV is the weight of feed flowing per weight of catalyst per hour.

II. CATALYSTS FOR CONVERSION OF FATTY ACIDS TO HYDROCARBONS

The disclosed catalysts are suitable for conversion of saturated and/or unsaturated fatty acids to hydrocarbon products. The disclosed catalysts are capable of deoxygenating saturated and/or unsaturated fatty acids via decarboxylation. In some embodiments, decarbonylation, alkylation, isomerization, cracking, hydrogenation/dehydrogenation, cyclization, and/or aromatization also occur. The hydrocarbon products are suitable for use as a renewable fuel. Some fractions of the fuel may be suitable for use as gasoline or aviation fuel.

Embodiments of the catalysts comprise a Group VIII metal, a support material, and a transition metal oxide or non-transition metal. The support material is carbon, a metal oxide, or a metalloid oxide. Typically the support material is, at least in part, porous. In some embodiments where the support is a metal oxide or metalloid oxide, the catalyst further includes a transition metal oxide. In other embodiments where the support is carbon, the catalyst further includes one or more non-transition metals.

In some embodiments, the Group VIII metal is selected from Co, Ir, Ni, Pd, Pt, Ru, or a combination thereof. In particular embodiments, the Group VIII metal is Pt. In some embodiments, the metal oxide or metalloid oxide support is selected from $Al_2O_3$, $SiO_2$, $TiO_2$, $ZrO_2$, or a combination thereof. In several working embodiments, the metal oxide support was $TiO_2$ or $ZrO_2$. In particular embodiments, the catalyst includes a Group VIII metal, a metal oxide or metalloid oxide support, and a transition metal oxide. In certain examples, the transition metal oxide is molybdenum (VI) oxide ($MoO_3$) or tungsten (VI) oxide ($WO_3$). Exemplary catalysts include $Pt/Al_2O_3$, $Pt/TiO_2$, $Pt/ZrO_2$, $MoO_3/Pt/ZrO_2$, and $WO_3/Pt/ZrO_2$.

When the support is carbon, the catalyst may include a Group VIII metal and also may include one or more additional metals, typically a non-transition metal (e.g., Ge, Sn, Pb, Bi). For example, the catalyst may include platinum and a non-transition metal such as germanium or tin. The non-transition metal in combination with the Group VIII metal increases the activity of the catalyst compared to the Group VIII metal alone. Exemplary catalysts include Pt/Ge/C, Pt/Ru/C, and Pt/Sn/C. In working examples, surprisingly superior results were obtained with $WO_3/Pt/ZrO_2$, $MoO_3/Pt/ZrO_2$, $Pt/TiO_2$, Pt/Ge/C, and Pt/Sn/C.

For instance, as discussed in detail in Example 1, out of the more than 100 catalyst samples screened, one composition, i.e., $WO_3/Pt/ZrO_2$, unexpectedly worked surprisingly well for deoxygenating saturated fatty acids via decarboxylation with up to 100% conversion. $WO_3/Pt/ZrO_2$ is an acidic catalyst. At the time of the invention, conventional thought was that acidic catalysts would be unsuitable for a continuous-flow process because of their tendency to build up surface coke deposits during hydrocarbon processing, thereby losing activity. Sooknoi et al., for example, investigated deoxygenation of methyl esters over zeolite catalysts, including NaX, and stated that, typical of acid catalysts, rapid deactivation was observed with NaX and was probably due to coke formation over the acid sites. (*J. of Catalysis*, 258 (2008) 199-209.) However, surprisingly, addition of platinum to tungstated zirconia ameliorated the problem of coke formation, allowing the catalyst to remain active for relatively long periods of time. In a working embodiment, a $WO_3/Pt/ZrO_2$ catalyst was shown to produce 90-100% palmitic acid conversion for up to 800 minutes in a continuous-flow process. In another working embodiment, a $WO_3/Pt/ZrO_2$ catalyst was shown to still be capable of 60-90% palmitic acid conversion after 18,000 minutes (300 hours) in a continuous-flow process.

Catalysts comprising platinum/germanium or platinum/tin on carbon supports also were shown to produce unexpectedly superior results, particularly with respect to decarboxylating unsaturated fatty acids. Some Group VIII metals on carbon, e.g., 5 wt % Pd/C, are capable of decarboxylating saturated fatty acids. However, Pd/C has low activity with unsaturated fatty acids, and exhibits poor stability when used in a liquid-phase continuous process. Additionally, double-bond rearrangement and side reactions such as cracking can hinder decarboxylation activity. An initial screening assay (Example 1) demonstrated that a Pt/Ge/C catalyst converted more than 95% of an oleic acid feed to heptadecane. A Pt/Sn/C catalyst converted more than 85% of the oleic acid feed to heptadecane. In contrast, a Pt/C catalyst converted less than 60% of the oleic acid feed to heptadecane. As described in Example 3, a working embodiment of a Pt/Sn/C catalyst continued to deoxygenate about 60% of an oleic acid feed for up to 500 hours in a liquid-phase, continuous-flow process.

The following exemplary catalyst compositions are not meant to be exact or limiting. Variations of the relative amounts of the components may provide a catalyst of similar performance, superior performance, or poorer performance. Because platinum is expensive, however, it is typically advantageous to minimize the amount of platinum in the catalyst. In some embodiments, the mass of platinum relative to the mass of the catalyst is less than or equal to 5 wt %, less than 2 wt %, or less than 1 wt %. For example, the platinum may be present in an amount of 5 wt %, 1 wt % to 5 wt %, 0.4 wt % to 2 wt %, 0.5 wt % to 1.5 wt %, or 0.7 wt %. Typically, 1 wt % to 5 wt % platinum is used in conjunction with carbon-based supports.

Although platinum may be present in concentrations up to 5 wt % on metal oxide or metalloid oxide supports, smaller amounts (e.g., 0.5 wt % to 1.5 wt %) can be used in conjunction with metal oxide-based supports such as $ZrO_2$ that further include a transition metal oxide such as $MoO_3$ or $WO_3$. In some embodiments, the catalyst satisfies the formula $MO_3/Pt/ZrO_2$. In certain embodiments, M is W, Mo, or a combination thereof. The catalyst includes $MO_3$ and Pt in a relative weight ratio ranging from 300:1 to 3:1, such as a weight ratio from 100:1 to 10:1, or a weight ratio from 20:1 to 10:1. For example, in some embodiments, the catalyst comprises 0.1 wt % to 1.5 wt % Pt and 6 wt % to 30 wt % $MO_3$ on $ZrO_2$, relative to the total mass of catalyst. In a working embodiment that evaluated the effects of Pt and $WO_3$ concentration on palmitic acid conversion (primarily via decarboxylation) to hydrocarbon products, a $WO_3/Pt/ZrO_2$ catalyst having 12 wt % $WO_3$ and 0.7 wt % Pt on a $ZrO_2$ support provided unexpected and superior results. In another working embodiment, a catalyst having 7.8 wt % $MoO_3$ and 0.7 wt % Pt on a $ZrO_2$ support also provided unexpected and superior results.

Embodiments of carbon-based catalysts include platinum and a non-transition metal in a relative weight ratio of 50:1 to 1:1, such as a weight ratio of 10:1 to 3:1. For example, the catalyst may include 1 wt % to 5 wt % Pt or 1.5 wt % to 5 wt % Pt, relative to the mass of catalyst. In some embodiments, the mass of platinum is 1.5 wt %, 3 wt %, or 5 wt %. Disclosed embodiments of the carbon-based catalysts also include 0.1 wt % to 5 wt % Ge or Sn, relative to the mass of the catalyst. Catalysts including 5 wt % Pt and 0.5-1 wt % Ge on carbon or 1.5 wt % Pt/0.15 wt % Sn on carbon were found, unexpectedly, to be effective catalysts for decarboxylating palmitic acid. Working embodiments concerning oleic acid conversion to deoxygenated product demonstrated unexpectedly superior results with Pt/Ge/C and Pt/Sn/C catalysts.

III. CATALYST SYNTHESIS

A. Platinum on Metal Oxide Support

Catalysts comprising platinum on a metal oxide support are disclosed. Zirconia supports may be prepared by calcining zirconia at 450-850° C. for 2-6 hours, e.g., at 450° C. for 2 hours. In some embodiments, the zirconia may include a binder, such as graphite or cornstarch. In certain embodiments, the zirconia is ground and sieved prior to calcination.

When preparing catalyst compositions including Pt and $WO_3$, $WO_3$ typically is added after calcination and before addition of Pt. For example, an aqueous tungsten solution (e.g., ammonium metatungstate hydrate) may be added to the zirconia support by the incipient wetness technique. Incipient wetness impregnation is performed by dissolving a metal salt in an appropriate solvent, and then adding the solution to a porous catalyst support. The amount of the solution added corresponds to the pore volume of the catalyst support. The concentration of solution is selected such that the desired mass of metal salt is added to the support. Capillary action draws the solution into the support's pores. The catalyst is then dried and/or calcined, depositing the metal salt on the catalyst surface. In the disclosed working embodiments, an ammonium metatungstate solution was added to the calcined zirconia support. The impregnated support was then dried and subsequently calcined.

Platinum is then added to the tungstated zirconia. In some embodiments, an aqueous platinum ethanolamine solution is added via the incipient wetness technique. The Pt-impregnated tungstated zirconia is then dried, calcined, and optionally ground and sieved.

In other embodiments, platinum is added by combining tungstated zirconia and platinum acetylacetonate in a round-bottom flask, which is placed on a rotary evaporator and heated under vacuum. The $WO_3/Pt/ZrO_2$ catalyst then is calcined. In one working embodiment, the catalyst subsequently was reduced in a hydrogen atmosphere at 350° C.

Platinum acetylacetonate may be used as described above to add platinum to titania supports. The titania support optionally is calcined, e.g., at 450-900° C. The titania support may be ground and sieved before adding platinum.

In some embodiments, $MoO_3/Pt/ZrO_2$ catalysts are prepared by first calcining a zirconia support, e.g., at 450° C. An aqueous solution of ammonium heptamolybdate hydrate is added by the incipient wetness technique, followed by drying and calcination, e.g., at 850° C. An aqueous solution of platinum ethanolamine subsequently is added by the incipient wetness technique, followed by drying and calcination.

In some embodiments, $Pt/ZrO_2$ catalysts are prepared by calcining a zirconia support, and then adding Pt by the incipient wetness technique using an aqueous solution of platinum ethanolamine, followed by drying and calcination. The zirconia support may be ground and sieved first to provide improved platinum dispersion on the zirconia surface. Platinum is added using platinum acetylacetonate, as described above. After calcination, the catalyst may be reduced, such as in a hydrogen atmosphere at 350° C.

B. Platinum/Non-Transition Metal on Carbon Support

The platinum/germanium and platinum/tin catalysts may be prepared via several techniques known in the art. One such method uses the incipient wetness technique to add metals to a carbon support. Addition of the Pt and non-transition metal may be done simultaneously or sequentially. For simultaneous addition, a suitable Pt precursor (e.g., platinum ethanolamine, chloroplatinic acid) and a suitable Ge or Sn precursor such as the chloride or oxide form are mixed with a sufficient concentration of acid (e.g., HCl) to prevent precipitation and produce an impregnation solution. The volume of the impregnation solution is then adjusted with either acid or deionized water such that the volume of the solution will fill pores of the carbon support and the metals remain soluble. The impregnation solution is then added to the carbon support. The catalyst is dried. In some instances, the catalyst is calcined and/or reduced prior to application.

Alternatively, the Pt and non-transition metal may be added sequentially. A suitable Pt precursor (e.g., platinum ethanolamine, chloroplatinic acid) is first dissolved to make an impregnation solution, and the volume is adjusted to fill the pore volume of the carbon support using deionized water or other appropriate solvent, such as an alcohol (e.g., methanol, ethanol) or a ketone (e.g., acetone, methyl-isobutyl ketone). The dissolved Pt solution is then slowly added such that the incipient wetness point of the support is reached when the solution is consumed. The Pt-impregnated support may then be dried, calcined and/or chemically reduced. Next, a suitable Sn or Ge precursor, such as a chloride or oxide precursor, is dissolved in a sufficient concentration of acid or solvent (e.g., ethanol) to prevent precipitation. The solution volume is then adjusted with HCl, deionized water, or additional solvent such that upon addition of the solution to the Pt-supported carbon the incipient wetness point is reached. The catalyst is then dried and can be calcined and/or reduced prior to application.

IV. FATTY ACID CONVERSION AND DEOXYGENATION BY DECARBOXYLATION AND/OR DECARBONYLATION

Naturally occurring fatty acids (i.e., animal fats and plant-based oils/fats) typically are found in triglycerides, where three fatty acids are esterified to a glycerol backbone

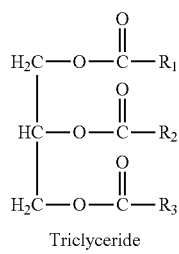

Triglyceride where $R_1$, $R_2$, and $R_3$ are unbranched aliphatic chains. $R_1$, $R_2$, and $R_3$ may be the same or different from one another. For example, $R_1$, $R_2$, and $R_3$ may be different in length from one another. Additionally, $R_1$, $R_2$, and $R_3$ may differ in the number and/or placement of any double and/or triple bonds.

Suitable fatty acid sources comprise plant-based oils, plant-based fats, animal fats, or any combination thereof. The terms "plant-based" oil or "plant-based" fat as used herein encompass oils or fats obtained from any part of a plant, including the leaves, stems, roots, flowers, seeds, fruits, or any other part of the plant. In some embodiments, the fatty acid source comprises a plurality of plant-based oils, plant-based fats, animal fats, or any combination thereof.

In some embodiments, the fatty acids are separated from the glycerol backbone by hydrolyzing the ester bonds to produce glycerol and free fatty acids having the generic formula RCOOH. Hydrolysis can be performed by any suitable method known to one of ordinary skill in the art. The glycerol and free fatty acids are separated, and the free fatty acids are then deoxygenated. The recovered glycerol has significant economic value and can be used in other processes and formulations. Hydrolysis typically separates up to 100% of the fatty acids from the glycerol backbone. For example, hydrolysis may separate at least 10%, at least 50%, at least 80%, or at least 95% of the fatty acids from the glycerol backbone.

In some embodiments, the fatty acids are hydrogenated to form saturated fatty acids prior to deoxygenation. Hydrogenation may be performed before or after removal of the glycerol backbone. For example, soybean oil, which typically includes about 80% unsaturated fatty acids, may be hydrogenated by any suitable method known to one of ordinary skill in the art prior to de-esterification and decarboxylation. Hydrogenation typically saturates at least 10%, at least 50%, at least 80%, at least 95%, or 100% of the double and/or triple bonds in a sample comprising unsaturated fatty acids. In some embodiments, hydrogenation may be used to improve the stability of the fatty acid feed for storage prior to deoxygenation. For example, soybean oil comprises a large amount of linoleic acid, which can react with air, thereby turning the oil rancid. In some embodiments, the fatty acid feed may be pretreated by any suitable method known to those skilled in the art to remove undesirable compounds (e.g., phospholipids) before hydrolysis, hydrogenation, and/or deoxygenation.

Contacting embodiments of the disclosed catalysts with fatty acids results in deoxygenation of at least some of the fatty acids via decarboxylation. Decarboxylation of the fatty acids removes $CO_2$, producing a hydrocarbon. In the case of palmitic acid, a saturated fatty acid having 16 carbons, decarboxylation produces pentadecane:

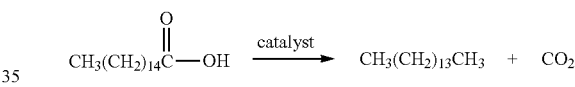

Although triglycerides are usually hydrolyzed prior to deoxygenation so that the glycerol can be recovered, triglycerides may be deoxygenated with embodiments of the disclosed catalysts. However, triglyceride deoxygenation typically decomposes and gasifies a substantial portion of the glycerol backbone, thereby eliminating economic benefits associated with recovery and subsequent use of glycerol. Other esters of fatty acids also may be processed with certain embodiments of the disclosed catalysts to provide hydrocarbon products.

Embodiments of the disclosed catalysts deoxygenate, via decarboxylation, from 10% to 100% of the fatty acids when a composition comprising fatty acids is exposed to the catalysts. The catalyst may provide additional deoxygenation via decarbonylation and dehydration. In some embodiments, the disclosed catalysts are capable of deoxygenating at least 10%, at least 20%, at least 25%, at least 50%, at least 75%, at least 80%, at least 90%, or at least 95% of the fatty acids in a fatty acid composition. For example, the disclosed catalysts may deoxygenate 20-80%, 50-80%, 60-95%, or 80-100% of the fatty acids. The fatty acid composition may consist essentially of fatty acids, or may comprise fatty acids diluted in a suitable solvent (e.g., a liquid hydrocarbon solvent). The fatty acids may be free fatty acids, fatty acid esters, fatty acid monoglycerides, fatty acid diglycerides, fatty acid triglycerides, or any combination thereof in any ratio. In particular embodiments, up to 100% of the fatty acids are free fatty acids. For example, at least 10%, at least 50%, at least 80%, or at least 95% of the fatty acids are free fatty acids.

Deoxygenation can be performed as a batch process, in which a catalyst and fatty acids are combined (e.g., in a slurry) and allowed to react for a period of time. Typically fatty acids are used without dilution. However, the fatty acids may be diluted with a solvent, particularly if the fatty acids are waxy or in solid form. Suitable solvents include hydrocarbon solvents, particularly liquid hydrocarbon solvents. In certain embodiments, the hydrocarbon solvent is recycled hydrocarbons produced by decarboxylation of fatty acids.

In some examples, the reaction time is 2-6 hours. In one working embodiment, the reaction time was 4 hours. The reaction mixture may be heated to a temperature of 200-500° C., such as 250-350° C. Optionally, the slurry is mixed continuously or periodically throughout the reaction time by suitable means such as mechanical stirring or shaking.

In other embodiments, deoxygenation is a continuous or substantially continuous process in which a fatty acid feed flows across or through a catalyst bed. For example, a column containing a packed catalyst bed is prepared, and a fatty acid feed is flowed through the column. The fatty acids may be free fatty acids, or they may be in the form of triglycerides, fatty acid esters, or mixtures thereof. Typically the fatty acids are used without dilution. However, in some instances (e.g., if the fatty acids are a wax or solid) the fatty acids may be diluted with a hydrocarbon solvent, particularly a hydrocarbon solvent that is a liquid at ambient temperature. In certain embodiments, the hydrocarbon solvent is recycled hydrocarbons produced by deoxygenating fatty acids with an embodiment of the disclosed catalysts.

Thus, deoxygenation is performed in mixtures comprising a plurality of catalyst particles having a first composition selected from a) Pt, $MO_3$, and $ZrO_2$, where M is W, Mo, or a combination thereof, b) Pt, Ge and C, c) Pt, Sn, and C, or d) any combination thereof, with a second composition comprising fatty acids, wherein the second composition is put into fluid contact with the first composition.

The second composition may comprise triglycerides (e.g., in the form of plant-based oils/fats or animal fats) or free fatty acids. In some embodiments, free fatty acids are obtained by hydrolyzing triglycerides to produce free fatty acids and glycerol. In certain embodiments, the free fatty acids and glycerol are at least partially separated, and at least a portion of the glycerol is removed prior to putting the second composition into contact with the first composition.

In some embodiments, the mixture further comprises hydrocarbons. In one embodiment, the hydrocarbons are formed when the second composition is put into contact with the first composition. In another embodiment, the second composition comprises a mixture of fatty acids and a hydrocarbon solvent. In one embodiment, the hydrocarbon solvent is obtained by recycling hydrocarbons formed by deoxygenating fatty acids with an embodiment of the disclosed catalysts.

In some embodiments, deoxygenation is performed using an up-flow column. The fatty acid feed flows into the bottom of the column, and the decarboxylated hydrocarbons and $CO_2$ flow out the top of the column. Typically the column is heated to a temperature of 200-500° C., such as 250-350° C. In some embodiments, the fatty acid feed also is preheated before flowing into the column. For example, if the fatty acid feed is a wax or solid at ambient temperature, it may be heated to form a liquid. The fatty acids may be preheated to at least 50° C., at least 100° C., 70-350° C., 100-350° C., or to the operating temperature of the column, e.g., 200-500° C. or 250-350° C. In other embodiments, the fatty acid feed is not preheated and is introduced into the column at ambient temperature. Unsaturated fatty acids inherently are more reactive than saturated fatty acids, and may undergo at least some dimerization and/or oligomerization if preheated before exposure to the catalyst. As the temperature increases, more cracking occurs, producing more light hydrocarbons (e.g., C1-C4 hydrocarbons) and increasing product heterogeneity.

A person of ordinary skill in the art will appreciate that fatty acid flow rates through the column are determined based upon a number of variables including, but not limited to, catalyst composition, column dimensions, temperature, fatty acid feed composition, and combinations thereof. In some examples, the flow rate has a weight hourly space velocity (WHSV) of 0.1-2.0 $hr^{-1}$ or 0.3-1.0 $hr^{-1}$. In some embodiments, flow rates near the lower end of the WHSV range increase fatty acid conversion, catalyst lifetime, and/or product distribution or heterogeneity. For example, increasing the catalyst contact time (e.g., by decreasing WHSV) may increase the amount of cracking, rearrangement, and/or cyclization of the product hydrocarbons. The broader product distribution can lower the cloud point and/or freezing point of the product, and may make the product more suitable for aviation use. In several working embodiments, the WHSV was 0.3-0.4 $hr^{-1}$.

In some embodiments, the column is purged with an inert gas, e.g., $N_2$, before starting the fatty acid feed. In other embodiments, the column may be purged with air or a gas including some oxygen. Oxygen acts as a hydrogen scavenger and can remove hydrogen associated with the catalyst surface, thereby increasing the catalyst activity for reactions involving dehydrogenation. In some embodiments, the catalyst is purged with oxygen at a lower temperature (e.g., 50-150° C.) before or while being contacted with the fatty acids to promote dehydrogenation; the fatty acids are later contacted with the same or another catalyst at typical operating temperatures of 200-500° C. Purging with an inert gas also can remove at least some hydrogen associated with the catalyst surface via diffusion.

The disclosed catalysts demonstrate deoxygenation (typically decarboxylation) activity in the absence of added hydrogen and/or high pressure. For example, the disclosed catalysts can be used at any desired operating temperature at pressures ranging from ambient pressure to less than 250 psi. In some embodiments, the catalysts are used at pressures less than 100 psi. In certain systems, the columns are operated at pressure of 80 psi to facilitate mechanical operation such as maintaining pump operation and sealed valves. In contrast, current commercially available decarboxylation catalysts typically require hydrogen to maintain catalytic activity and are used in a 3-phase system: solid catalyst, liquid fatty acid feed, and gaseous hydrogen. Because the catalyst is coated with the liquid fatty acid feed, hydrogen must be solubilized in the liquid to reach the catalyst surface. Solubilization is attained by operating the system under high pressure, e.g., 2,000 psi. The disclosed catalysts' ability to perform deoxygenation via decarboxylation without added hydrogen enables deoxygenation plants to be located near a fatty acid source without also being located near a hydrogen source. Furthermore, operating at lower pressures enables less expensive process equipment such as lower pressure pumps, lower pressure valves and piping, and lower pressure-rated catalyst columns to be used, thereby reducing the cost of building the deoxygenation system and providing economic viability for a commercial scale operation Additionally, certain embodiments of the disclosed catalysts are well suited for use in continuous, liquid-flow systems and remain capable of deoxygenating at least 10% of the fatty acids in a fatty acid feed for at least 200 minutes at temperatures of 200-500° C. and WHSV of 0.1-2.0 $hr^{-1}$. Under such conditions, certain working embodiments of the disclosed catalysts decarboxylated at least 80% of the fatty acids in a fatty acid feed for at least 400 minutes or at least 700 minutes. Some embodiments of the disclosed catalysts demonstrate deoxygenation activity for more than 350 hours. In working embodiments, deoxygenation activity was demonstrated for at least 300 minutes, at least 500 minutes, at least 800 minutes, at least 1,000 minutes, or at least 20,000 minutes. In one working embodiment, the percent deoxygenation after 22,000 minutes (367 hours) was substantially the same as the initial percent deoxygenation.

Certain embodiments of the disclosed catalysts produce at least some isomerization during deoxygenation, resulting in methyl-branched hydrocarbons. For example, deoxygenation of palmitic acid may also produce 2-, 3-, 4-, or 5-methyltetradecane along with pentadecane. The methyl group may be located at any position along the carbon chain. The presence of methyl-branched hydrocarbons in renewable diesel can be advantageous by lowering the cloud point and pour point of the fuel. The methyl group reduces the ability of the fuel to solidify and/or become waxy by disrupting the "stacking" of adjacent saturated hydrocarbons.

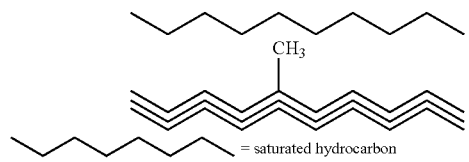
= saturated hydrocarbon

Although a single methyl group is beneficial, additional branching reduces the cetane value of the fuel. Catalyst compositions including $WO_3/Pt/ZrO_2$ were unexpectedly found to provide surprisingly superior results with respect to producing mono-methyl-branched hydrocarbons. Little-to-no methyl branching was seen with catalyst embodiments comprising Pt/Ge or Pt/Sn on carbon.

While $WO_3/Pt/ZrO_2$ was surprisingly found to provide excellent results as a catalyst for deoxygenating saturated fatty acids, it was found to alkylate unsaturated fatty acids, making it less suitable as a catalyst for feeds including a substantial percentage of unsaturated fatty acids. For example, alkylation occurred when oleic acid was exposed to $WO_3/Pt/ZrO_2$ catalysts. In one embodiment, up to 60-70% of the products were alkylated, forming heavy, non-distillable products. Such alkylated compounds are too heavy to be useful as renewable diesel, making alkylation an undesirable reaction when preparing renewable diesel. Thus, $MO_3/Pt/ZrO_2$ (M=W, Mo, or a combination thereof) catalysts are suitable catalysts for fatty acid feeds including less than 50 wt % unsaturated fatty acids. For example, $MO_3/Pt/ZrO_2$ catalysts are selected when the fatty acid feed contains at least 50 wt %, at least 75 wt %, or at least 95 wt % saturated fatty acids. Alternatively, a fatty acid feed including a substantial amount (e.g., greater than 50 wt %) of unsaturated acids can be hydrogenated and subsequently deoxygenated with a $MO_3/Pt/ZrO_2$ catalyst.

Embodiments of the disclosed carbon-based catalysts, such as Pt/Ge or Pt/Sn on carbon, provide unexpectedly superior results for deoxygenation of fatty acid feeds including a substantial amount of unsaturated fatty acids. These carbon supports are non-acidic and do not promote extensive alkylation and/or oligomerization reactions. Thus, they can be utilized to deoxygenate unsaturated fatty acids such as oleic acid and linoleic acid. Pt/Ge and/or Pt/Sn on carbon catalysts are suitable catalysts for fatty acid feeds including at least 1 wt %, at least 50 wt %, at least 80 wt %, or at least 99 wt % unsaturated fatty acids.

In some embodiments, the disclosed catalysts partially dehydrogenate free fatty acids in a sample, resulting in subsequent branching, cyclization and/or aromatization. Cyclization and/or aromatization can enhance the products' suitability for use in fuels by lowering the cloud point and pour point of the fuel. Concomitantly, the released hydrogen may react with other unsaturated fatty acids in the mixture, producing saturated hydrocarbons. Additionally, rearrangements may occur in which the double bond is moved to a different position along the carbon chain. For example, the double bond in oleic acid may be moved from the omega-9 position (i.e., ninth bond from the end of the carbon chain) to the alpha, or first, position or any other position along the hydrocarbon chain. Branching, cyclization and/or aromatization can result in products suitable for aviation fuels. The aviation fuel JP-8, for example, typically contains 29% iso-paraffins (i.e., branched-chain hydrocarbons), 20% cyclopar-affins and 20% aromatics.

Dehydrogenation and cyclization/aromatization reactions can occur with embodiments of the disclosed catalysts. For instance, certain embodiments of the disclosed catalysts dehydrogenate and aromatize a portion of the molecules in a fatty acid feed, producing aromatic compounds such as alkylated benzenes. These compounds may have high value, e.g., as surfactants. Although these reactions occur with both types of catalysts and all feeds, they are more prevalent with embodiments of the disclosed carbon-based catalysts, i.e., Pt/Ge or Pt/Sn on carbon and feed containing unsaturated fatty acids. While aromatic compounds (e.g., alkylated benzenes) are the predominant cyclic product, non-aromatic rings of other sizes also may be formed, particularly when $MO_3/Pt/ZrO_2$ catalysts are used. Without being bound by any particular theory, it is believed that a first dehydrogenation event may cyclize a fatty acid chain and produce, e.g., a 6-membered ring with release of a hydrogen molecule. With an unsaturated fatty acid, an internal alkylation can occur producing a ring compound. The 6-membered ring can further dehydrogenate to form an aromatic ring with release of an additional three $H_2$ molecules. The released hydrogen is transferred to and reacts with unsaturated fatty acid molecules in the feed (i.e., transfer hydrogenation), forming saturated fatty acids, which deoxygenate to hydrocarbons. Transfer hydrogenation reduces the incidence of alkylation and/or oligomerization reactions between adjacent unsaturated fatty acid molecules. Additionally, the released hydrogen maintains the catalyst in a reduced state. Thus, certain embodiments of the disclosed catalysts result in both deoxygenation and transfer hydrogenation of fatty acid molecules, producing deoxygenated hydrocarbons, a portion of which are cyclic and/or aromatic, while minimizing undesirable dimerization and/or oligomerization reactions. In one embodiment, when the fatty acid feed was oleic acid, more than 90% of the resulting hydrocarbons were saturated, with heptadecane being the major product.

Dehydrogenation can be increased by maintaining a hydrogen-starved system. Operating in a hydrogen-starved atmosphere is advantageous when production of unsaturated hydrocarbons is desirable. In addition to having utility as a fuel, the unsaturated hydrocarbons may be useful as starting reactants for further conversions and chemical syntheses. Thus, in certain embodiments, deoxygenation is performed in a hydrogen-free, or hydrogen-deficient, atmosphere. A hydrogen-deficient atmosphere can be facilitated by flowing an inert, non-hydrogen gas (e.g., $N_2$, Ar) through the column with the fatty acid feed. The gas facilitates removal of hydrogen via diffusion as some hydrogen diffuses from the catalyst surface to the gas. Alternatively, a hydrogen scavenger can be used to increase the yield of alkyl-branched aromatics. When the fatty acid feed includes a substantial percentage of unsaturated fatty acids, the feed itself acts as a hydrogen scavenger. In some embodiments, hydrogen produced by dehydrogenating one fatty acid molecule is transferred to a nearby unsaturated fatty acid molecule, i.e., transfer hydrogenation. Transfer hydrogenation reduces concomitant dimerization and/or oligomerization of the fatty acids, which can occur in the absence of transfer hydrogenation. Oxygen can also be used as a hydrogen scavenger. Flowing air or a gas including oxygen (e.g., 1% to 100%) through the column will facilitate maintaining a hydrogen-deficient atmosphere.

In some embodiments, a fatty acid feed is heated in the presence of catalyst at a temperature of at least 50° C. to facilitate dehydrogenation and subsequent deoxygenating is performed at a temperature of at least 250° C. These processes can be performed using a single catalyst bed or column having different temperature zones, e.g., a first temperature zone of at least 50° C. and a second temperature zone of at least 250° C. In one embodiment, dehydrogenation is performed in a first catalyst bed at a temperature of at least 50° C. and deoxygenation is performed in a second catalyst bed at a temperature of at least 250° C. Catalyst in the first and second catalyst beds may have substantially the same chemical composition, e.g., 0.7 wt % Pt/12 wt % $WO_3/ZrO_2$. Alternatively, the two catalyst beds may contain catalysts with different compositions, i.e., different ratios of components or different chemical compositions. For example, the first catalyst bed may have a Pt/Ge/C catalyst, and the second catalyst bed may have a $Pt/MO_3/ZrO_2$ catalyst. In one embodiment, the first and second catalyst beds are in separate columns, which may be operated under the same or different conditions (e.g., temperature, WHSV, purge gas, etc.). In another embodiment, the two catalyst beds are within a single column such that, for example, a first zone within the column contains the first catalyst bed and a second zone within the column contains the second catalyst bed. The zones may be at the same or different temperatures.

In one embodiment, exposing a fatty acid feed to a platinum/non-transition metal catalyst (e.g., Pt/Ge/C or Pt/Sn/C) dehydrogenates at least 10% of the fatty acids to produce branched, cyclic, and/or aromatic compounds. In another embodiment, the platinum/non-transition metal catalyst also deoxygenates at least 10% of the fatty acids.

In some embodiments, the hydrocarbons produced by exposure to the catalyst are subjected to one or more additional processes to stabilize the fuel and/or improve the yield of a specific, desired fuel fraction. For example, in certain embodiments, at least a portion of the hydrocarbons produced by exposure to the catalyst are unsaturated hydrocarbons, and the unsaturated hydrocarbons are further hydrogenated to produce saturated hydrocarbons. Increased saturation may improve fuel stability for storage; at least some unsaturated hydrocarbons can react with air, thereby degrading the fuel quality.

Following deoxygenation, a preliminary product can be recovered. In some embodiments, the preliminary product is further processed. For example, the preliminary product may be fractionated, such as by fractional distillation or other suitable means, to produce one or more hydrocarbon fractions. The hydrocarbon fractions are free of trace metals.

In some embodiments, the preliminary product is a mixture comprising hydrocarbons in a liquid state and trace amounts of Pt, W, Mo, and/or Zr. In one embodiment, the mixture comprises a) hydrocarbons in a liquid state and b) at least one part per million (ppm) Pt, at least 1 ppm W, Mo, or a combination thereof, and/or at least 1 ppm Zr. In another embodiment, the mixture comprises a) hydrocarbons in a liquid state and b) at least 1 ppm Pt, at least 10 ppm W, Mo, or a combination thereof, and/or at least 10 ppm Zr. In another embodiment, the mixture comprises a) hydrocarbons in a liquid state and b) at least 1 ppm Pt, at least 10 ppm W, Mo, or a combination thereof, and/or at least 50 ppm Zr.

In other embodiments, the preliminary product is a mixture comprising hydrocarbons in a liquid state and Pt, Ge, and/or Sn. In one embodiment, the mixtures comprise a) hydrocarbons in a liquid state and b) at least 1 ppm Pt and/or at least 0.5 ppm Ge and/or at least 0.5 ppm Sn. For example, a mixture may include a) liquid hydrocarbons, b) at least 1 ppm Pt, and c) at least 1 ppm Ge or at least 1 ppm Sn or at least 1 ppm of a combination of Ge and Sn. In another embodiment, the mixtures comprise a) hydrocarbons in a liquid state and b) at least 5 ppm Pt and/or at least 0.5 ppm Ge and/or at least 0.5 ppm Sn.

Embodiments of the disclosed catalysts and methods for using the catalysts produce compositions and mixtures suitable for use as a renewable diesel fuel. The compositions and mixtures are primarily comprised of hydrocarbons produced by fatty acid deoxygenation, primarily via decarboxylation. In some embodiments, the mixtures comprise greater than 70%, greater than 80%, or greater than 90% C15-C17 hydrocarbons.

V. EXAMPLES

Example 1

High-Throughput Catalyst Screening

Catalyst Preparation:

Most of the catalysts tested in the high throughput screening were commercially available or prepared as described below. All extrudate or engineered-form catalysts were ground to a 30-100 mesh size before screening. Powder catalysts were used as obtained.

A few catalysts were prepared using high-throughput robotics for screening purposes. These catalysts were $WO_3$/Pt on $ZrO_2$ supports, and were prepared by incipient wetness impregnation. The $ZrO_2$ supports were calcined at 450° C. for 6 hours and sized to 30-80 mesh. The supports were added to quartz vials and placed on a vertical shaker on a liquid handling robot. The vertical shaker allowed the supports to be agitated during impregnation. Metal impregnation of the supports was a two step process. Bulk aqueous solutions of ammonium metatungstate hydrate and platinum ethanolamine (Pt-A) were prepared and placed on a liquid handling robot. Two sets of metal solution were then robotically prepared from these bulk solutions. The first set was a range of tungsten solutions, the second a range of platinum solutions. The tungsten solutions were added first to the supports, dropwise, while agitating the solids. Once the supports were dried, agitation was stopped. The supports were transferred to a furnace and calcined at 850° C. for 2 hours in air. The second impregnation was done with the platinum solutions. Once dried, the supports were calcined at 450° C. for 2 h in air. The finished catalysts were tested as described in the general high throughput screening procedure.

Catalyst Screening:

High throughput catalyst screening for the decarboxylation of free fatty acids was conducted using a high-temperature batch 24-well reactor made by Symyx. The 24 vials were loaded with catalyst and free fatty acid feedstock, in a 2 to 1 weight ratio. The vials were sealed under a nitrogen atmosphere with a Kapton®-backed graphite sheet. Once loaded into the high temperature reactor and sealed, the reactor headspace was pressurized with 40 psig nitrogen to discourage leaking of the individual vials. The reactor was placed into a stationary furnace and heated to 300° C. for 4 hours. After completion the reactor was removed from the furnace and allowed to cool to room temperature.

Analytical work-up of each sample involved BSTFA/pyridine derivatization, which was carried out as follows. The sample was diluted with chloroform containing 1 mg/mL heptadecanoic acid as an internal standard, mixed well, and centrifuged. A 500 μL aliquot was removed and added to a 2 mL vial. To this second vial was added 500 μL of N,O-bis [trimethylsilyl]trifluoroacetamide (BSTFA) and 500 μL of pyridine. The vial was mixed well, capped, and heated to 70° C. for 1 hour. GC-FID and GC-MS were utilized for quantification and identification of the product mixture. Analysis was performed using a DB5-HT column (15 m×250 μm×0.10 μm nominal film thickness). The injector was held at 340° C. with a 150:1 split. With a flow rate of 2 mL/min $H_2$, the column was heated from 80° C. to 350° C. at 25° C./min and then held at 350° C. for 9.2 min.

Effect of Metals on Palmitic Acid Decarboxylation:

The catalysts shown in Table 1 were screened to determine the effect of various metals on palmitic acid deoxygenation via decarboxylation. Some of the catalyst compositions yielded more symmetrical ketone dimers, $CH_3$—$(CH_2)_{14}$—C=O—$(CH_2)_{14}$—$CH_3$, via deoxygenation than hydrocarbon product. In general the catalysts giving symmetrical ketone dimers were of a basic metal oxide nature such as manganese dioxide. The ketone would require additional deoxygenation/cracking to provide hydrocarbon product.

Due to the screening nature of these tests and use of high throughput technology, mass recovery data are provided as an indication of the potential integrity of the sample during testing. A low mass recovery is indicative of an individual vial leak, and data may not be of equal quality to data with high mass recovery since the more volatile components, generally the hydrocarbon product, would be more prone to vaporization and leaking from the individual vial. The results are depicted graphically in FIG. 1. In general, superior results were obtained when catalysts contained platinum metal.

Included in the testing of more than 100 catalyst samples were some $WO_3/Pt/ZrO_2$ catalysts. These catalysts were initially thought to likely be unsuitable for decarboxylation because they are acid catalysts, and acid catalysts have been reported to build up coke deposits during hydrocarbon processing and lose activity. Nonetheless, $WO_3/Pt/ZrO_2$ catalysts were included in the high-throughput screening simply because they were available. Surprisingly, the $WO_3/Pt/ZrO_2$ catalysts showed an unexpectedly high conversion percentage compared to either $Pt/ZrO_2$, or $WO_3/ZrO_2$ catalysts. As shown in Table 1, $Pt/ZrO_2$ catalysts produced conversions of 28-60%. A $WO_3/ZrO_2$ catalyst produced only 44% conversion. However, the $WO_3/Pt/ZrO_2$ catalysts produced 68-100% conversion. It is believed that the presence of Pt may make the catalyst "self-cleaning," which aids in maintaining activity.

TABLE 1

| | Catalyst | Composition Details | Mass Recovery | Conversion | Pentadecane Yield | Ketone Yield | Others Yield |
|---|---|---|---|---|---|---|---|
| 1 | Pt/Ge/C | 5% Pt/Ge on carbon powder | 61.0 | 100.0 | 107.5 | 0.0 | 3.4 |
| 2 | Pt/C | * | 48.9 | 83.2 | 33.4 | 0.0 | 9.4 |
| 3 | Pt/Sn/C | 1.5% Pt/ 0.15% Sn on carbon powder | 57.7 | 85.7 | 31.1 | 0.3 | 6.9 |
| 4 | Pt/C | 5% Pt on Norit ROX acid-washed carbon | 46.3 | 100.0 | 16.3 | 0.0 | 3.1 |
| 5 | Pt/Ru/C | 1.5% Pt/ 0.15% Ru on carbon powder | 83.8 | 58.6 | 15.8 | 0.2 | 10.6 |
| 6 | Pt(S)/C | 3% Pt (sulphited) on carbon powder | 76.5 | 26.8 | 1.1 | 0.0 | 8.4 |
| 7 | Pt/Al2O3 | 2% Pt on Al2O3 | 80.4 | 70.2 | 29.5 | 3.7 | 7.8 |
| 8 | Pt/ZrO2 | 5% Pt on ZrO2 | 93.4 | 59.8 | 51.8 | 0.3 | 0.5 |
| 9 | Pt/TiO2 | 5% Pt on TiO2 | 78.9 | 99.5 | 82.7 | 0.0 | 16.3 |
| 10 | Pt/Al2O3 | 5% Pt on Al2O3 | 90.6 | 93.8 | 63.1 | 0.4 | 4.3 |
| 11 | WO3/Pt/ZrO2 | 12% WO3/ 0.7% Pt on ZrO2 | 90.0 | 88.8 | 54.4 | 0.9 | 27.9 |
| 12 | WO3/Pt/ZrO2 | 12% WO3/ 0.7% Pt on ZrO2 | 64.6 | 97.2 | 35.1 | 0.2 | 17.6 |
| 13 | Pt/ZrO2 | 0.7% Pt on ZrO2 | 93.5 | 30.6 | 16.9 | 0.2 | 7.1 |
| 14 | Pt/ZrO2 | 0.7% Pt on ZrO2 | 92.8 | 29.7 | 15.5 | 0.4 | 11.5 |
| 15 | Pt/ZrO2 | 0.7% Pt on ZrO2 | 92.5 | 29.4 | 16.3 | 0.4 | 7.5 |
| 16 | Pt/ZrO2 | 0.7% Pt on ZrO2 | 93.3 | 28.4 | 12.0 | 1.1 | 12.8 |
| 17 | MoO3/Pt/ZrO2 | 7.8% MoO3/ 0.7% Pt on ZrO2 | 88.7 | 57.8 | 34.6 | 0.5 | 10.6 |

TABLE 1-continued

| | Catalyst | Composition Details | Mass Recovery | Conversion | Pentadecane Yield | Ketone Yield | Others Yield |
|---|---|---|---|---|---|---|---|
| 18 | MoO3/Pt/ZrO2 | 7.8% MoO3/ 0.7% Pt on ZrO2 | 92.4 | 42.0 | 21.7 | 1.6 | 4.3 |
| 19 | WO3/Pt/ZrO2 | 12% WO3/ 0.7% Pt on ZrO2 | 70.7 | 99.6 | 42.1 | 0.2 | 10.8 |
| 20 | WO3/Pt/ZrO2 | 12% WO3/ 0.7% Pt on ZrO2 | 82.0 | 93.0 | 37.8 | 0.5 | 11.4 |
| 21 | Pt/ZrO2 | 0.7% Pt on ZrO2 | 81.8 | 36.4 | 0.0 | 0.3 | 7.9 |
| 22 | WO3/Pt/ZrO2 | 12% WO3/ 0.7% Pt on ZrO2 | 64.0 | 100.0 | 27.8 | 0.0 | 8.4 |
| 23 | WO3/Pt/ZrO2 | 12% WO3/ 0.7% Pt on ZrO2 | 78.4 | 100.0 | 41.7 | 0.0 | 13.5 |
| 24 | WO3/Pt/ZrO2 | 12% WO3/ 0.7% Pt on ZrO2 | 70.6 | 92.6 | 25.1 | 0.0 | 8.9 |
| 25 | WO3/Pt/ZrO2 | 12% WO3/ 0.7% Pt on ZrO2 by MVD | 82.6 | 82.5 | 32.6 | 0.0 | 13.0 |
| 26 | Pt/TiO2 | 0.7% Pt on TiO2 (900C calcine) | 93.1 | 13.7 | 0.0 | 0.0 | 0.2 |
| 27 | Pt/TiO2 | 0.7% Pt on TiO2 (450C calcine) | 72.1 | 68.1 | 0.0 | 7.7 | 8.0 |
| 28 | Pt/TiO2 | 0.7% Pt on TiO2 (uncalcined) | 79.8 | 72.5 | 15.0 | 0.0 | 13.5 |
| 29 | WO3/Pt/ZrO2 | 12% WO3/ 0.7% Pt on ZrO2 | 75.3 | 100.0 | 56.0 | 0.2 | 28.8 |
| 30 | WO3/Pt/ZrO2 | 12% WO3/ 0.7% Pt on ZrO2 | 81.8 | 98.4 | 44.7 | 0.3 | 31.7 |
| 31 | WO3/Pt/ZrO2 | 12% WO3/ 0.7% Pt on ZrO2 | 78.6 | 100.0 | 43.0 | | |
| 32 | WO3/Pt/ZrO2 | 12% WO3/ 0.7% Pt on ZrO2 | 78.0 | 68.3 | 37.5 | 0.2 | 21.7 |
| 33 | WO3/Pt/ZrO2 | 12% WO3/ 0.7% Pt on ZrO2 | 65.6 | 100.0 | 32.8 | 0.0 | 10.8 |
| 34 | WO3/Pt/ZrO2 | 12% WO3/ 0.7% Pt on ZrO2 | 62.5 | 100.0 | 20.4 | | |
| 35 | Pt/Al2O3 | 3% Pt on Al2O3 | 81.9 | 72.4 | 2.3 | 4.4 | 5.0 |
| 36 | Pt/Al2O3 | 3% Pt on Al2O3 | 83.0 | 82.6 | 0.3 | 2.2 | 2.7 |
| 37 | Pt/Al2O3 | 2% Pt on Al2O3 | 56.9 | 86.3 | 10.6 | 1.8 | 4.3 |
| 38 | Re/X5327 C | Re on Engelhard X5327 C | 88.2 | 78.9 | 52.3 | 3.7 | 11.9 |
| 39 | Escat 140 | 5.0% Pd on carbon | 69.7 | 78.2 | 47.6 | 0.0 | 6.8 |
| 40 | Re/C | 5% Re on Engelhard X5327 | 84.8 | 63.4 | 26.7 | 5.2 | 8.4 |
| 41 | Ru/Ni | | 78.6 | 88.9 | 23.1 | 3.3 | 8.4 |
| 42 | G-69B | 50% Ni on SiO2 | 77.0 | 80.7 | 12.0 | 1.5 | 10.6 |
| 43 | Ni/Al2O3 | | 91.0 | 63.9 | 11.8 | 1.3 | 7.4 |
| 44 | Ni/Al2O3 | 46% Ni on Al2O3 | 85.3 | 85.8 | 8.4 | 2.7 | 6.1 |
| 45 | Cu/Ni | 1% Cu on BASF G1-80 Ni | 86.2 | 85.2 | 7.7 | 2.2 | 10.4 |
| 46 | Pd/Al2O3 | | 97.2 | 28.2 | 4.4 | 3.3 | 2.9 |
| 47 | Ru/Ni | 1% Ru on BASF G1-80 Ni | 81.7 | 94.8 | 4.4 | 1.1 | 4.5 |

TABLE 1-continued

| | Catalyst | Composition Details | Mass Recovery | Conversion | Pentadecane Yield | Ketone Yield | Others Yield |
|---|---|---|---|---|---|---|---|
| 48 | Ni/SiO2 | 55% Ni on SiO2 | 70.0 | 93.3 | 4.3 | 0.7 | 6.7 |
| 49 | Ru/TiO2 | | 94.6 | 36.5 | 3.8 | 6.5 | 4.8 |
| 50 | Co-1079 | Co on SiO2 | 90.9 | 95.0 | 2.4 | 6.7 | 7.7 |
| 51 | Ni/C | 5% Ni on Norit ROX | 87.3 | 42.0 | 2.1 | 0.0 | 7.5 |
| 52 | Pd/C | 0.5% Pd on carbon (Englehard) | 93.4 | 26.6 | 1.4 | 0.0 | 3.2 |
| 53 | MnO2 10200-133-3 | | 86.2 | 100.0 | 0.0 | 6.9 | 3.5 |
| 54 | CaO | | 99.2 | 100.0 | 0.0 | 0.0 | 0.0 |
| 55 | Co-0127 | 33% Co on Keiselguhr | 90.1 | 100.0 | 0.0 | 8.3 | 2.9 |
| 56 | Co-0138 | | 93.8 | 100.0 | 0.0 | 1.0 | 0.5 |
| 57 | G-9 | Cu/Mn | 89.6 | 100.0 | 0.0 | 5.8 | 0.8 |
| 58 | C61-1 | CuO/ZnO | 94.1 | 100.0 | 0.0 | 0.0 | 0.5 |
| 59 | Ag2O/MnO2 | | 91.1 | 99.6 | 0.0 | 16.8 | 4.6 |
| 60 | Co-0138 | | 96.1 | 99.3 | 0.0 | 7.3 | 1.7 |
| 61 | MnO2-activated | | 83.8 | 98.8 | 0.0 | 38.4 | 6.5 |
| 62 | γ-MnO2 | | 88.6 | 98.4 | 0.0 | 44.5 | 6.5 |
| 63 | Co—Re/Al2O3 | Co/Re on Al2O3 | 85.6 | 95.0 | 0.0 | 5.2 | 17.9 |
| 64 | Co—Re/Al2O3 | | 96.0 | 93.4 | 0.0 | 3.4 | 1.4 |
| 65 | Pentasil | Sud-Chemie zeolite | 66.3 | 91.8 | 0.0 | 0.2 | 5.1 |
| 66 | G-62 | 33-45% CoO/SiO2 | 89.6 | 88.0 | 0.0 | 4.1 | 10.4 |
| 67 | Proc. Montmorillonite | | 79.4 | 88.0 | 0.0 | 1.0 | 0.9 |
| 68 | 1% Cu/Ni | | 93.3 | 86.1 | 0.0 | 4.0 | 3.2 |
| 69 | FeO(OH) | | 94.9 | 76.8 | 0.0 | 14.6 | 1.5 |
| 70 | Grade F-100 | | 89.8 | 74.5 | 0.0 | 0.0 | 38.3 |
| 71 | Grade F-1 | | 86.8 | 73.8 | 0.0 | 0.1 | 2.5 |
| 72 | Davicat ZL 5151 | WR Grace synthetic zeolite | 85.3 | 58.8 | 0.0 | 0.4 | 6.4 |
| 73 | Co/Al2O3 | 8% Co on Al2O3 | 95.2 | 58.2 | 0.0 | 5.4 | 1.5 |
| 74 | Grade F-4 | | 86.8 | 57.0 | 0.0 | 0.0 | 20.8 |
| 75 | CoS/MoS | | 96.2 | 55.8 | 0.0 | 5.8 | 0.0 |
| 76 | Ru/TiO2 | 5% Ru on TiO2 | 79.7 | 52.2 | 0.0 | 5.2 | 13.2 |
| 77 | WO3/ZrO2 | | 99.7 | 44.5 | 0.0 | 0.4 | 0.4 |
| 78 | Co/Al2O3 | | 88.1 | 44.2 | 0.0 | 5.6 | 5.9 |
| 79 | CBV 720 | Zeolyst International zeolite | 94.3 | 44.0 | 0.0 | 0.2 | 3.8 |
| 80 | Pd/Al2O3 | 0.5% Pd on Al2O3 | 89.9 | 36.2 | 0.0 | 7.0 | 6.6 |
| 81 | Pd/C | 0.5% Pd on carbon (Degussa) | 89.9 | 35.5 | 0.0 | 0.0 | 1.5 |
| 82 | Rh/C | 5% Rh on carbon powder (Johnson-Matthey) | 68.1 | 35.3 | 0.0 | 0.0 | 1.1 |
| 83 | Rh/Al2O3 | 0.5% Rh on Al2O3 | 95.6 | 33.1 | 0.0 | 2.5 | 1.2 |
| 84 | Rh/Al2O3 | | 97.4 | 28.5 | 0.0 | 3.3 | 0.4 |
| 85 | 6757-49-1 | | 83.7 | 28.1 | 0.0 | 5.2 | 2.1 |
| 86 | ALZ5C-4D | | 95.7 | 28.0 | 0.0 | 0.1 | 13.3 |
| 87 | Nb2O5/Al2O3 | | 98.6 | 26.5 | 0.0 | 4.0 | 62.4 |
| 88 | Ru/C | 0.7% Ru on carbon | 94.1 | 26.1 | 0.0 | 0.0 | 3.7 |
| 89 | Ni/Re/ZrO2 | 4.9% Ni/0.7% Re on ZrO2 | 88.7 | 25.9 | 0.0 | 0.3 | 7.6 |
| 90 | P25 | | 98.5 | 25.6 | 0.0 | 4.2 | 0.6 |
| 91 | Ag2O/CuO | | 91.1 | 21.7 | 0.0 | 0.4 | 15.6 |
| 92 | G-89 | Cu Cr/Mn | 90.0 | 21.6 | 0.0 | 0.3 | 1.1 |
| 93 | Cr-0211T | Cr/ZrO2 on alumina | 94.8 | 18.4 | 0.0 | 2.2 | 0.0 |

TABLE 1-continued

| | Catalyst | Composition Details | Mass Recovery | Conversion | Pentadecane Yield | Ketone Yield | Others Yield |
|---|---|---|---|---|---|---|---|
| 94 | Ni/Re/TiO2 | 4.9% Ni/1% Re on rutile TiO2 | 93.7 | 16.0 | 0.0 | 0.6 | 6.7 |
| 95 | Rh/Al2O3 | 1% Rh on Al2O3 | 94.8 | 14.1 | 0.0 | 0.6 | 8.4 |
| 96 | Pd/C | 1.5% Pd on carbon (G277) | 90.2 | 14.0 | 0.0 | 0.0 | 1.6 |
| 97 | MELCAT 880/01 | | 94.5 | 13.7 | 0.0 | 4.9 | 4.5 |
| 98 | MoO3/ZrO2 | | 98.6 | 10.5 | 0.0 | 6.7 | 0.9 |
| 99 | G-22/2 | 47% CuO/34% Cr2O3/6% BaO on SiO2 | 97.4 | 10.2 | 0.0 | 0.2 | 1.4 |
| 100 | Rh/Al2O3 | | 98.8 | 6.5 | 0.0 | 0.8 | 2.4 |
| 101 | Cr-0211T | | 99.1 | 6.4 | 0.0 | 1.7 | 0.6 |
| 102 | Rh/C | 5% Rh on carbon powder (Engelhard) | 80.3 | 5.2 | 0.0 | 0.0 | 1.6 |
| 103 | ZrO2/SO4 | | 94.7 | 5.2 | 0.0 | 3.9 | 0.9 |
| 104 | ZrO2/WO3 | | 99.5 | 2.8 | 0.0 | 2.6 | 1.0 |
| 105 | T-869 Si/Al | | 99.4 | 1.8 | 0.0 | 1.1 | 0.6 |
| 106 | Zr-0404 | | 99.4 | 1.3 | 0.0 | 1.4 | 0.3 |
| 107 | Shot Coke | | 97.8 | 1.2 | 0.0 | 0.0 | 0.4 |

* Composition details are not available for some commercially-obtained catalysts.

Figure 2:
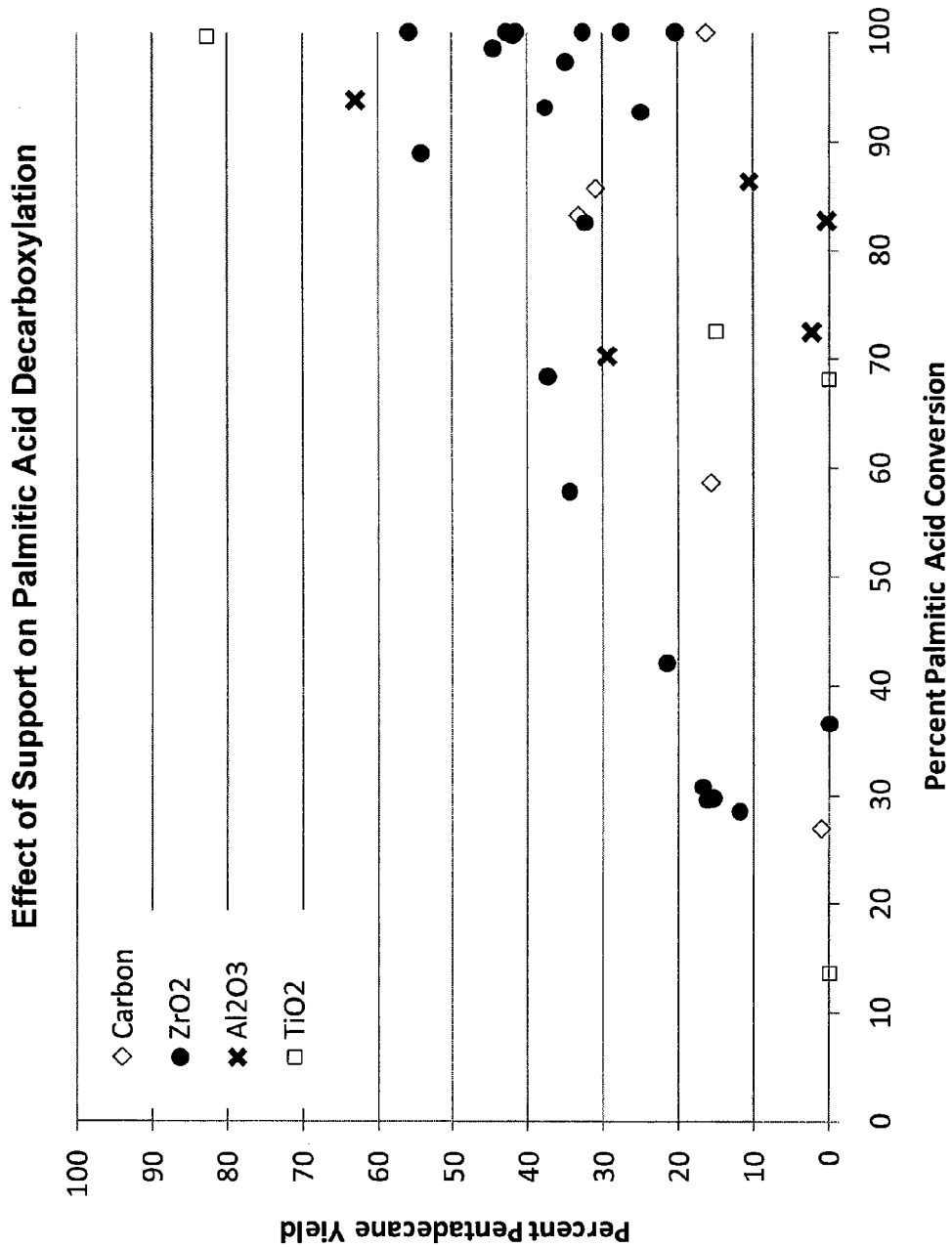
FIG. 2 is a graph of percent pentadecane yield versus percent palmitic acid conversion for various catalyst supports.

Effect of Support Material on Palmitic Acid Decarboxylation:

Four support materials (carbon, $ZrO_2$, $Al_2O_3$, and $TiO_2$) were evaluated for their effect on palmitic acid decarboxylation. The results are shown in Table 2 and FIG. 2. Complete conversion of palmitic acid was obtained with various catalysts on carbon, $ZrO_2$, $Al_2O_3$, and $TiO_2$ supports.

TABLE 2

| | Catalyst | Composition Details | Mass Recovery | Conversion | Pentadecane Yield | Ketone Yield | Others Yield |
|---|---|---|---|---|---|---|---|
| 1 | Pt/Ge/C | 5% Pt/Ge on carbon powder | 61.0 | 100.0 | 107.5 | 0.0 | 3.4 |
| 2 | Pt/C | | 48.9 | 83.2 | 33.4 | 0.0 | 9.4 |
| 3 | Pt/Sn/C | 1.5% Pt/0.15% Sn on carbon powder | 57.7 | 85.7 | 31.1 | 0.3 | 6.9 |
| 4 | Pt/C | 5% Pt on Norit ROX | 46.3 | 100.0 | 16.3 | 0.0 | 3.1 |
| 5 | Pt/Ru/C | 1.5% Pt/0.15% Ru on carbon powder | 83.8 | 58.6 | 15.8 | 0.2 | 10.6 |
| 6 | Pt(S)/C | 3% Pt (sulphited) on carbon powder | 76.5 | 26.8 | 1.1 | 0.0 | 8.4 |
| 7 | WO3/Pt/ZrO2 | 12% WO3/0.7% Pt on ZrO2 | 90.0 | 88.8 | 54.4 | 0.9 | 27.9 |
| 8 | WO3/Pt/ZrO2 | 12% WO3/0.7% Pt on ZrO2 | 64.6 | 97.2 | 35.1 | 0.2 | 17.6 |
| 9 | Pt/ZrO2 | 0.7% Pt on ZrO2 | 93.5 | 30.6 | 16.9 | 0.2 | 7.1 |
| 10 | Pt/ZrO2 | 0.7% Pt on ZrO2 | 92.8 | 29.7 | 15.5 | 0.4 | 11.5 |
| 11 | Pt/ZrO2 | 0.7% Pt on ZrO2 | 92.5 | 29.4 | 16.3 | 0.4 | 7.5 |
| 12 | Pt/ZrO2 | 0.7% Pt on ZrO2 | 93.3 | 28.4 | 12.0 | 1.1 | 12.8 |
| 13 | MoO3/Pt/ZrO2 | 7.8% MoO3/0.7% Pt on ZrO2 | 88.7 | 57.8 | 34.6 | 0.5 | 10.6 |
| 14 | MoO3/Pt/ZrO2 | 7.8% MoO3/0.7% Pt on ZrO2 | 92.4 | 42.0 | 21.7 | 1.6 | 4.3 |
| 15 | WO3/Pt/ZrO2 | 12% WO3/0.7% Pt on ZrO2 | 70.7 | 99.6 | 42.1 | 0.2 | 10.8 |
| 16 | WO3/Pt/ZrO2 | 12% WO3/0.7% Pt on ZrO2 | 82.0 | 93.0 | 37.8 | 0.5 | 11.4 |
| 17 | Pt/ZrO2 | 0.7% Pt on ZrO2 | 81.8 | 36.4 | 0.0 | 0.3 | 7.9 |
| 18 | WO3/Pt/ZrO2 | 12% WO3/0.7% Pt on ZrO2 | 64.0 | 100.0 | 27.8 | 0.0 | 8.4 |
| 19 | WO3/Pt/ZrO2 | 12% WO3/0.7% Pt on ZrO2 | 78.4 | 100.0 | 41.7 | 0.0 | 13.5 |
| 20 | WO3/Pt/ZrO2 | 12% WO3/0.7% Pt on ZrO2 | 70.6 | 92.6 | 25.1 | 0.0 | 8.9 |

TABLE 2-continued

| Catalyst | Composition Details | Mass Recovery | Conversion | Pentadecane Yield | Ketone Yield | Others Yield |
|---|---|---|---|---|---|---|
| 21 WO3/Pt/ZrO2 | 12% WO3/0.7% Pt on ZrO2 by MVD | 82.6 | 82.5 | 32.6 | 0.0 | 13.0 |
| 22 WO3/Pt/ZrO2 | 12% WO3/0.7% Pt on ZrO2 | 75.3 | 100.0 | 56.0 | 0.2 | 28.8 |
| 23 WO3/Pt/ZrO2 | 12% WO3/0.7% Pt on ZrO2 | 81.8 | 98.4 | 44.7 | 0.3 | 31.7 |
| 24 WO3/Pt/ZrO2 | 12% WO3/0.7% Pt on ZrO2 | 78.6 | 100.0 | 43.0 | | |
| 25 WO3/Pt/ZrO2 | 12% WO3/0.7% Pt on ZrO2 | 78.0 | 68.3 | 37.5 | 0.2 | 21.7 |
| 26 WO3/Pt/ZrO2 | 12% WO3/0.7% Pt on ZrO2 | 65.6 | 100.0 | 32.8 | 0.0 | 10.8 |
| 27 WO3/Pt/ZrO2 | 12% WO3/0.7% Pt on ZrO2 | 62.5 | 100.0 | 20.4 | | |
| 28 Pt/Al2O3 | 2% Pt on Al2O3 | 80.4 | 70.2 | 29.5 | 3.7 | 7.8 |
| 29 Pt/Al2O3 | 5% Pt on Al2O3 | 90.6 | 93.8 | 63.1 | 0.4 | 4.3 |
| 30 Pt/Al2O3 | 3% Pt on Al2O3 | 81.9 | 72.4 | 2.3 | 4.4 | 5.0 |
| 31 Pt/Al2O3 | 3% Pt on Al2O3 | 83.0 | 82.6 | 0.3 | 2.2 | 2.7 |
| 32 Pt/Al2O3 | 2% Pt on Al2O3 | 56.9 | 86.3 | 10.6 | 1.8 | 4.3 |
| 33 Pt/TiO2 | 5% Pt on TiO2 | 78.9 | 99.5 | 82.7 | 0.0 | 16.3 |
| 34 Pt/TiO2 | 0.7% Pt on TiO2 (900C calcine) | 93.1 | 13.7 | 0.0 | 0.0 | 0.2 |
| 35 Pt/TiO2 | 0.7% Pt on TiO2 (450C calcine) | 72.1 | 68.1 | 0.0 | 7.7 | 8.0 |
| 36 Pt/TiO2 | 0.7% Pt on TiO2 (uncalcined) | 79.8 | 72.5 | 15.0 | 0.0 | 13.5 |
| 37 Pt/ZrO2 | 5% Pt on ZrO2 | 93.4 | 59.8 | 51.8 | 0.3 | 0.5 |

Figure 3:
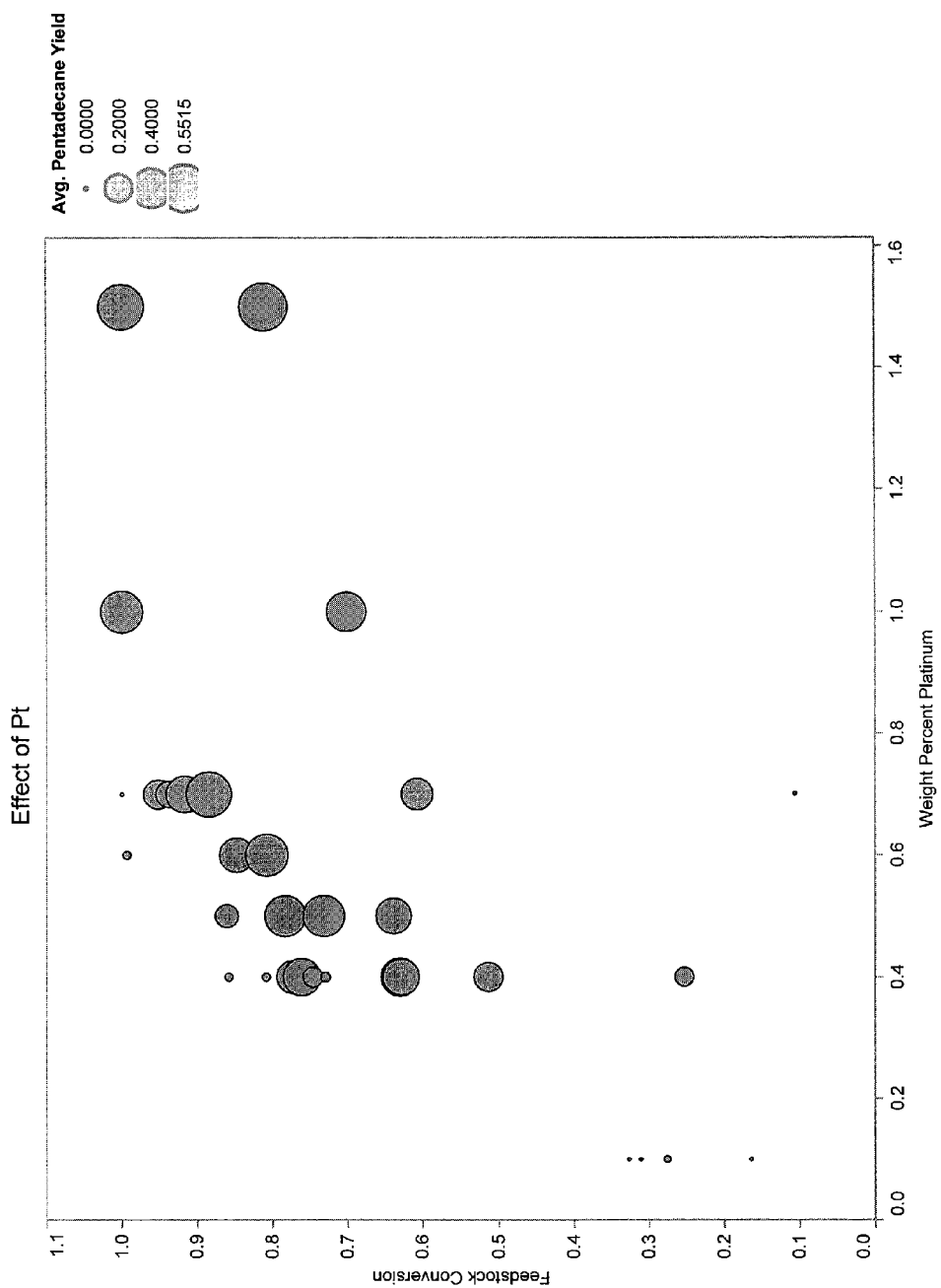
FIG. 3 is a graph of palmitic acid feedstock conversion versus percent platinum loading for $WO_3/Pt/ZrO_2$ catalysts.
Figure 4:
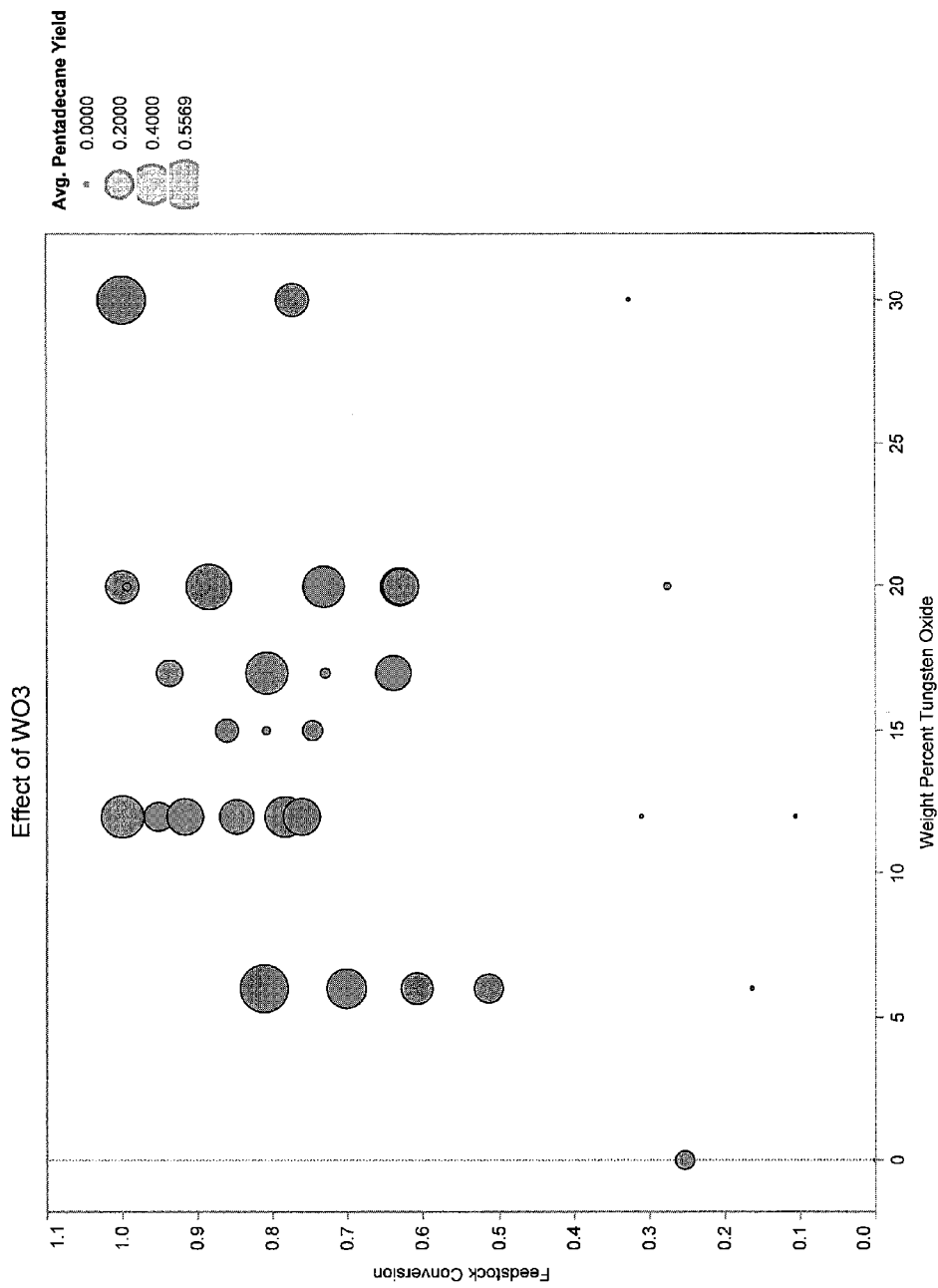
FIG. 4 is a graph of palmitic acid feedstock conversion versus percent $WO_3$ loading for $WO_3/Pt/ZrO_2$ catalysts.

Effect of Pt and WO₃ Concentrations on Palmitic Acid Decarboxylation:

A WO₃/Pt/ZrO₂ catalyst formulation was selected for further development. The effects of percent Pt and WO₃ were evaluated to determine suitable combinations with a desirable balance between palmitic acid conversion and pentadecane yield and metal loading. Catalysts ranging from 6-30 wt % WO₃ and 0.1-1.5 wt % Pt, relative to total catalyst mass were prepared and evaluated. Unexpectedly superior results were obtained with catalysts of low metal loading, having 6-12 wt % WO₃ and 0.4-0.7 wt % Pt. Lower metal loading reduces the value/cost of the catalyst, especially important for expensive metals such as Pt. The results are shown in Table 3 and FIGS. 3 and 4. In FIG. 3, the amount of conversion reached a plateau around 0.7 wt % Pt, where the addition of more platinum did not improve the amount of conversion of the feedstock. A similar plateau can be seen in FIG. 4; starting at 12% WO₃. The addition of more tungsten oxide did not improve the amount of conversion. In addition a significantly higher yield of pentadecane was not noted when the amounts of either metal were increased beyond 12% WO₃ and/or 0.7% Pt.

Due to the screening nature of the tests and use of high throughput technology, mass recovery data provides an indication of the potential integrity of the sample during testing. Data scatter is attributable to running several different batch tests. Variances in mass balance produce more scatter. A low mass recovery is indicative of an individual vial leak, and data may not be of equal quality to data with high mass recovery since the more volatile components would be more prone to vaporization and leaking from the individual vial.

TABLE 3

| Catalyst | Pt % | WO3 % | Mass Recovery | Conversion | Pentadecane Yield | Others Yield |
|---|---|---|---|---|---|---|
| 1.5% Pt/30% WO3 | 1.5 | 30 | 89.3% | 100.0% | 64.7% | 11.6% |
| 1% Pt/30% WO3 | 1 | 30 | 76.5% | 100.0% | 46.7% | 8.7% |
| 1.5% Pt/12% WO3 | 1.5 | 12 | 74.1% | 100.0% | 43.6% | 11.5% |
| 1.5% Pt/20% WO3 | 1.5 | 20 | 73.6% | 100.0% | 41.2% | 9.7% |
| 1% Pt/20% WO3 | 1 | 20 | 71.4% | 100.0% | 37.4% | 10.0% |
| 0.7% Pt/20% WO3 | 0.7 | 20 | 41.1% | 100.0% | 0.0% | 0.8% |
| 0.6% Pt/20% WO3 | 0.6 | 20 | 46.9% | 99.3% | 1.4% | 1.6% |
| 0.7% Pt/12% WO3 | 0.7 | 12 | 65.0% | 95.2% | 20.2% | 8.1% |
| 0.7% Pt/17% WO3 | 0.7 | 17 | 65.2% | 93.7% | 16.6% | 7.2% |
| 0.7% Pt/12% WO3 | 0.7 | 12 | 80.4% | 91.7% | 32.2% | 13.1% |
| 0.7% Pt/20% WO3 | 0.7 | 20 | 91.4% | 88.5% | 49.3% | 14.9% |
| 0.5% Pt/15% WO3 | 0.5 | 15 | 67.4% | 86.1% | 12.3% | 6.7% |
| 0.4% Pt/12% WO3 | 0.4 | 12 | 57.8% | 85.8% | 1.4% | 3.0% |
| 0.6% Pt/12% WO3 | 0.6 | 12 | 80.9% | 84.8% | 28.5% | 10.7% |
| 1.5% Pt/6% WO3 | 1.5 | 6 | 92.0% | 81.2% | 55.2% | 10.9% |
| 0.4% Pt/15% WO3 | 0.4 | 15 | 60.8% | 80.9% | 1.4% | 3.6% |
| 0.6% Pt/17% WO3 | 0.6 | 17 | 92.1% | 80.8% | 42.6% | 12.0% |
| 0.5% Pt/12% WO3 | 0.5 | 12 | 92.3% | 78.4% | 39.9% | 13.9% |
| 0.4% Pt/30% WO3 | 0.4 | 30 | 84.5% | 77.3% | 26.0% | 10.0% |
| 0.4% Pt/12% WO3 | 0.4 | 12 | 92.4% | 76.2% | 33.0% | 14.4% |
| 0.4% Pt/15% WO3 | 0.4 | 15 | 73.9% | 74.7% | 9.1% | 8.0% |
| 0.5% Pt/20% WO3 | 0.5 | 20 | 93.0% | 73.2% | 40.7% | 12.3% |

TABLE 3-continued

| Catalyst | Pt % | WO3 % | Mass Recovery | Conversion | Pentadecane Yield | Others Yield |
|---|---|---|---|---|---|---|
| 0.4% Pt/17% WO3 | 0.4 | 17 | 64.7% | 73.0% | 2.1% | 4.1% |
| 1% Pt/6% WO3 | 1 | 6 | 93.0% | 70.2% | 37.0% | 9.6% |
| 0.5% Pt/17% WO3 | 0.5 | 17 | 93.1% | 64.0% | 30.1% | 10.4% |
| 0.4% Pt/20% WO3 | 0.4 | 20 | 93.8% | 63.1% | 34.9% | 11.5% |
| 0.4% Pt/20% WO3 | 0.4 | 20 | 93.9% | 63.0% | 31.4% | 11.5% |
| 0.7% Pt/6% WO3 | 0.7 | 6 | 89.5% | 60.8% | 23.7% | 8.8% |
| 0.4% Pt/6% WO3 | 0.4 | 6 | 94.9% | 51.3% | 20.0% | 9.6% |
| 0.1% Pt/30% WO3 | 0.1 | 30 | 86.0% | 32.6% | 0.0% | 3.3% |
| 0.1% Pt/12% WO3 | 0.1 | 12 | 92.9% | 31.0% | 0.0% | 5.3% |
| 0.1% Pt/20% WO3 | 0.1 | 20 | 97.0% | 27.5% | 1.0% | 7.5% |
| 0.4% Pt | 0.4 | 0 | 97.5% | 25.3% | 8.1% | 6.4% |
| 0.1% Pt/6% WO3 | 0.1 | 6 | 98.5% | 16.4% | 0.0% | 4.7% |
| 0.7% Pt/12% WO3 | 0.7 | 12 | 98.8% | 10.6% | 0.0% | 1.8% |
| 30% WO3 | 0 | 30 | 99.3% | −1.6% | 0.0% | 1.6% |

Figure 5:
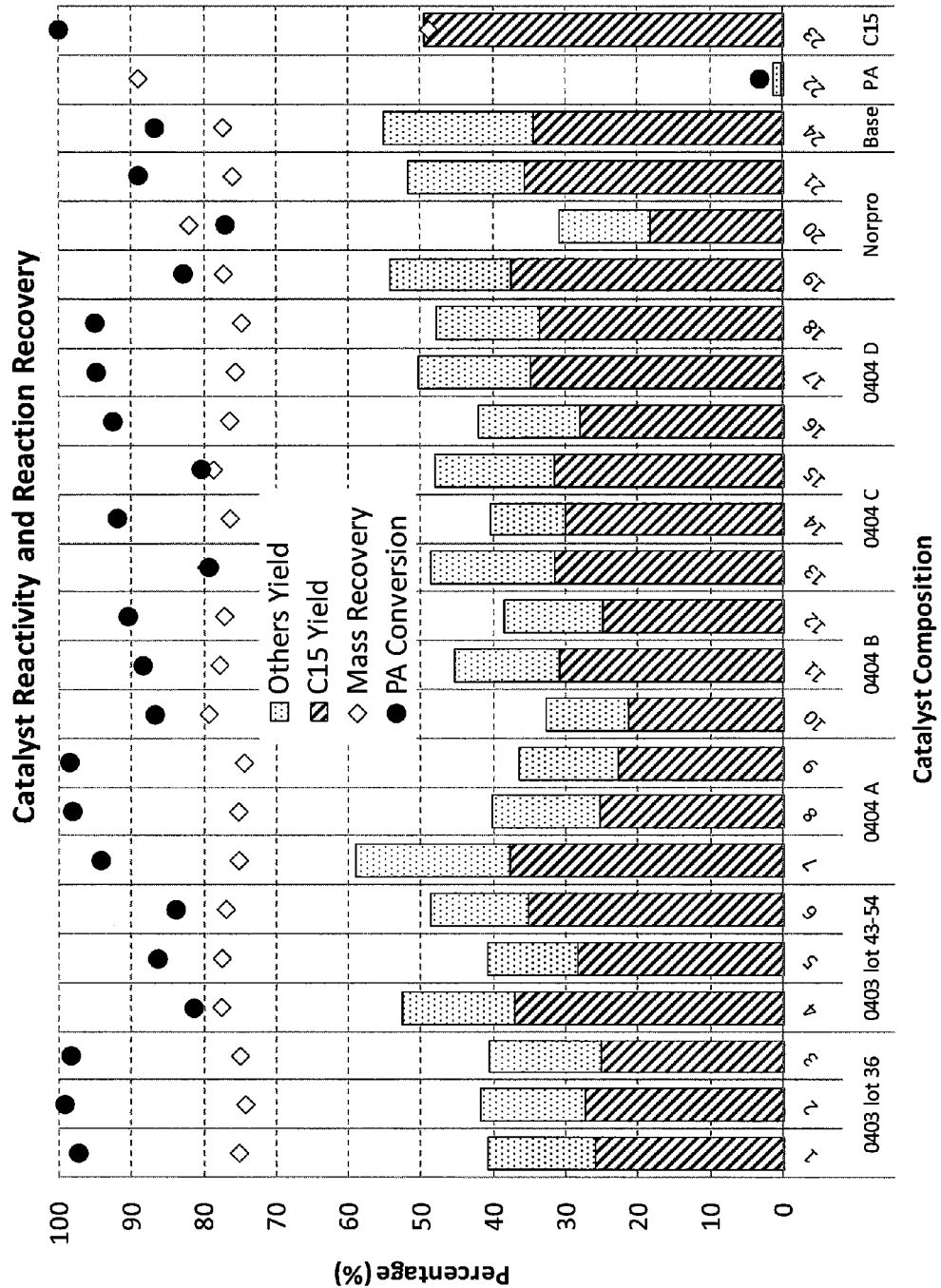
FIG. 5 is a bar graph illustrating percent conversion, mass recovery, and products formed when palmitic acid was exposed to $WO_3$/Pt on various $ZrO_2$ supports.
Figure 6:
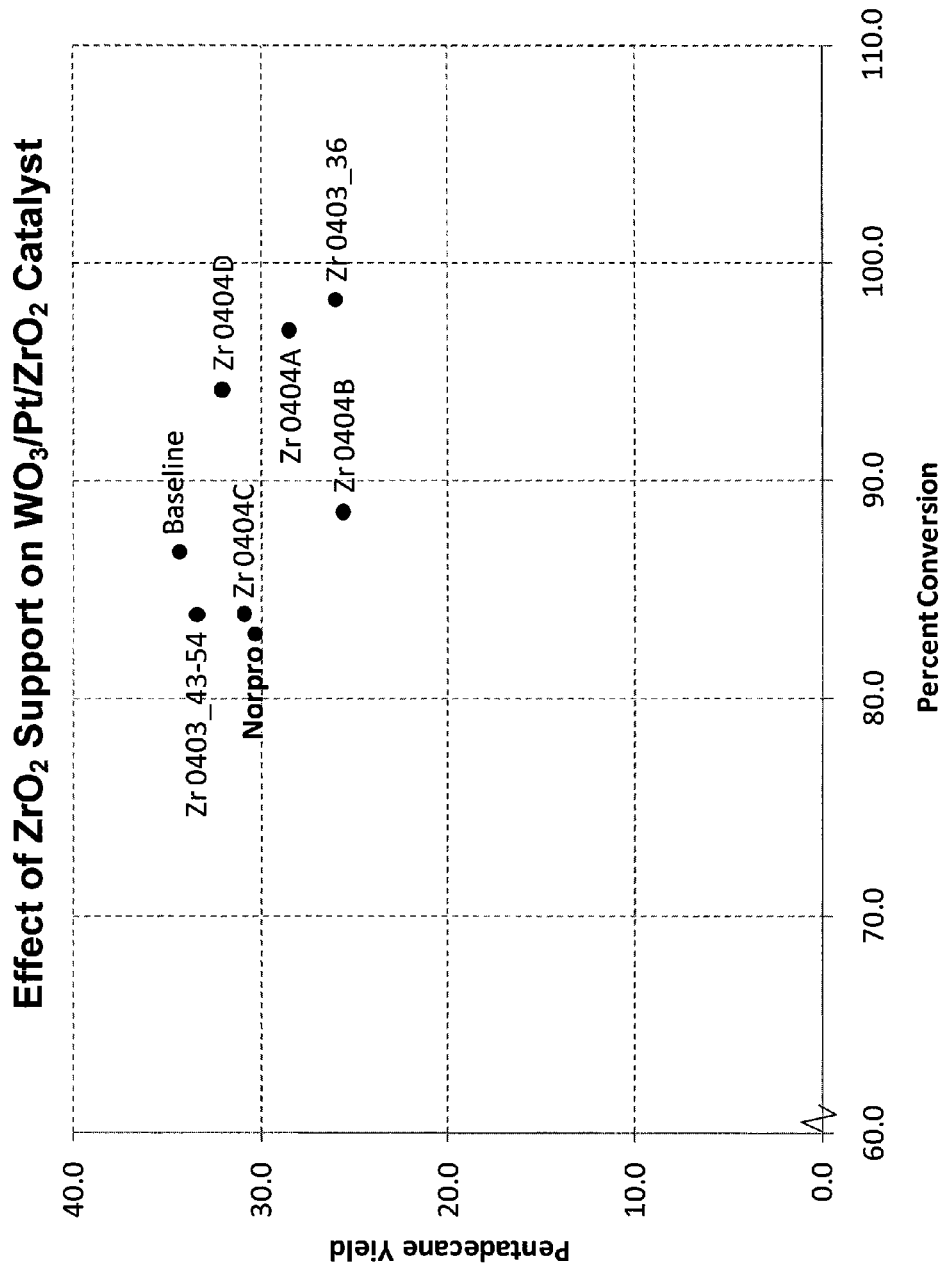
FIG. 6 is a graph of pentadecane yield versus percent conversion when palmitic acid was exposed to $WO_3$/Pt on various $ZrO_2$ supports.

Effect of $ZrO_2$ Support on Palmitic Acid Decarboxylation:

Seven $ZrO_2$ supports were tested and compared to the support used for the initial catalyst preparation, 12% $WO_3$/0.7% Pt on Engelhard $ZrO_2$ support lot 0403 (BASF Corporation, Florham Park, N.J.). Each catalyst was prepared by the same robotic system at equivalent metal loading relative to the total mass of the catalyst. The results are shown in Table 4 and FIGS. 5 and 6. FIG. 5 includes the data for each individual trial, and FIG. 6 provides an average for all samples of a particular catalyst. In general, palmitic acid conversion and product yields were quite consistent. In each case, the major product was C15.

TABLE 4

| Catalyst | Mass Recovery | Conversion | C15 Yield | Others Yield |
|---|---|---|---|---|
| Zr 0403_36[1] | 74.8 | 98.3 | 26.0 | 15.0 |
| Zr 0403_43-54[1] | 77.3 | 83.8 | 33.4 | 13.9 |
| Zr 0404A[1] | 74.9 | 96.9 | 28.5 | 16.6 |
| Zr 0404B[1] | 78.1 | 88.5 | 25.6 | 13.1 |
| Zr 0404C[1] | 78.2 | 83.9 | 30.9 | 14.7 |
| Zr 0404D[1] | 75.6 | 94.2 | 32.1 | 14.6 |
| NorPro[2] | 78.4 | 83.0 | 30.3 | 15.3 |
| Baseline | 77.3 | 86.7 | 34.3 | 20.6 |

[1]BASF Corporation, Florham Park, NJ
[2]Saint-Gobain NorPro, Canton, OH

Effect of Carbon Support on Palmitic Acid Decarboxylation:

Screening experiments were conducted with various catalysts with carbon supports to evaluate their ability to decarboxylate palmitic acid. The catalysts also were compared to catalysts having inorganic supports such as $ZrO_2$ and $TiO_2$.

Figure 7:
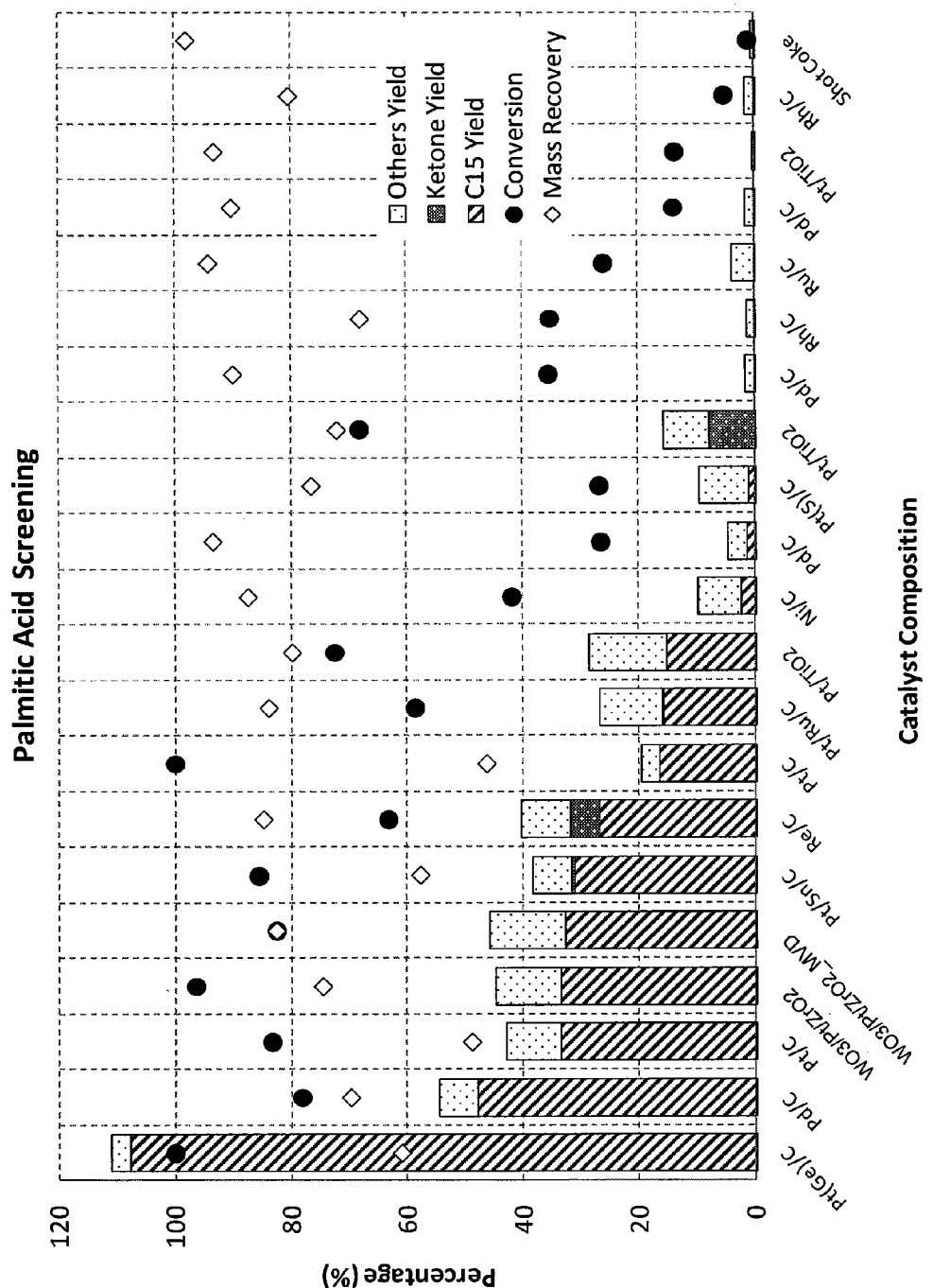
FIG. 7 is a bar graph illustrating percent conversion, mass recovery, and products formed when palmitic acid was exposed to various carbon-based catalysts.

As shown in FIG. 7, the primary product was pentadecane in most instances. Surprisingly superior results were obtained with the 5% Pt/Ge/C with more than 95% of the product being pentadecane within the experimental error of the screening tests. In contrast, two different Pt/C catalysts resulted in products including less than 40% pentadecane or less than 20% pentadecane.

Figure 8:
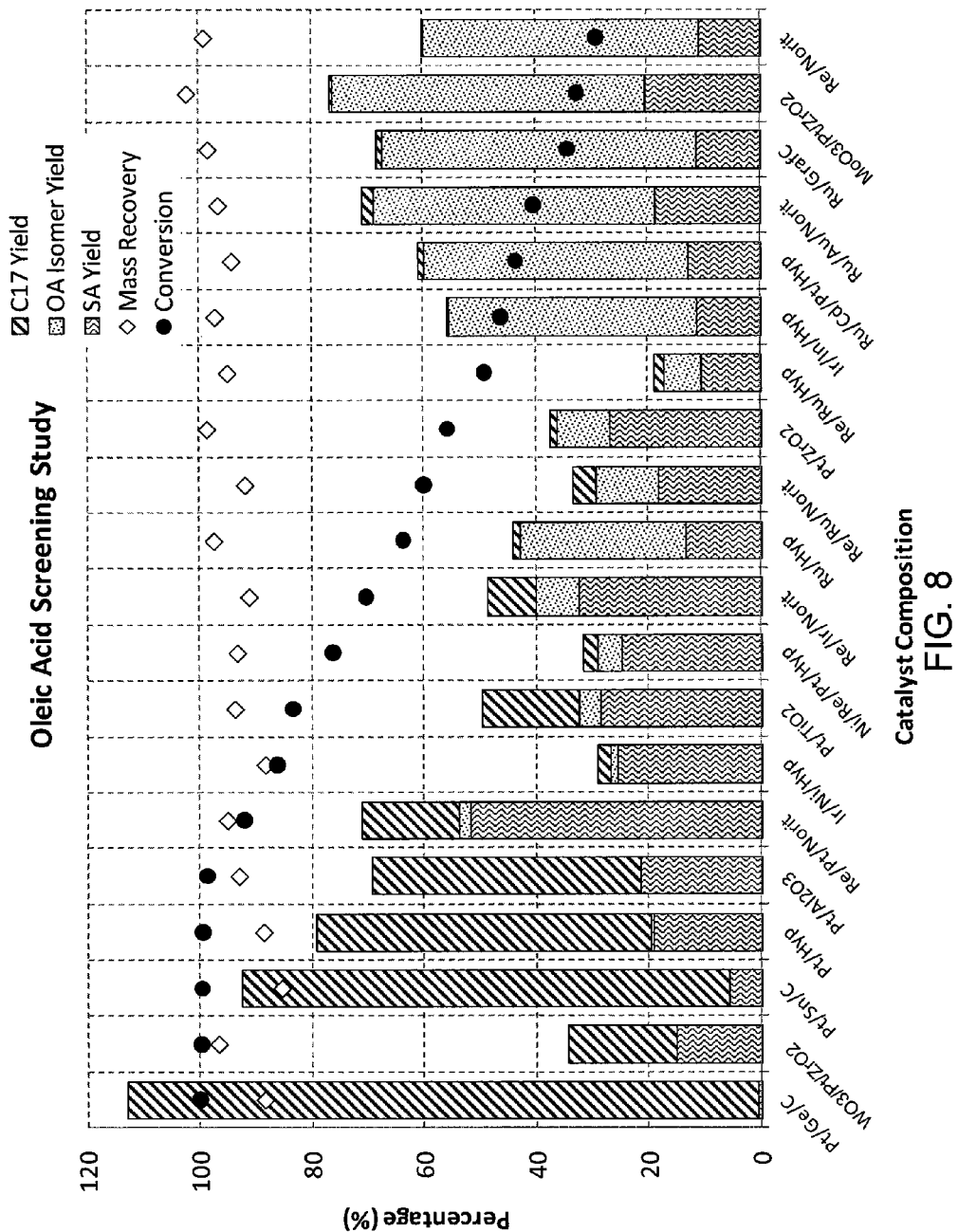
FIG. 8 is a bar graph illustrating percent conversion, mass recovery, and products formed when oleic acid was exposed to various catalysts.
Figure 9:
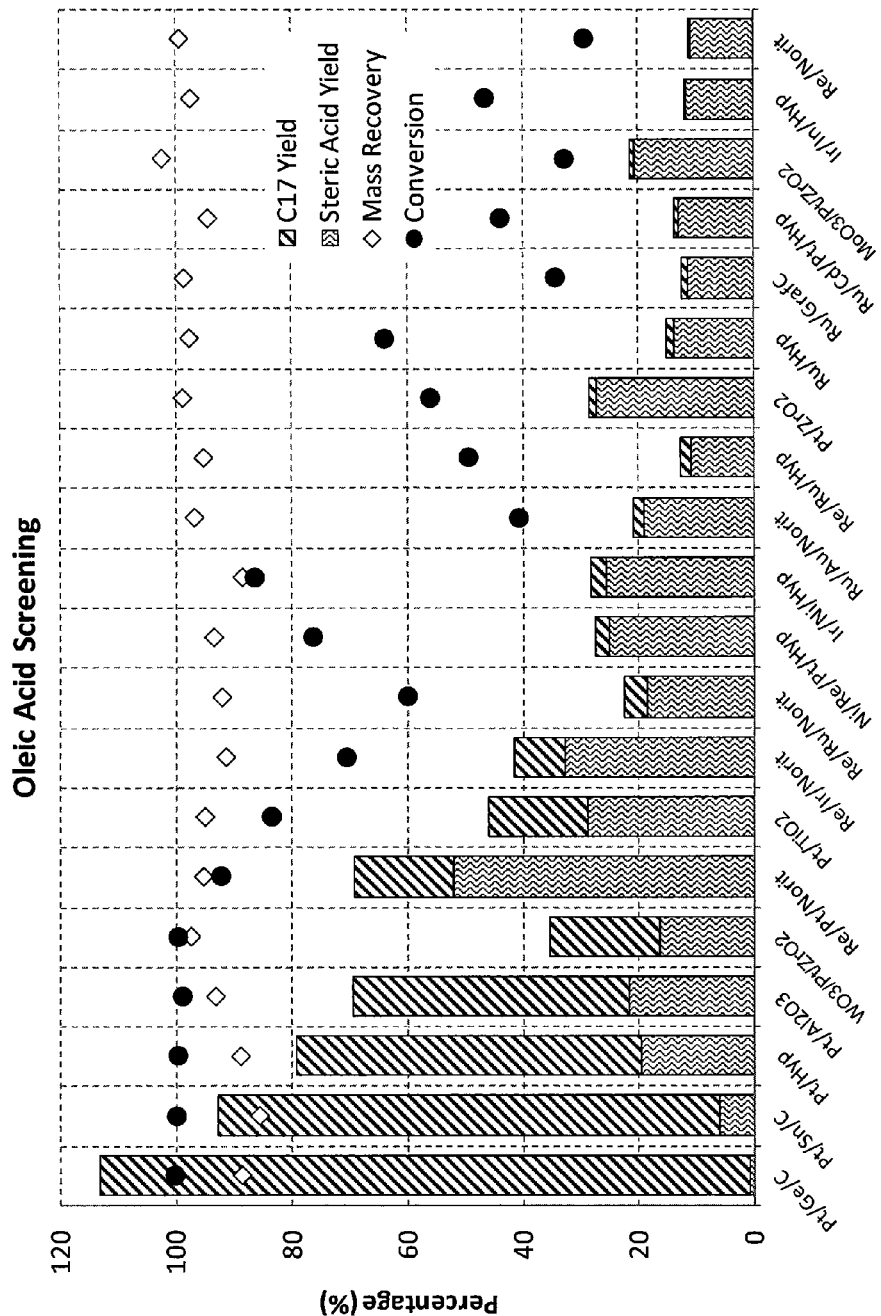
FIG. 9 is a bar graph illustrating the percent conversion, yield of C17 hydrocarbons, and yield of stearic acid formed when oleic acid was exposed to various carbon-based catalysts.

Catalyst Screening for Oleic Acid Decarboxylation:

Catalysts were screened for their ability to deoxygenate oleic acid. Due to its double bond, oleic acid is capable of undergoing several reactions when exposed to the disclosed catalysts. These reactions include deoxygenation/decarboxylation/decarbonylation/dehydration, hydrogenation (saturation), cracking, dehydrogenation/aromatization, alkylation/cyclization/dimerization/oligomerization, and isomerization. The results are shown in FIGS. 8 and 9 and Table 5. FIG. 8 shows the effects of various catalyst compositions on oleic acid. The most common products included C17, stearic acid, and unsaturated C18 isomers of oleic acid. C17 refers to compounds having 17 carbon atoms. The major C17 product was heptadecane; other products included alkyl-branched aromatics. The C17 and stearic acid yields produced by several of the catalysts are shown in FIG. 9. Pt/Ge and Pt/Sn on carbon provided superior results for decarboxylating oleic acid with no dimerization or oligomerization. When Pt/Ge/C was the catalyst, more than 95% of the product was heptadecane, with the remaining products including pentadecane and alkyl-branched aromatics. When Pt/Sn/C was the catalyst, more than 85% of the product was heptadecane. In contrast, when using a Pt/C catalyst, less than 60% of the product was heptadecane.

TABLE 5

| | Catalyst Composition | Composition Details | Mass Recovery | Conversion | Stearic Acid Yield | C17 Yield |
|---|---|---|---|---|---|---|
| 1 | Pt/Ge/C | 5% Pt/Ge on carbon | 88.5 | 100.0 | 0.6 | 112.2 |
| 2 | Pt/Sn/C | 1.5% Pt/0.15% Sn on carbon | 85.5 | 99.6 | 5.9 | 86.7 |
| 3 | Pt/Hyp | 5% Pt on Hyperion carbon | 88.7 | 99.4 | 19.4 | 59.6 |
| 4 | Pt/Al2O3 | 5% Pt on Al2O3 | 93.1 | 98.8 | 21.6 | 47.8 |
| 5 | WO3/Pt/ZrO2 | 12% WO3/0.7% Pt on ZrO2 | 97.3 | 99.6 | 16.3 | 18.9 |
| 6 | Re/Pt/Norit | 5% Re/2% Pt on Norit carbon | 95.1 | 92.1 | 51.8 | 17.4 |
| 7 | Pt/TiO2 | 5% Pt on TiO2 | 94.9 | 83.3 | 28.7 | 17.3 |
| 8 | Re/Ir/Norit | 5% Re/5% Ir on Norit | 91.2 | 70.3 | 32.6 | 8.6 |

TABLE 5-continued

| | Catalyst Composition | Composition Details | Mass Recovery | Conversion | Stearic Acid Yield | C17 Yield |
|---|---|---|---|---|---|---|
| 9 | Re/Ru/Norit | 5% Re/3% Ru on Norit | 91.9 | 60.0 | 18.3 | 4.0 |
| 10 | Ni/Re/Pt/Hyp | 5% Ni/1% Re/0.02% Pt on Hyperion | 93.4 | 76.3 | 24.9 | 2.4 |
| 11 | Ir/Ni/Hyp | 7% Ir/3% Ni on Hyperion | 88.4 | 86.2 | 25.6 | 2.4 |
| 12 | Ru/Au/Norit | 4.8% Ru/1% Au on Norit | 96.6 | 40.5 | 18.8 | 2.0 |
| 13 | Re/Ru/Hyp | 5% Re/3% Ru on Hyperion | 95.1 | 49.3 | 10.7 | 1.9 |
| 14 | Pt/ZrO2 | 5% Pt on ZrO2 | 98.7 | 55.8 | 27.0 | 1.4 |
| 15 | Ru/Hyp | 5% Ru on Hyperion | 97.5 | 63.7 | 13.5 | 1.4 |
| 16 | Ru/GrafC | 7% Ru on 1,8-mm graphitic carbon (Engelhard No. PM 0400007, BASF) | 98.4 | 34.3 | 11.3 | 1.0 |
| 17 | Ru/Cd/Pt/Hyp | 5% Ru/0.5% Cd/0.02% Pt on Hyperion | 94.3 | 43.6 | 12.8 | 0.9 |
| 18 | MoO3/Pt/ZrO2 | 7.8% MoO3/0.7% Pt on ZrO2 | 102.2 | 32.7 | 20.6 | 0.7 |
| 19 | Ir/In/Hyp | 7% Ir/3% In on Hyperion | 97.2 | 46.4 | 11.4 | 0.3 |
| 20 | Re/Norit | 5% Re on Norit | 99.2 | 29.2 | 10.8 | 0.2 |

Note:
GrafC (graphitic carbon, BASF Corporation, Florham Park, NJ), Hyp (multi-walled carbon nanotubes, Hyperion Catalysis International, Cambridge, MA) and Norit (Norit ROX, acid-washed, extruded activated carbon, Norit Americas, Inc., Marshall, TX) are all forms of carbon.

Figure 10:
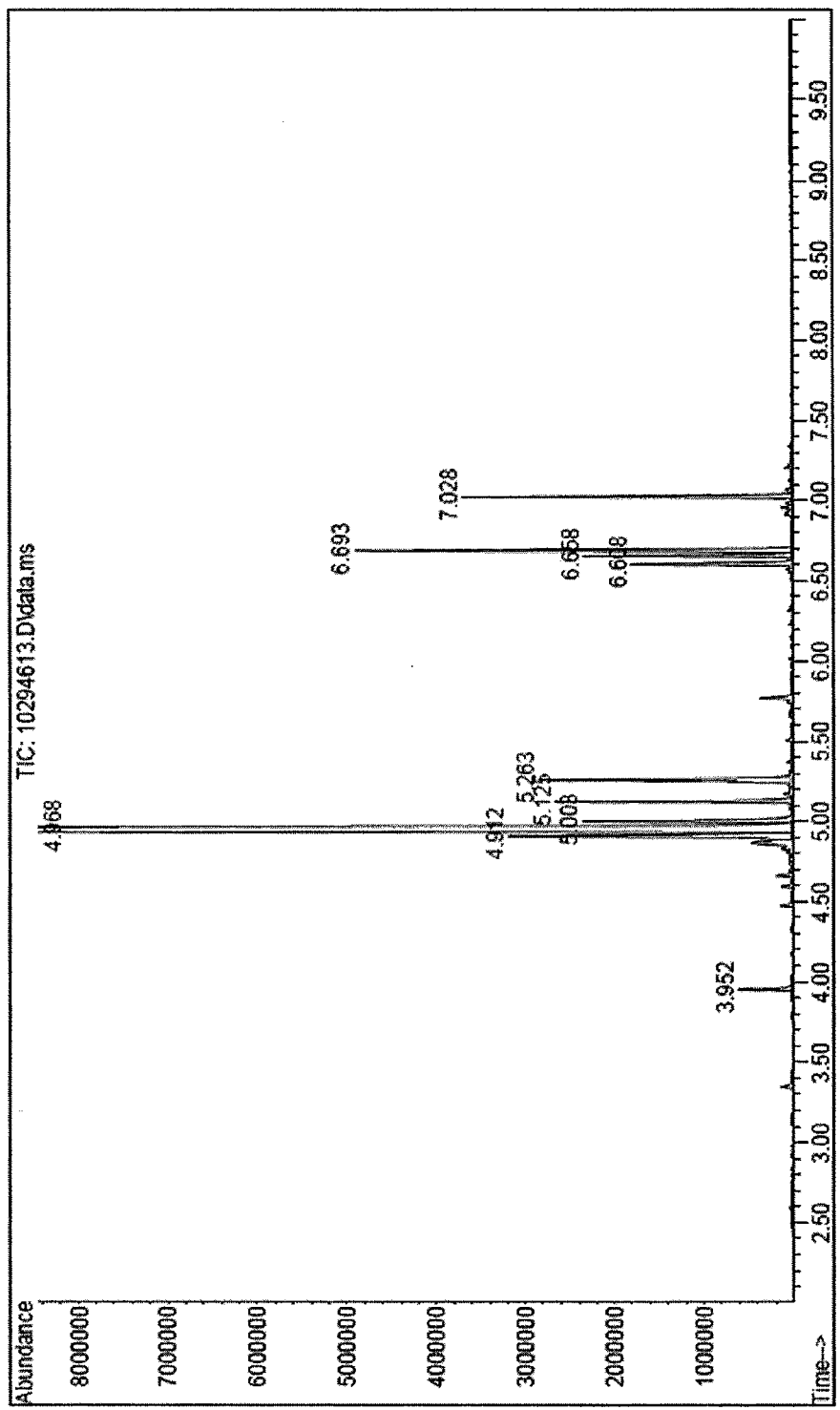
FIG. 10 is a gas chromatography trace of products formed when oleic acid was exposed to one embodiment of the disclosed catalysts.
Figure 11:
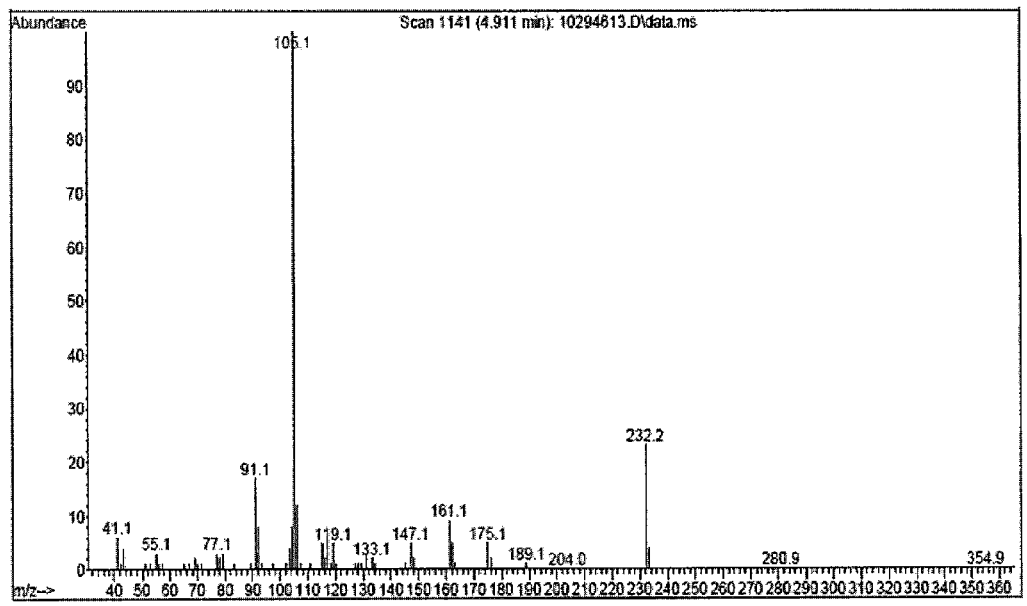
FIG. 11 is a mass spectroscopy fragmentation pattern of the peak obtained at 4.911 minutes in FIG. 10.
Figure 12:
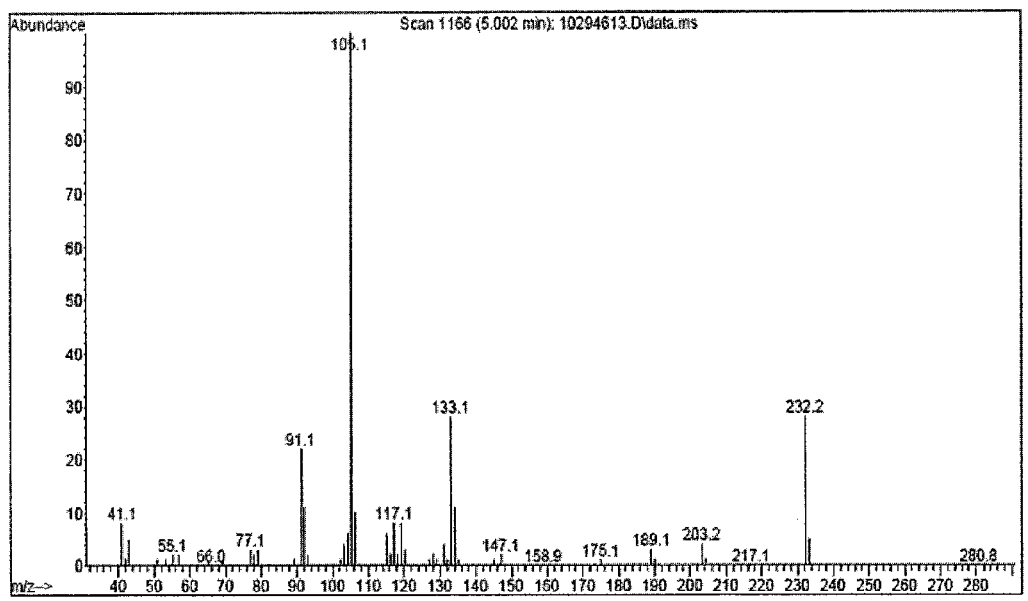
FIG. 12 is a mass spectroscopy fragmentation pattern of the peak obtained at 5.002 minutes in FIG. 10.
Figure 13:
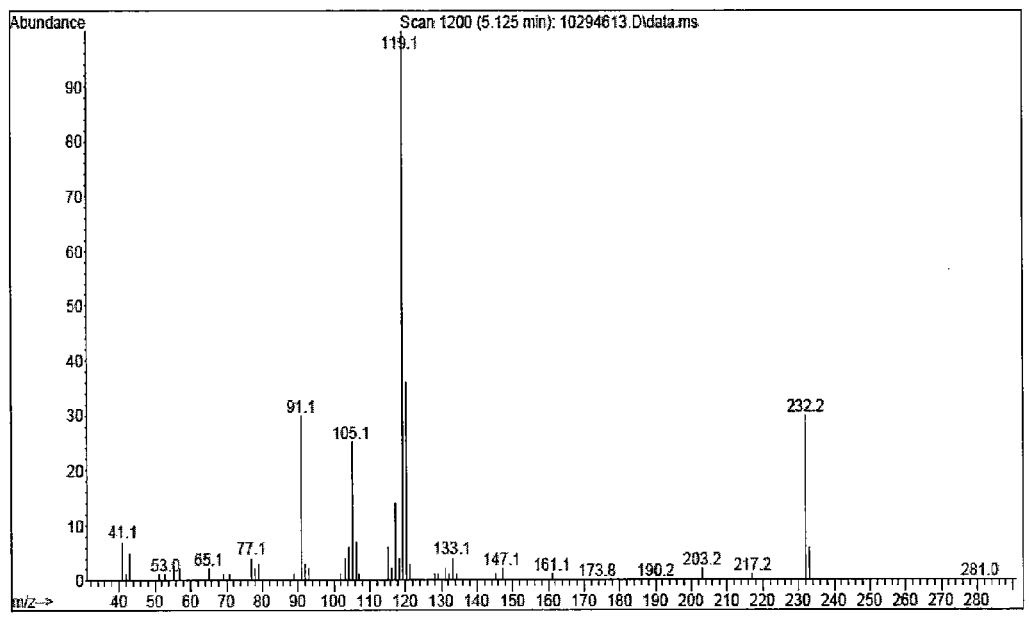
FIG. 13 is a mass spectroscopy fragmentation pattern of the peak obtained at 5.125 minutes in FIG. 10.
Figure 14:
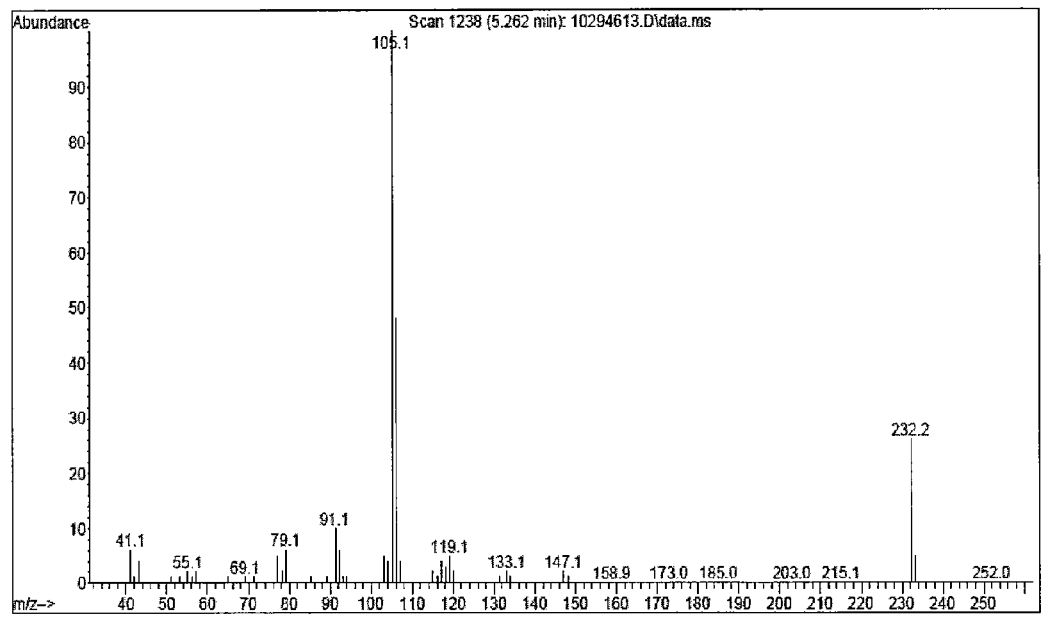
FIG. 14 is a mass spectroscopy fragmentation pattern of the peak obtained at 5.262 minutes in FIG. 10.

The compounds produced by exposing oleic acid to a catalyst having 1.5 wt % Pt and 0.15 wt % Sn on carbon powder were evaluated by gas chromatography/mass spectroscopy (GC/MS). FIG. 10 is a GC trace of the products. The MS fragmentation patterns corresponding to the aromatic compound with a mass of 232 amu were identified as the chromatographic peaks obtained at 4.911 minutes, 5.002 minutes, 5.125 minutes, and 5.262 minutes, and are shown in FIGS. 11-14, respectively. Although no matches were found in MS libraries, the closest C17 aromatic compounds appeared to be 2-methyl-2-phenyl decane (molecular weight fragments of 119, 91, 120, and 105) and 2-phenyl undecane (molecular fragments of 105, 106, 91, and 232). Other close MS fragmentation matches included methyl isobutyl benzene and 1,3-dimethylbutyl benzene but these compounds are of different mass.

Figure 15:
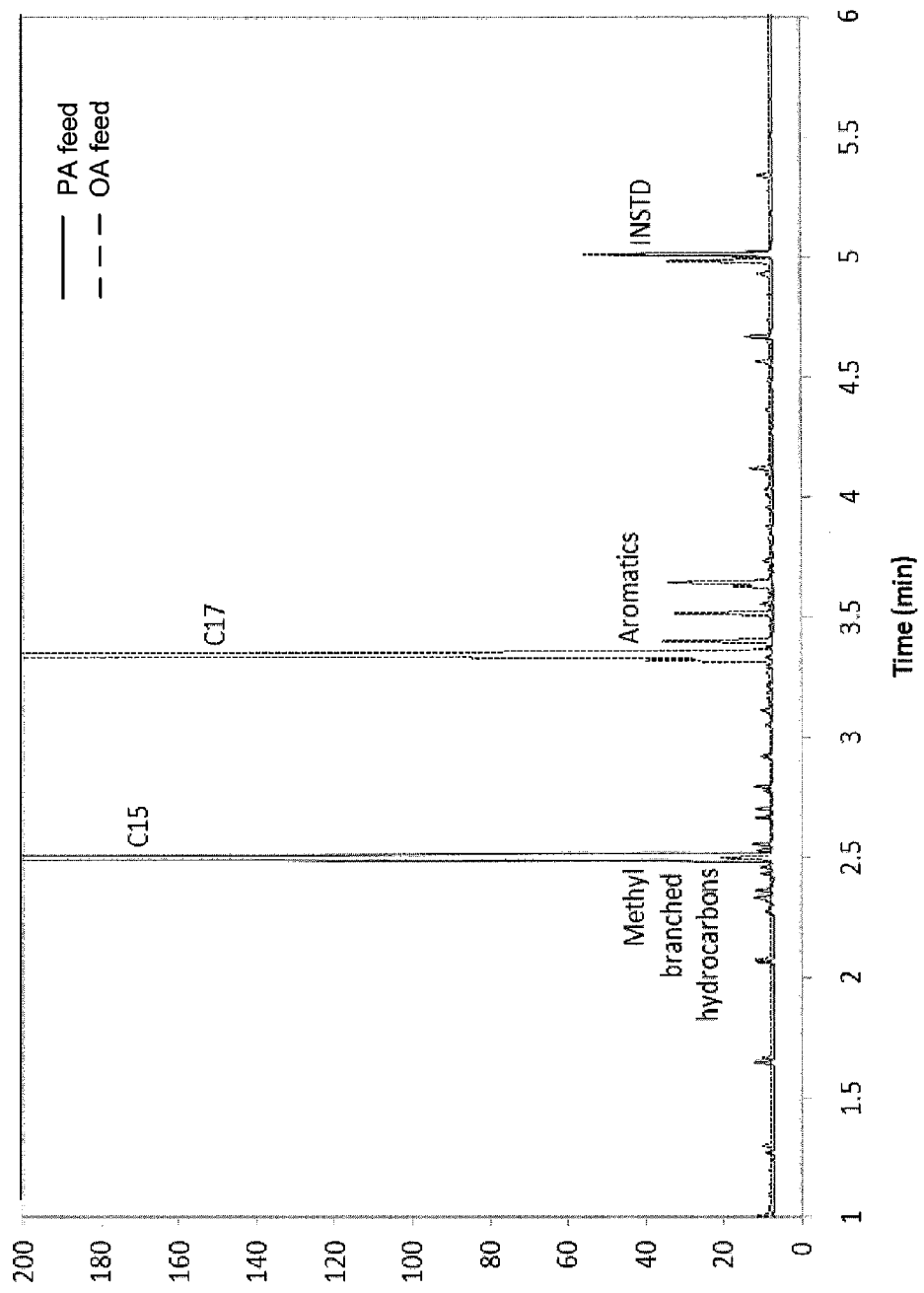
FIG. 15 is an overlay of GC-FID traces of products formed when palmitic acid and oleic acid were exposed to a Pt/Ge/C catalyst.

Comparison of Products Produced from Palmitic Acid and Oleic Acid Using a 5% Pt/Ge/C Catalyst:

Palmitic acid and oleic acid were individually exposed to a 5% Pt/Ge/C catalyst in screening tests, and the products were analyzed by gas chromatography with a flame ionization detector (GC-FID). FIG. 15 is an overlay of the GC-FID traces of the products formed from catalysis of palmitic acid and oleic acid. The palmitic acid products are shown as a solid line, and the oleic acid products are shown as a dashed line. In each case, methyl-branched hydrocarbons exited the column first, followed by straight-chain hydrocarbons and then aromatic compounds. The tall, overlapping peaks at about 2.5 minutes are pentadecane. The tall peak at about 3.35 minutes is heptadecane. The shoulder peak just in front of heptadecane is an aromatic compound, as are the peaks following it. The peaks from about 3.4 to about 3.7 minutes are thought to be alkyl-substituted aromatic compounds. The small peaks seen from about 1-3 minutes are thought to be mono-methyl branched hydrocarbons. Thus, the major product of palmitic acid decarboxylation was pentadecane with a small amount of hexadecane and about 3% of other products. Oleic acid decarboxylation produced primarily heptadecane with a small amount of pentadecane and minor amounts of other products. It can be seen that the oleic acid products included a much higher ratio of aromatic compounds to methyl-branched hydrocarbons as compared to the palmitic acid products.

Example 2

Platinum on Metal Oxide Catalysts

Catalyst Synthesis:

Catalyst 1 ($WO_3/Pt/ZrO_2$):

BASF Zr-0403 (BASF Corporation, Florham Park, N.J.), an engineered (tableted) zirconia support with a cornstarch binder, was used as the catalyst support. The support was calcined at 450° C. for 6 hr in air. A 5° C./min ramp from room temperature to 450° C. and 10° C./min ramp back to room temperature were employed. Identical temperature ramps were subsequently used in all calcination steps in this catalyst preparation. Next, an ammonium metatungstate hydrate solution was added drop-wise to the support to the point of incipient wetness. The amount of ammonium metatungstate hydrate was added so that the amount of tungstate present on the catalyst would be 12 wt % $WO_3$. The support was first dried in flowing warm air from a heat gun for 30 min and subsequently dried at 120° C. for 2.0 hr. Following drying, the catalyst was calcined at 850° C. for 2.0 hr. After calcination, an aqueous platinum ethanolamine (Pt-A) solution was added drop-wise to the catalyst support such that the support again reached incipient wetness. Pt-A solution was added so that the final catalyst would be 0.7 wt % Pt. The pellets were dried under flowing heated air produced from a heat gun while tumbling for 30 min and further dried in air at 120° C. for 2.5 hr. The catalyst was calcined at 450° C. for 2 hr. After calcination, Catalyst 1 was ground with an alumina mortar and pestle and the −30/+80 mesh fraction was collected via sieving and used in Runs 1-5.

Catalyst 2 ($WO_3/Pt/ZrO_2$):

NorPro® SZ31164 engineered (tableted) zirconia support was initially ground with an alumina mortar and pestle. The −30/+80 mesh fraction was then collected via sieving. The zirconia support was calcined at 450° C. for 6 hr, with 5° C./min and 10° C./min ramps from calcination temperature and back to room temperature, respectively. Identical temperature ramps were subsequently used in all calcination steps in this catalyst preparation. Following calcination, an aqueous solution of ammonium metatungstate hydrate was added to the zirconia such that the incipient wetness point was reached. The amount of ammonium metatungstate hydrate was added so that 12 wt % $WO_3$ would be present on the catalyst following calcination. After the addition of the ammonium metatungstate hydrate, the support was dried in flowing heated air from a heat gun while tumbling for 45 min, followed by drying at 120° C. for 1.0 hr in air. The support was then calcined at 850° C. for 2.0 hr. After calcination, aqueous platinum ethanolamine (Pt-A) solution was added drop-wise to the support such that incipient wetness point of the support was again reached. Pt-A solution was added so that the final catalyst would be 0.7 wt % Pt. After addition of the Pt-A solution, the catalyst was dried for 45 min while tumbling in air at room temperature followed by drying at 120° C. for 1.0 hr. The support was subjected to a final calcination at 450° C. for 2.0 hr. Catalyst 2 was used in Run 6 without further modification.

Catalyst 3 ($WO_3/Pt/ZrO_2$):

BASF Zr-0403, an engineered $ZrO_2$ support, was used in this preparation. The support contained a graphite binder. The support was calcined at 450° C. for 6 hr using a 10° C./min ramp and taken out of the oven at the end of the 6 hr soak and placed in a desiccator. Upon cooling, this support was subjected to tungstate addition using an aqueous ammonium metatungstate hydrate solution via the incipient wetness technique. The amount of ammonium metatungstate hydrate was added so that 12 wt % $WO_3$ would be present on the catalyst following calcination. After drying, the sample was calcined at 850° C. for 2 hr using 5° C./min and 10° C./min ramps from calcination temperature and back to room temperature, respectively. Identical temperature ramps were subsequently used in all calcination steps in this catalyst preparation. Pt was then added to the tungstated support via the incipient wetness technique such that 0.7 wt % Pt was present. The support was dried in flowing heated air from a heat gun for 1.5 hr and further dried for 2 hr at 120° C. After calcination at 450° C. for 2 hr, this catalyst was designated Catalyst 3.

Catalysts 4 and 5 ($Pt/ZrO_2$):

Two lots of BASF Zr-0403 were calcined at 850° C. for 2 hr using 5° C./min and 10° C./min ramps from calcination temperature and back to room temperature, respectively. The supports were designated G and C for the graphite and cornstarch binder supports, respectively.

A portion of supports G and C were separately treated with aqueous Pt-A solution to produce a $Pt/ZrO_2$ catalyst with 0.7 wt % Pt. The solution was added via the incipient wetness technique. After application of the aqueous Pt-A solution, the supports were dried in heated flowing air from a heat gun for 15-20 min. The catalysts were then dried for 6-7 hrs at 120° C. and subsequently calcined at 450° C. for 2 hr. The $Pt/ZrO_2$ catalyst prepared from graphite bound support was designated Catalyst 4 while the catalyst prepared from cornstarch bound support was designated Catalyst 5.

Catalyst 6 ($MoO_3/Pt/ZrO_2$):

BASF Zr-0403 with a graphite binder was prepared with $MoO_3$ instead of $WO_3$. The Zr-0403 was calcined at 450° C. for 6 hr using a with 5° C./min and 10° C./min ramps from calcination temperature and back to room temperature, respectively. Identical temperature ramps were subsequently used in all calcination steps in this catalyst preparation. Next, an aqueous solution of ammonium heptamolybdate hydrate was added to the catalyst via the incipient wetness technique. The amount of molybdate was added such that the concentration would be 7.8 wt % $MoO_3$, which is equivalent on a molar basis to 12 wt % $WO_3$. The support was then dried with flowing heat from a heat gun for 30 min, flowing by heating in air 120° C. for 2 hr and subsequently calcined at 850° C. for 2 hr. The $MoO_3/ZrO_2$ support was then divided and one portion was modified with 0.7 wt % Pt via an aqueous Pt-A solution using the incipient wetness technique. Heat was applied from a heat gun while tumbling for 0.5 hr followed by drying at 120° C. for 2.25 hr. The catalyst was then calcined at 450° C. for 2 hr and designated Catalyst 6.

Catalyst 7 ($WO_3/Pt/ZrO_2$, Prepared with Platinum Acetylacetonate):

An Engelhard-0403 engineered (tableted) zirconia support (BASF Corporation) was initially calcined at 450° C. for 4.5 hr, with 5° C./min and 10° C./min ramps from calcination temperature and back to room temperature. The support was then ground with an alumina mortar and pestle. The −30/+80 mesh fraction was then collected via sieving. Next, an aqueous solution of ammonium metatungstate hydrate was added to the zirconia such that the incipient wetness point was reached. The amount of ammonium metatungstate hydrate was added so that 12 wt % $WO_3$ would be present on the catalyst following calcination. After the addition of the ammonium metatungstate hydrate, the support was dried at room temperature while tumbling for 15 min, followed by drying at 120° C. for 2.0 hr in air. The support was then calcined at 850° C. for 2.0 hr with ramps identical to the first calcination step.

The catalyst support and platinum acetylacetonate (Pt-acac) were charged to a 50 mL round bottom flask. The amount of Pt-acac added was such that the final Pt loading of the catalyst would be 0.7 wt %. The round bottom flask was placed on a rotary evaporator and vacuum was applied to the flask; the pressure was set to 10 torr. The flask was set to rotate at 120 rpm. The rotating flask was then lowered so that it was rotating in contact with a heating mantle. The heating mantle was controlled with a Variac®. A thermocouple was placed between the heating mantle and rotating round bottom flask. Additionally, a heat gun was positioned approximately 4 inches above the rotating flask so that the heat gun was aimed at the top of the round bottom flask.

Initially, the flask was set to rotating for 10 min with no heat applied in order to induce mixing of the catalyst support and Pt-acac. Next, heat was applied with the heating mantle and heat gun such that the thermocouple between the round bottom flask and heating mantle read 180° C. The ramp from room temperature to 180° C. took 5-10 min. After 10 min at 180° C., the temperature was increased to 220° C. and held for 30 min. The ramp from 180° C. to 220° C. took 3-5 min. After treatment at 220° C., the temperature was increased a final time to 240° C. and held for 30 min. The ramp from 220° C. to 240° C. took 3-5 min. After treatment at 240° C., the samples were cooled and subsequently calcined at 350° C. for 3 hr in air with a 5° C./min ramp from room temperature and a 10° C./min ramp back to room temperature. The $WO_3/Pt/ZrO_2$ catalyst prepared in this manner was designated Catalyst 7.

Catalysts 8-10 ($Pt/TiO_2$):

Three titania supports were prepared from Degas $TiO_2$ Lot DFH-14-231E. One titania support was uncalcined, a second was calcined at 450° C. for 2 hr and a third was calcined at 900° C. for 2 hr. Ramps of 5° C./min and 10° C./min to and from calcination temperature were used in all heat treatments.

After calcination, each support was ground with an alumina mortar and pestle and the −30/+80 mesh fraction was collected via sieving.

Separately, each catalyst support was charged to a 50 mL round bottom flask with Pt-acac. The amount of Pt-acac added was such that the final Pt loading of the catalyst would be 0.7 wt %. The round bottom flask was placed on a Rotovap and vacuum was applied to flask; the pressure was set to 10 torr. The flask was set to rotate at 120 rpm. The rotating flask was then lowered so that it was rotating in contact with a heating mantle. The heating mantle was controlled with a Variac®. A thermocouple was placed between the heating mantle and rotating round bottom flask. Additionally, a heat gun was positioned approximately 4 inches above the rotating flask so that the heat gun was aimed at the top of the round bottom flask.

Initially, the flask was set to rotating for 10 min with no heat applied in order to induce mixing of the catalyst support and Pt-acac. Next, heat was applied with the heating mantle and heat gun such that the thermocouple between the round bottom flask and heating mantle read 180° C. The ramp from room temperature to 180° C. took 5-10 min. After 10 min at 180° C., the temperature was increased to 220° C. and held for 30 min. The ramp from 180° C. to 220° C. took 3-5 min. After treatment at 220° C., the temperature was increased a final time to 240° C. and held for 30 min. The ramp from 220° C. to 240° C. took 3-5 min. After treatment at 240° C., the samples were cooled and subsequently calcined at 350° C. for 3 hr in air with a 5° C./min ramp from room temperature and a 10° C./min ramp back to room temperature. The Pt/TiO$_2$ catalysts prepared above were designated Catalysts 8, 9, and 10 for the supports calcined at 900° C., 450° C. and uncalcined, respectively.

Catalyst 11 (Pt/ZrO$_2$):

BASF Zr-0404 ZrO$_2$ support was ground and sieved to −30/+80 mesh. Pt was then applied via a Pt-acac precursor in a similar manner to the above catalyst preps. The amount of Pt added was such that the catalyst would contain 0.7 wt % Pt. A key difference from the previously described Pt-acac catalyst preparation method was the temperature was ramped directly from room temperature to 240 and held for 20 min as opposed to intermediate soaks at 180° C. and 220° C. Additionally, the round bottom flask was rotated at 85 RPM as opposed to 120 RPM. After calcination at 350° C. for 3 hr, this catalyst was designated Catalyst 11. The catalyst was reduced at 350° C. in H$_2$ flowing at 200 SCCM for 4 hr prior to Combi testing.

Catalyst 12 (WO$_3$/Pt/ZrO$_2$):

A support was prepared from BASF Zr-0403 with a graphite binder present. The support was calcined at 450° C. for 6 hr with a 10° C./min ramp to calcination temperature. The support was then removed from the oven while still hot at the end of the 6 hr soak at 450° C. An aqueous solution of ammonium metatungstate hydrate was applied to the support via the incipient wetness technique such that the nominal concentration of WO$_3$ would be 12 wt %. The support was then calcined at 850° C. for 2 hr using a 5° C./min ramp to calcination temperature and a 10° C./min ramp back to room temperature. The support was then ground and the −30/+80 mesh fraction was collected via sieving. Pt-acac was then applied in an identical manner as used during the preparation of Catalyst 11. After calcination at 350° C. for 3 hr, this catalyst was designated Catalyst 12. The catalyst was reduced 350° C. in H$_2$ flowing at 200 SCCM for 4 hr prior to Combi testing.

Catalyst 13 (WO$_3$/Pt/ZrO$_2$):

BASF Zr-0403 (BASF Corporation, Florham Park, N.J.), an engineered (tableted) zirconia support with a cornstarch binder, was used as the catalyst support. The support was ground with a mortar and pestle and the −30/+80 mesh fraction was collected via sieving. The support was calcined at 450° C. for 6 hr in air. A 10° C./min ramp from room temperature to 450° C. and 20° C./min ramp back to room temperature were employed. After calcination, an ammonium metatungstate hydrate solution was added drop-wise to the support to the point of incipient wetness. The amount of ammonium metatungstate hydrate was added so that the amount of tungstate present on the catalyst would nominally be 12 wt % WO$_3$. The support was first dried in flowing warm air from a heat gun for 35 min and subsequently dried at 120° C. Following drying, the catalyst was calcined at 850° C. for 2.0 hr with a ramp of 5° C. from room temperature to 850° C. and a 10° C./min ramp back to room temperature. After calcination, an aqueous platinum ethanolamine (Pt-A) solution was added drop-wise to the catalyst support such that the support again reached incipient wetness. Pt-A solution was added so that the final catalyst would be 0.7 wt % Pt. The catalyst was dried under flowing room temperature air while tumbling for 1.0 hr. Heated air was then applied to the catalyst while tumbling for 45 min. Finally, the catalyst was dried in air at 120° C. for 4 hr. After drying, the catalyst was calcined at 450° C. for 2 hr with a temperature ramp of 5° C./min to 450° C. and a 10° C./min ramp back to room temperature.

Catalyst 1 Analysis:

Run 1:

Catalyst 1 was evaluated for its ability to decarboxylate palmitic acid in Run 1. An up-flow, 6 cm$^3$ column was packed with 13.68 g of Catalyst 1, which had been ground and sieved to −30/+80 mesh. The column was brought to an initial temperature of 250° C. and purged with 2.5 mL/min N$_2$ before beginning a feed of palmitic acid. The N$_2$ remained on at 2.5 mL/min for the duration of the experiment. Nine samples were taken, with sample acquisition times of 20-50 min. In other words, each sample was collected over a 20-50 minute period of time. The temperature was increased to 275° C. at the beginning of sample 4 acquisition and maintained at 275° C. for samples 4-9. The column was operated at a weight hourly space velocity (WHSV) of 0.37 hr$^{-1}$ for samples 1-6, and 0.74 hr$^{-1}$ for samples 7-9. Samples 1-9 were analyzed via GC-FID as described in Example 1 to determine the percentage of deoxygenated products, the amount of palmitic acid remaining, and the total mass balance recovered. The amount of CO$_2$ released was determined using the off-gas flow rate and gas composition data obtained by GC. CO$_2$ measurement was not performed on samples 2, 5, and 8.

Figure 16:
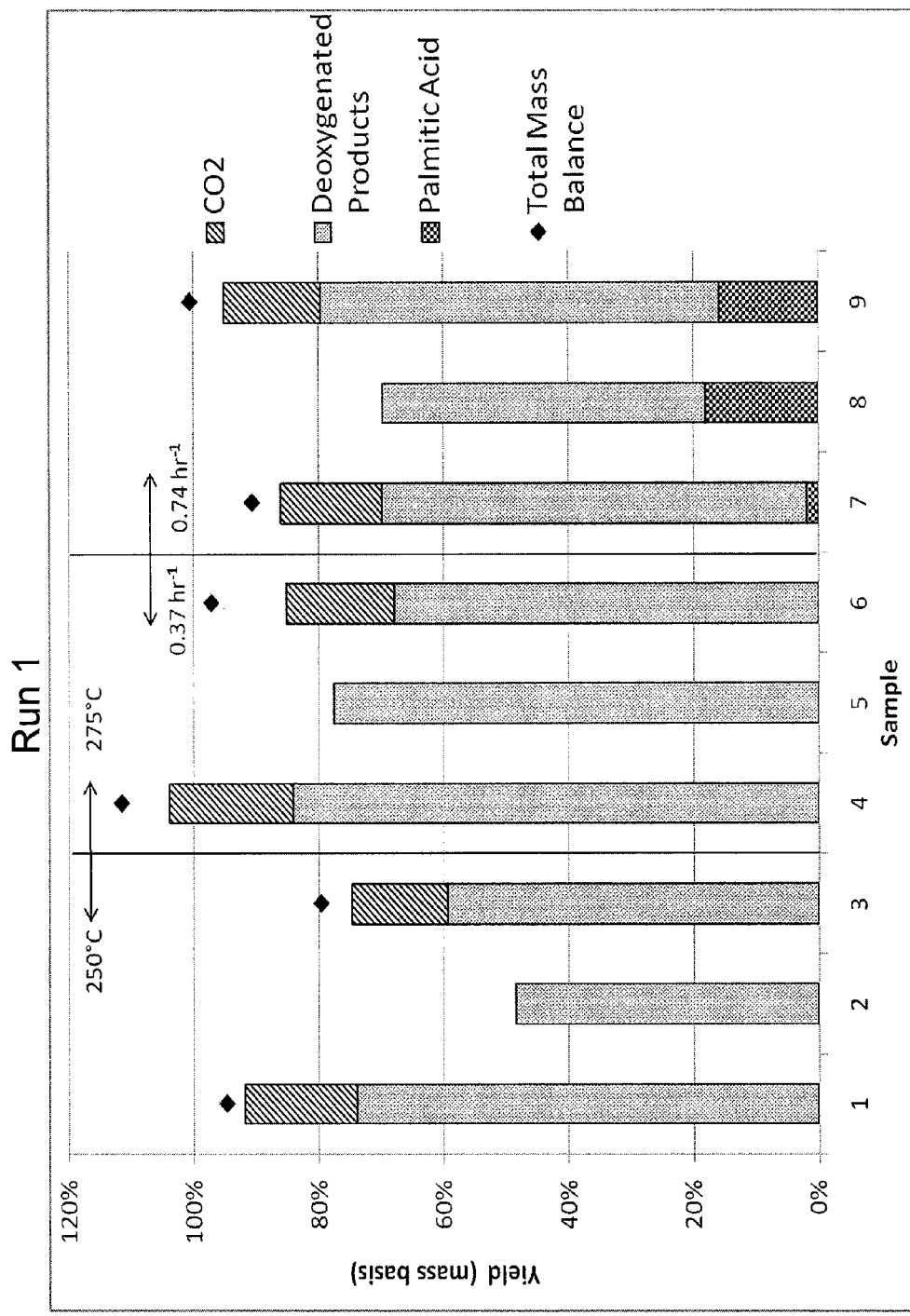
FIG. 16 is a bar graph illustrating products formed and mass balance recovered when palmitic acid was exposed to one embodiment of the disclosed catalysts under the conditions of Run 1 as described in the Examples.
Figure 17:
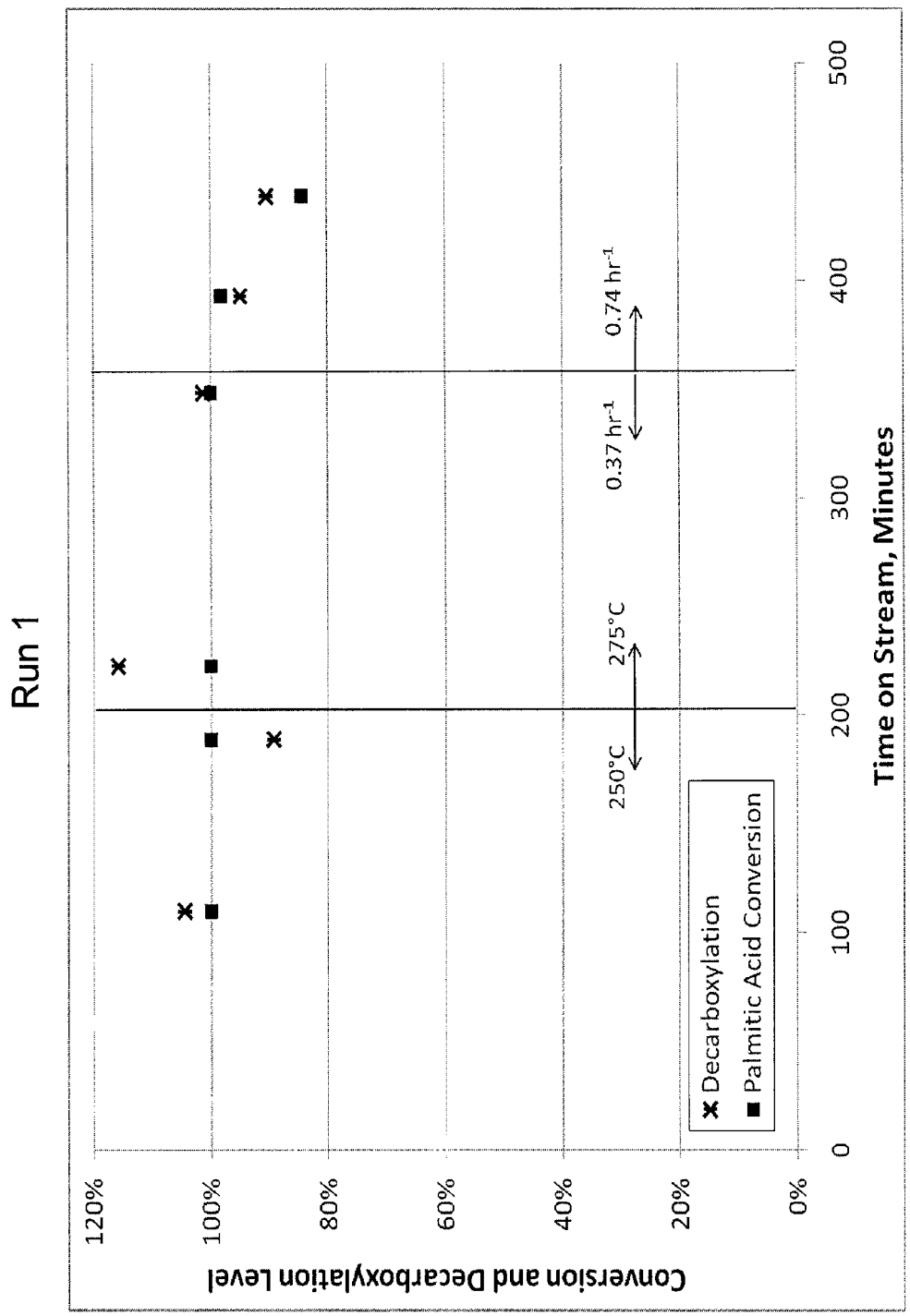
FIG. 17 is a graph of percent conversion and percent decarboxylation versus time-on-stream for Run 1.

The results of Run 1 are shown in FIGS. 16 and 17. As shown in FIG. 16, samples 1-6 contained no residual palmitic acid after exposure to the catalyst, and were completely converted to deoxygenated products (e.g., pentadecane) and CO$_2$. FIG. 17 provides a comparison of percent decarboxylation and percent palmitic acid conversion over about 450 minutes time-on-stream (TOS). Palmitic acid conversion was at or near 100% through 400 minutes, with a slight decrease after 400 minutes. Notably, percent decarboxylation is closely correlated to percent palmitic acid conversion, indicating that the primary product was decarboxylated palmitic acid, primarily pentadecane.

Run 2:

Catalyst 1 was used for Run 2. Conditions were similar to Run 1, but the temperature was initially 280° C. and was increased to 290° C. after sample 2. In Run 2, the column was operated at WHSV=0.37 hr$^{-1}$, with 40-90 minute sample acquisition times. Ten samples were collected and analyzed.

Figure 18:
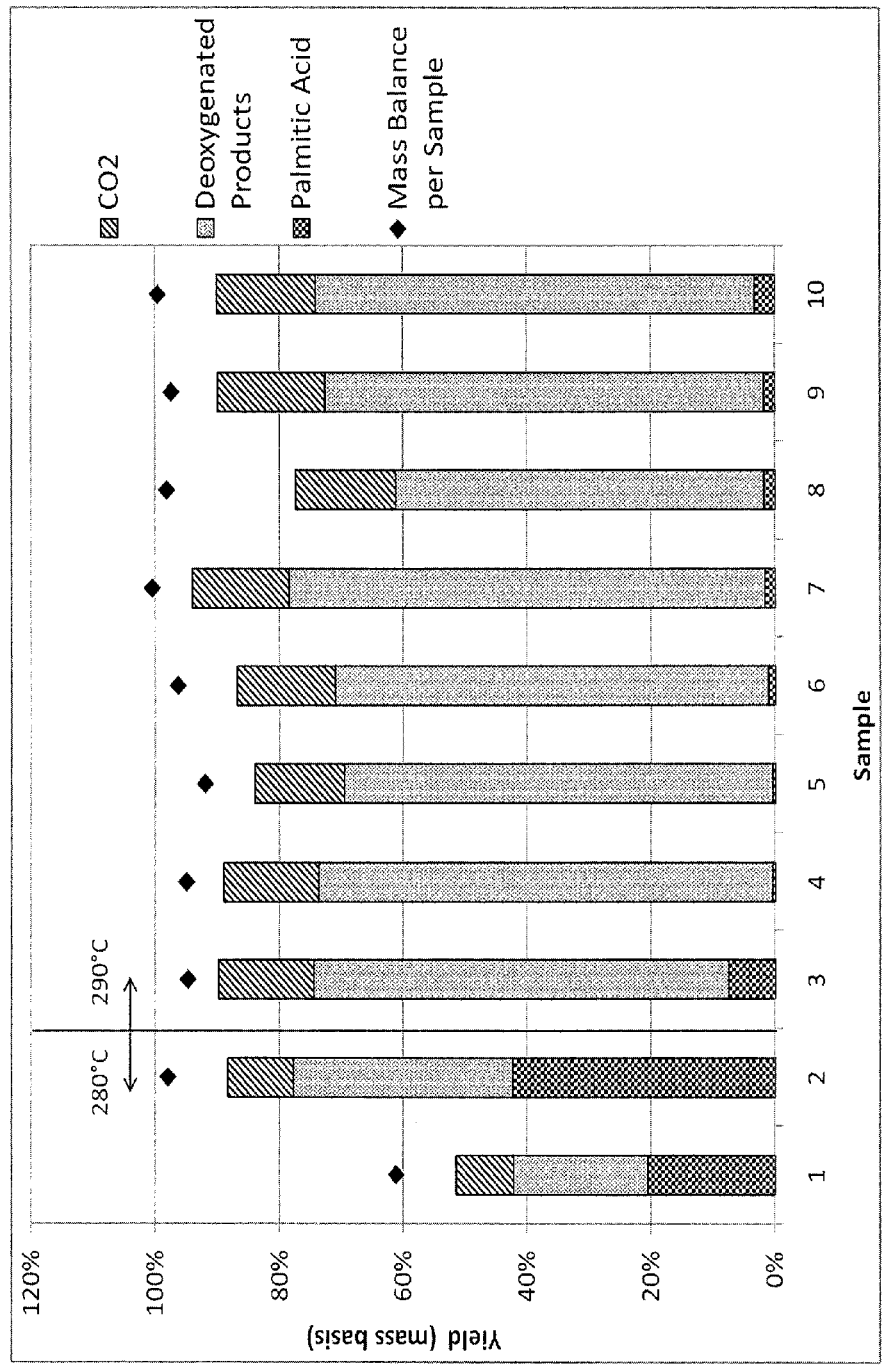
FIG. 18 is a bar graph illustrating products formed and mass balance recovered when palmitic acid was exposed to one embodiment of the disclosed catalysts under the conditions of Run 2 as described in the Examples.
Figure 19:
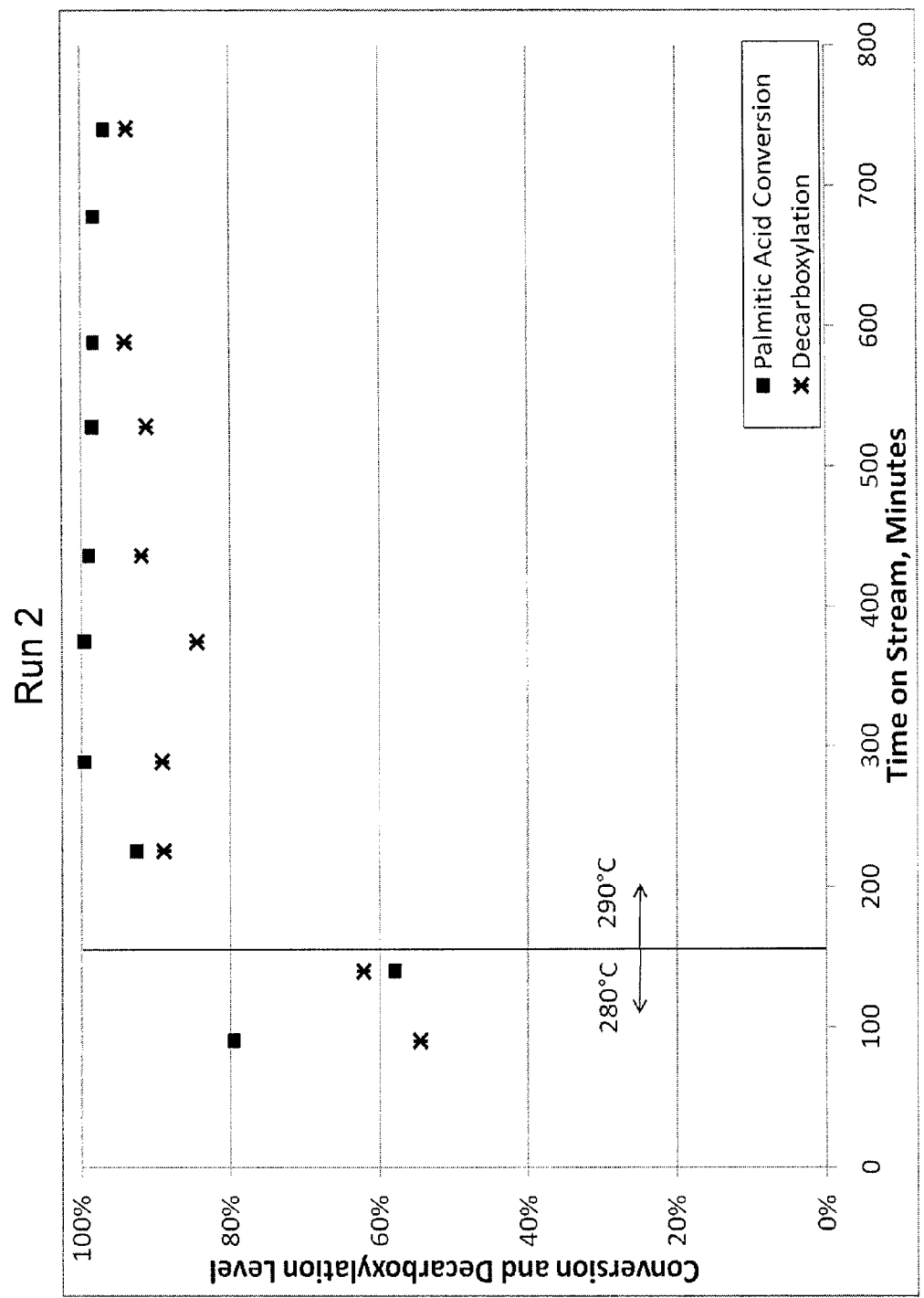
FIG. 19 is a graph of percent conversion and percent decarboxylation versus time-on-stream for Run 2.

The results of Run 2 are shown in FIGS. 18 and 19. As illustrated in FIG. 18, as the temperature increased to 290° C., the percent residual palmitic acid dropped to near zero. FIG. 19 demonstrates that percent decarboxylation is closely correlated to percent palmitic acid conversion. Palmitic acid conversion was 90-100% at a temperature of 290° C. over a time period of 200-800 minutes TOS.

Run 3:

Catalyst 1 was used for Run 3, with an oleic acid feed for the first 8 samples, and a palmitic acid feed for the last two samples. The column was purged with 2.5 mL/min $N_2$ before beginning the oleic acid feed. Because Run 3 was performed after Runs 1-2, some residual palmitic acid remained in the column and is seen in Sample 1. The column was operated at 295° C. with WHSV=0.36 $hr^{-1}$. Sample acquisition times were 45-100 minutes. At the beginning of Sample 9 acquisition, the feed was switched to palmitic acid, and WHSV=0.37 $hr^{-1}$. Ten samples were collected and analyzed.

Figure 20:
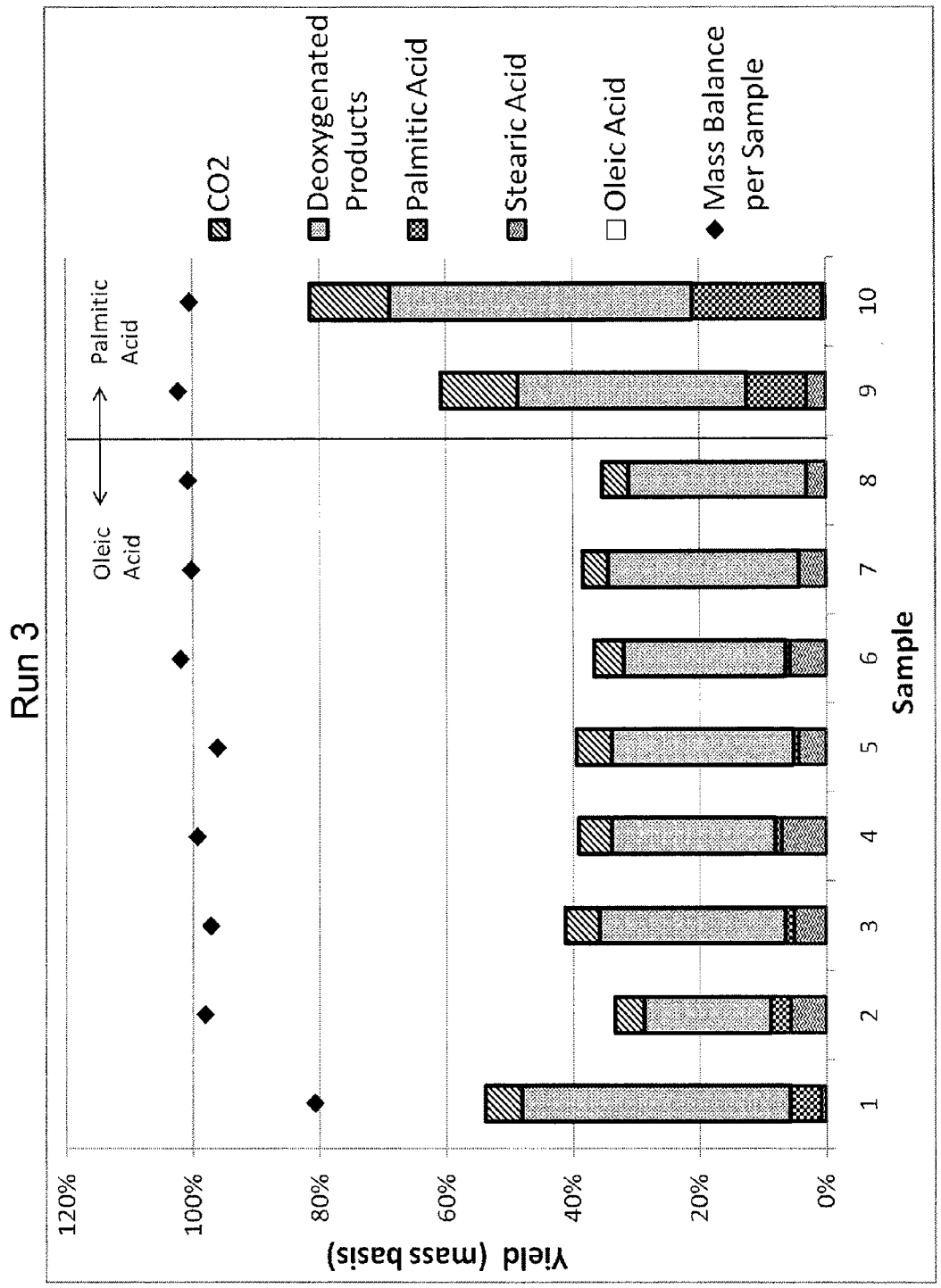
FIG. 20 is a bar graph illustrating products formed and mass balance recovered when oleic acid, followed by palmitic acid, was exposed to one embodiment of the disclosed catalysts under the conditions of Run 3 as described in the Examples.
Figure 21:
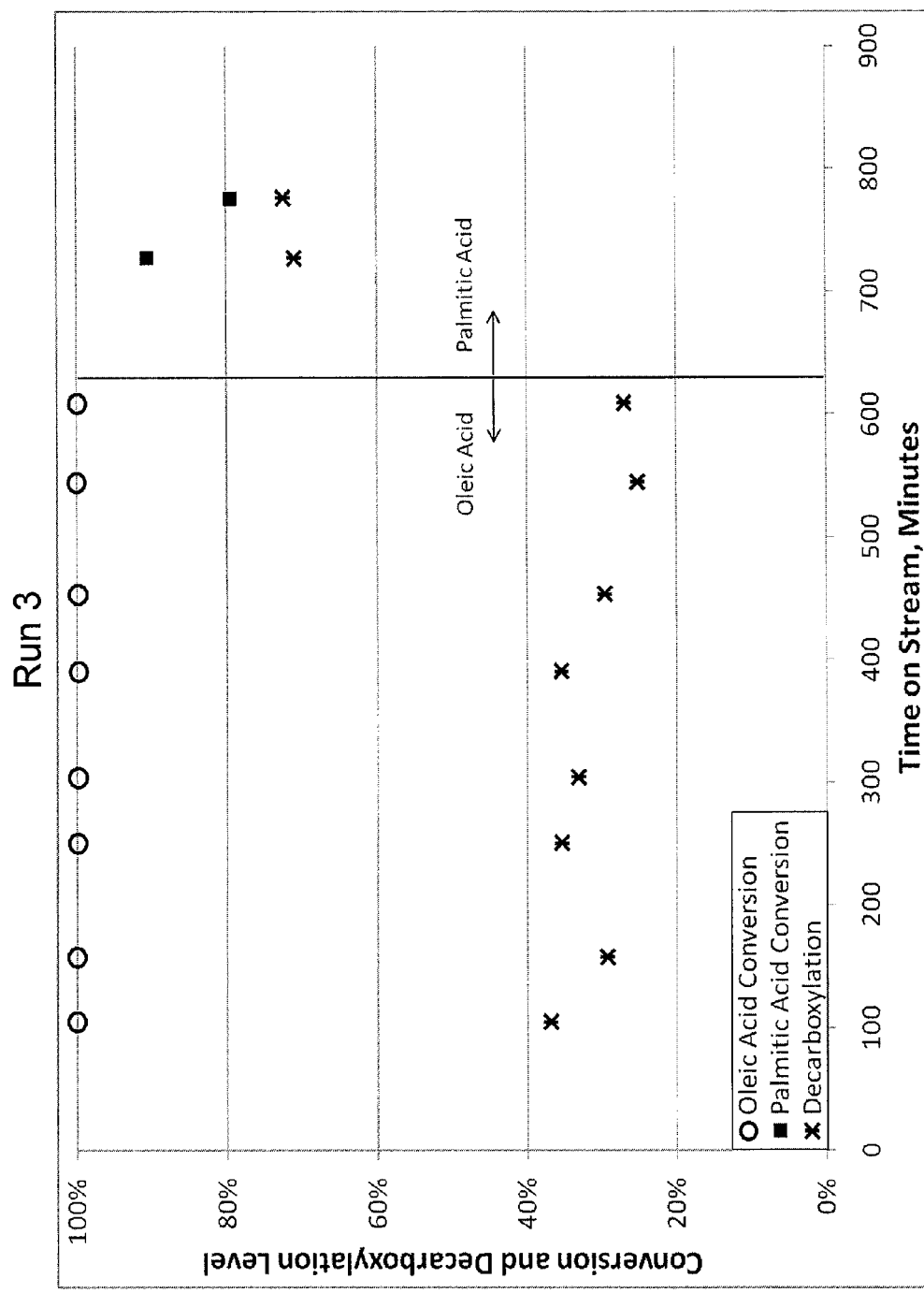
FIG. 21 is a graph of percent conversion and percent decarboxylation versus time-on-stream for Run 3.

The results of Run 3 are shown in FIGS. 20 and 21. With respect to FIG. 20, exposure of unsaturated oleic acid (18:1) to Catalyst 1 produced a mixture of products, including deoxygenated products (e.g., C17) and saturated stearic acid (18:0). The majority of the products were deoxygenated as expected. However, in addition to decarboxylation, Catalyst 1 has some dehydrogenation ability. Because oleic acid is hydrogen-deficient, any dehydrogenation of oleic acid molecules resulting from exposure to Catalyst 1 can result in hydrogenation of other oleic acid molecules, producing some stearic acid. Some residual palmitic acid also was seen in Samples 1-6.

It was observed that the products for Samples 1-8, including $CO_2$, totaled only 30-50% of the mass balance. Catalyst 1 is a somewhat acidic catalyst and can cause alkylation reactions as well as decarboxylation when unsaturated fatty acids are used. Thus, the catalyst alkylates a significant portion of the oleic acid molecules, forming heavier products, e.g., C36, C54, etc., which are too heavy for GC-FID analysis.

FIG. 21 shows that substantially 100% of the oleic acid was converted over a time period of 600 minutes TOS. However, decarboxylation was 20-40%, providing further indication that a significant percentage of the unsaturated oleic acid was alkylated by the catalyst instead, thereby undergoing dimerization or oligomerization. When the feed was switched to saturated palmitic acid, decarboxylation and percent conversion were again closely correlated.

Run 4:

Catalyst 1 was used for Run 4, with a palmitic acid feed. The column was operated at 295° C. with WHSV=0.37 $hr^{-1}$. The column was initially purged with 2.5 mL/min $N_2$, but the purge gas was switched to 3.5 mL/min 92% Ar/8% $H_2$ mix at the beginning of Sample 7 acquisition. Ten samples were collected with sample acquisition times of 50-85 minutes.

Figure 22:
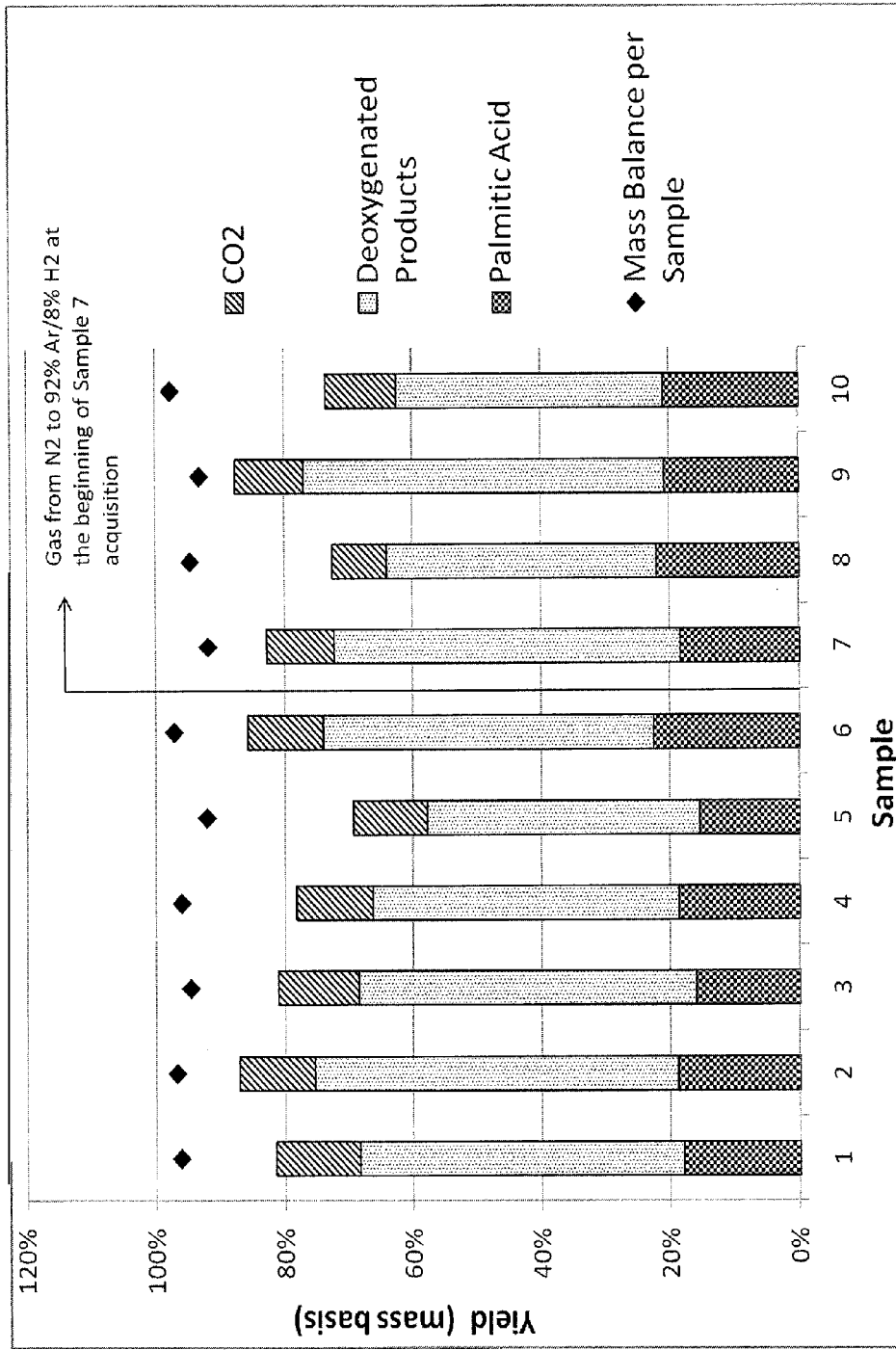
FIG. 22 is a bar graph illustrating products formed and mass balance recovered when palmitic acid was exposed to one embodiment of the disclosed catalysts under the conditions of Run 4 as described in the Examples.
Figure 23:
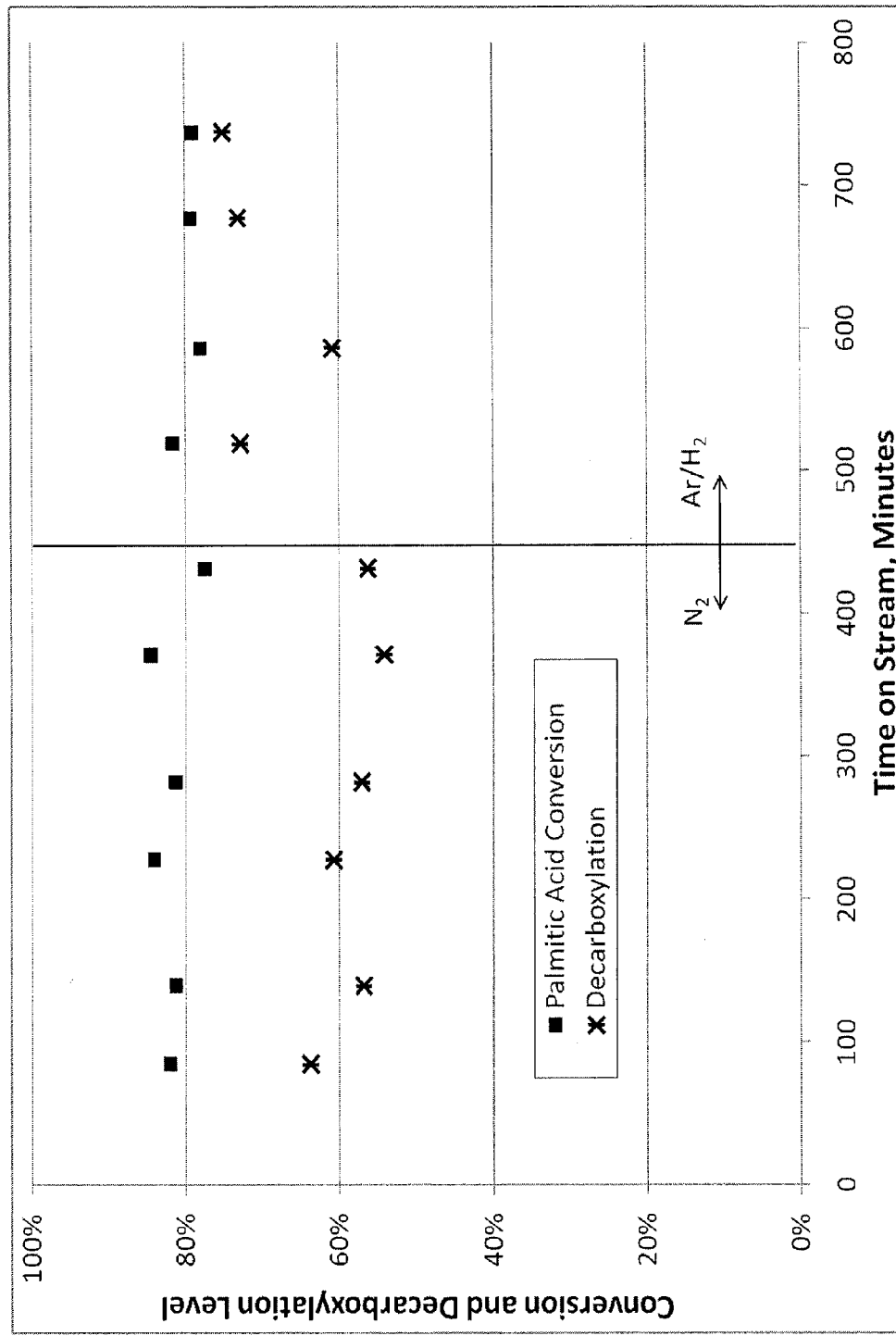
FIG. 23 is a graph of percent conversion and percent decarboxylation versus time-on-stream for Run 4.

The results of Run 4 are shown in FIGS. 22 and 23. FIG. 22 shows that palmitic acid conversion remained fairly steady at near 80% over the time period of 800 minutes TOS. FIG. 23 shows that conversion of palmitic acid remained consistent at approximately 80% for up to 800 minutes TOS. Decarboxylation remained close to 60%, but increased somewhat when the gas flow was switched to Ar/$H_2$.

Run 5:

Catalyst 1 was used for Run 5 with an oleic acid feed for the first 12 samples, and a palmitic acid feed for the last two samples. The column was operated at 295° C. with WHSV=0.36 $h^{-1}$ for oleic acid and 0.37 $hr^{-1}$ for palmitic acid. The column was purged with 3.5 mL/min of 92% Ar/8% $H_2$ for Samples 1-8, and 2.5 mL/min $N_2$ for Samples 9-14. Sample acquisition times were 50-85 minutes.

Figure 24:
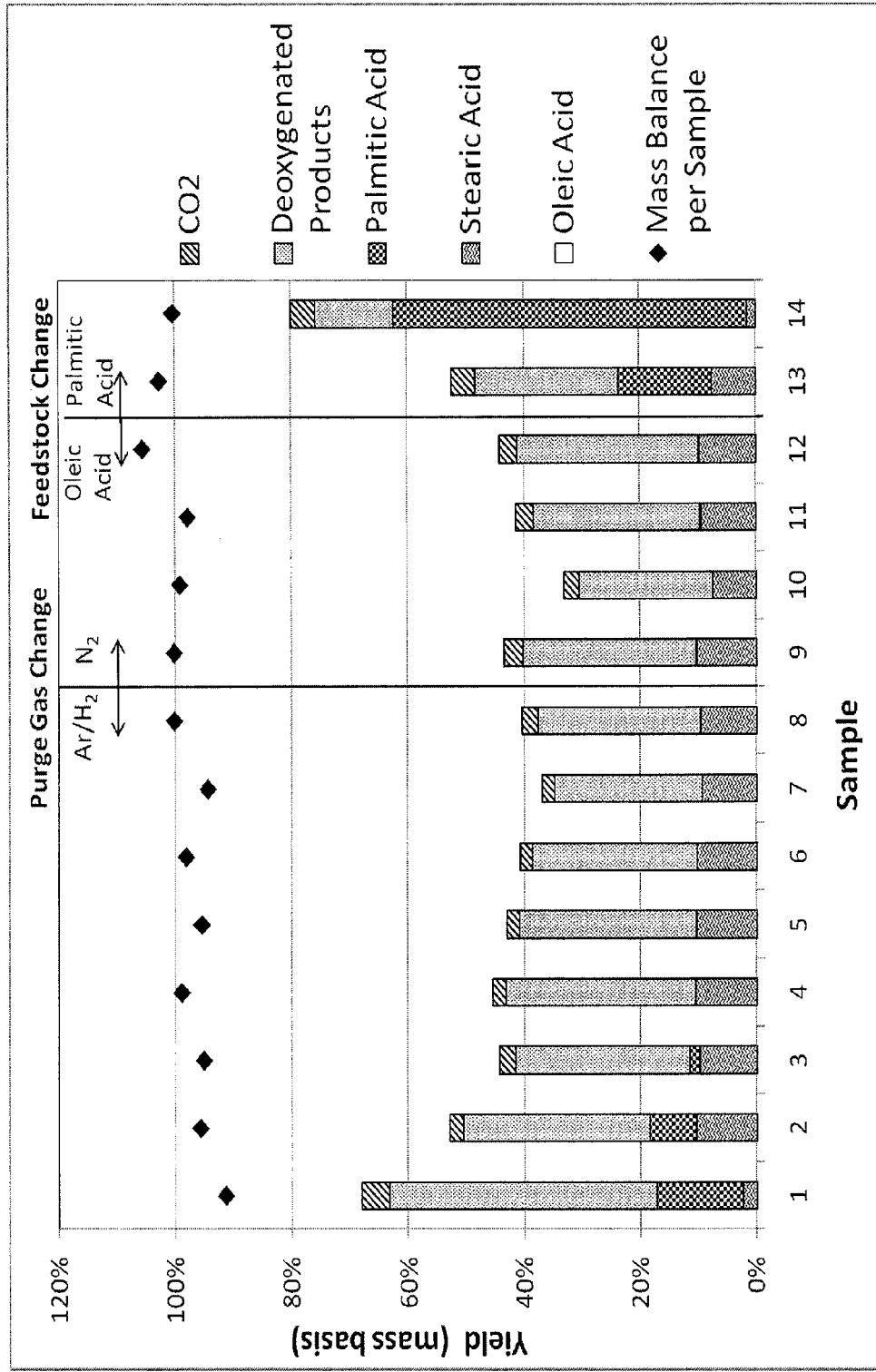
FIG. 24 is a bar graph illustrating products formed and mass balance recovered when oleic acid, followed by palmitic acid, was exposed to one embodiment of the disclosed catalysts under the conditions of Run 5 as described in the Examples.
Figure 25:
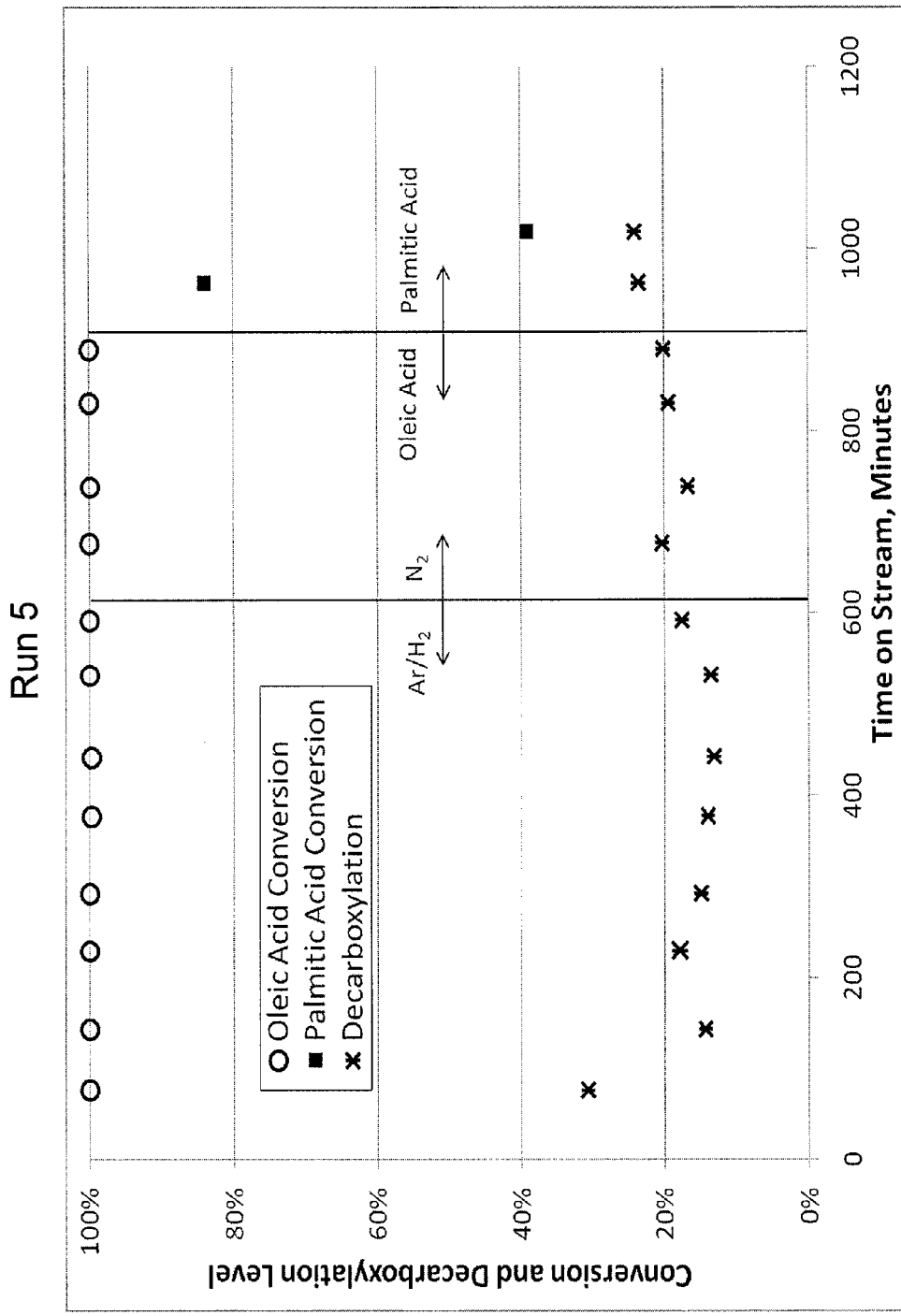
FIG. 25 is a graph of percent conversion and percent decarboxylation versus time-on-stream for Run 5.

The results of Run 5 are shown in FIGS. 24 and 25. Similar to Run 3, a significant percentage of oleic acid in Samples 1-12 was alkylated and is not reflected in the yields shown in FIG. 24. FIG. 24 also shows that there was little difference in the products produced when the purge gas was Ar/$H_2$ compared to when the purge gas was $N_2$. The palmitic acid seen in samples 1-3 is attributed to residual palmitic acid from an earlier run on the column. FIG. 25 demonstrates that about 10-20% of the oleic acid feed was decarboxylated with the yield remaining fairly steady for up to 900 minutes TOS, with about 30% decarboxylation in Sample 1.

Catalyst 2 Analysis:

Catalyst 2 was used for Run 6. An up-flow, 6 $cm^3$ column was packed with 12.63 g of Catalyst 2. The temperature was initially 290° C., and was increased incrementally to 350° C. The column was operated at WHSV=0.34 $hr^{-1}$ (0.9 mL/min.). The column was purged with 2.5 mL/min $N_2$ for Samples 1-8, with no purge for Samples 9-33. A feed stock of 50/50 (w/w) oleic acid and palmitic acid was used for Samples 1-26. The feedstock was changed to palmitic acid at the beginning of Sample 27 acquisition (after 287 hours time-on-stream). The column was run for a total of 367 hours time-on-stream, with samples collected typically every 9-15 hours.

Figure 26:
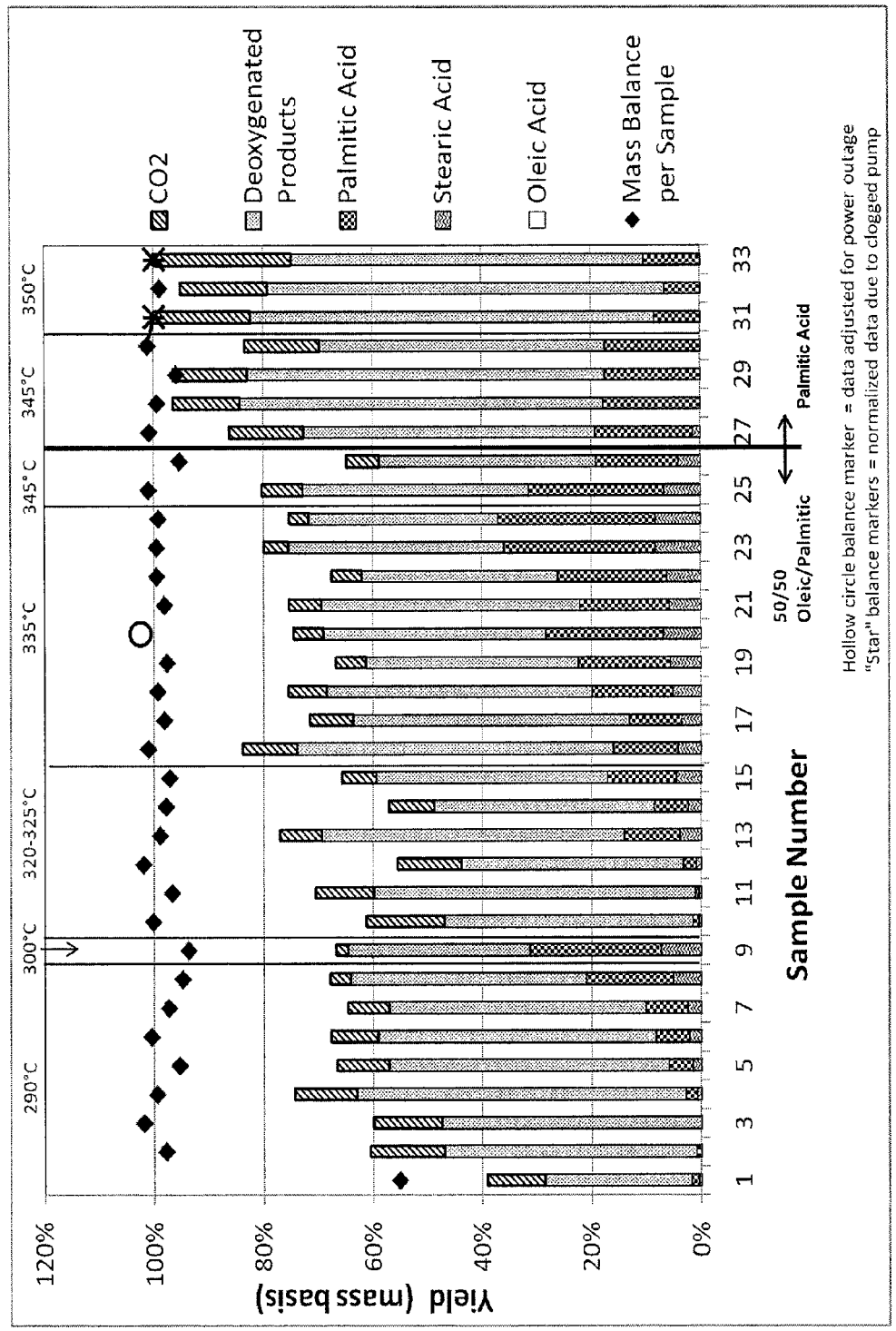
FIG. 26 is a bar graph illustrating products formed and mass balance recovered when a mixture of oleic acid and palmitic acid, followed by palmitic acid, was exposed to one embodiment of the disclosed catalysts under the conditions of Run 6 as described in the Examples.
Figure 27:
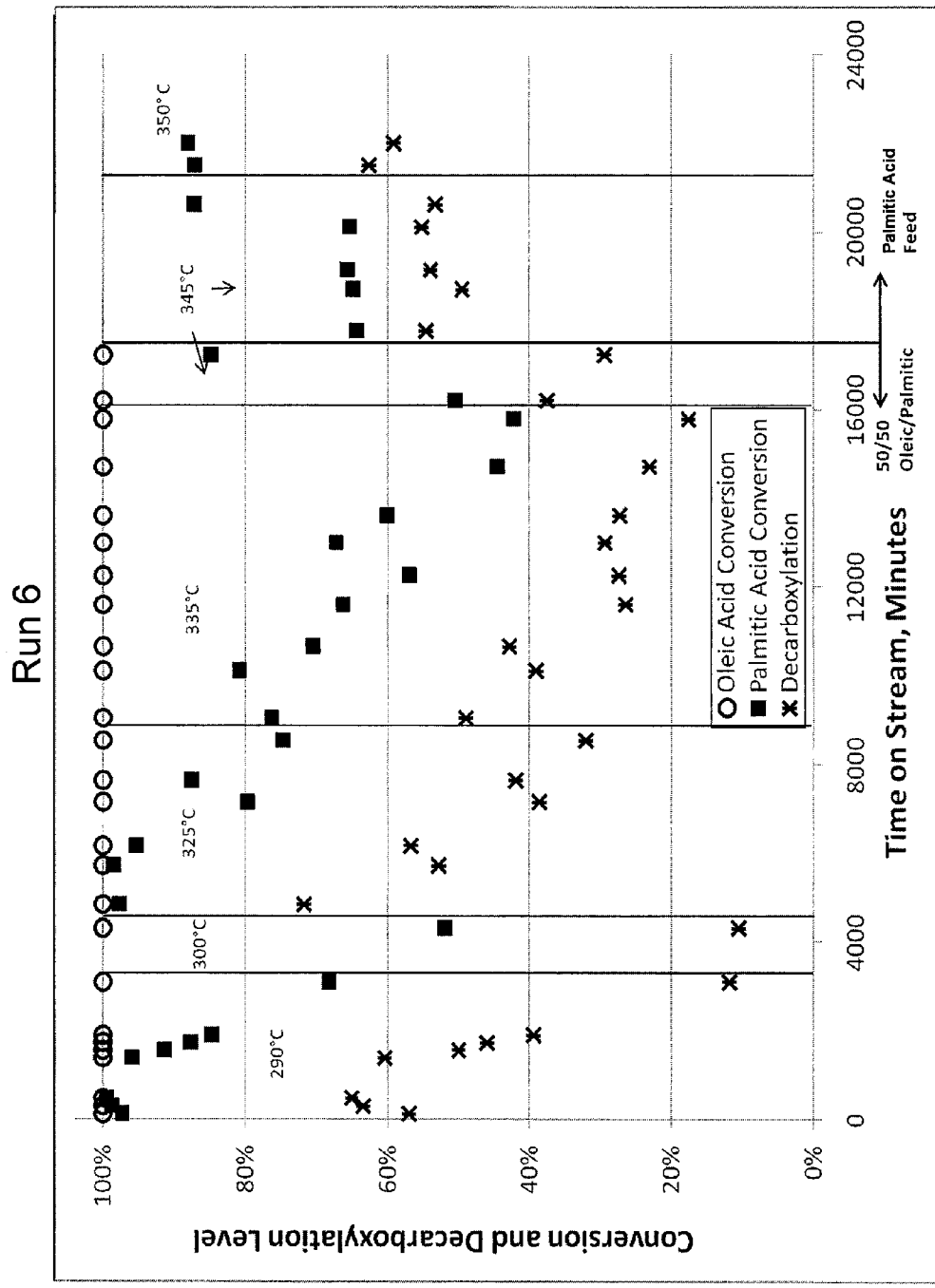
FIG. 27 is a graph of percent conversion of each fatty acid and overall percent decarboxylation versus time-on-stream for Run 6.

The results of Run 6 are shown in FIGS. 26-27. FIG. 26 illustrates the products formed when palmitic acid and oleic acid were exposed to the catalyst. FIG. 27 shows the percent conversion of each fatty acid and the overall percent decarboxylation as a function of time. Oleic acid was 100% converted over the course of about 17,000 minutes TOS. Consistent with earlier runs, however, the oleic acid was not completely decarboxylated and a significant percentage was alkylated to higher molecular weight products. Palmitic acid conversion was initially near 100% but decreased with time. Increasing the temperature initially increased palmitic acid conversion, but it again decreased with time. After the feed was switched from the oleic acid/palmitic acid mixture to palmitic acid, the percent palmitic acid conversion increased with time. The overall material balances were near 100%, but 30-40% of the products were unaccounted for in the GC-FID analysis; presumably these were heavy products that were not detectable by GC. When the feed was mixed, the stearic acid yield increased as catalyst decarboxylation activity decreased. After switching the feed to palmitic acid alone, the decarboxylation rate appeared steady at 345° C. The material balances and product yields were in good agreement, with nearly 100% of the products detected by GC-FID.

The gases produced by the reaction were quantified and are shown in Table 6. Gas concentrations remained consistent within each feedstock, while the total gas flow varied proportionally with the decarboxylation rate.

TABLE 6

| Gas Component | 50/50 Oleic/Palmitic Acid % (v/v) | Palmitic Acid % (v/v) |
| --- | --- | --- |
| Propane | 0.7 | 1.3 |
| Isobutane | Trace | Trace |
| N-butane | 0.4 | 0.7 |
| $H_2$ | 11.7 | 18.8 |
| $CO_2$ | 83.0 | 69.1 |
| Ethane | 0.9 | Trace |
| $CH_4$ | 1.5 | 1.1 |
| CO | 1.8 | 9.0 |

Catalyst 13 Analysis:

Catalyst 13 was evaluated for its ability to deoxygenate a stearic acid and palmitic acid mixture that was nominally 50/50 by weight in Run 7. An up-flow reactor with a nominal volume of 6 $cm^3$ was packed with 15.94 g of Catalyst 13. The temperature was monitored by a thermocouple placed at the outlet of the catalyst bed; the temperature reported is the reading at the exit of the reactor bed. The reactor was brought to an initial temperature of 280° C. The column was initially purged with 2.5 mL/min of $N_2$. The $N_2$ remained on at 2.5 mL/min for the duration of the experiment. The feed was started with a nominal WHSV of 0.36 $hr^{-1}$. Ten samples were collected with collection times ranging from 3 to 16 hr. The reactor temperature was then increased to 310° C. Samples 11 through 22 were then collected with collection times ranging from 8 to 16 hr. The reactor temperature was increased at the beginning of Sample 23 to 330° C. Sample 23 had an acquisition time of 3 hr. At the culmination of Sample 23, the feed was stopped and the reactor was offline for 214 hr. During the time that the reactor was offline, the catalyst bed was kept at 100° C. and the $N_2$ purge was flowing. After the 214 hr offline period, the reactor temperature was again increased to 330° C. and the time-on-stream count started again. Samples 24 through 32 were collected with collection times ranging from 8 to 17 hr. The reactor temperature was then increased to 340° C. Samples 33 through 35 were collected with collection times ranging from 9 to 15 hr. After collecting Sample 35, the WHSV was decreased to 0.31 $hr^{-1}$. Samples 36 to 39 were collected with collection times ranging from 9 to 15 hr.

Figure 28A:
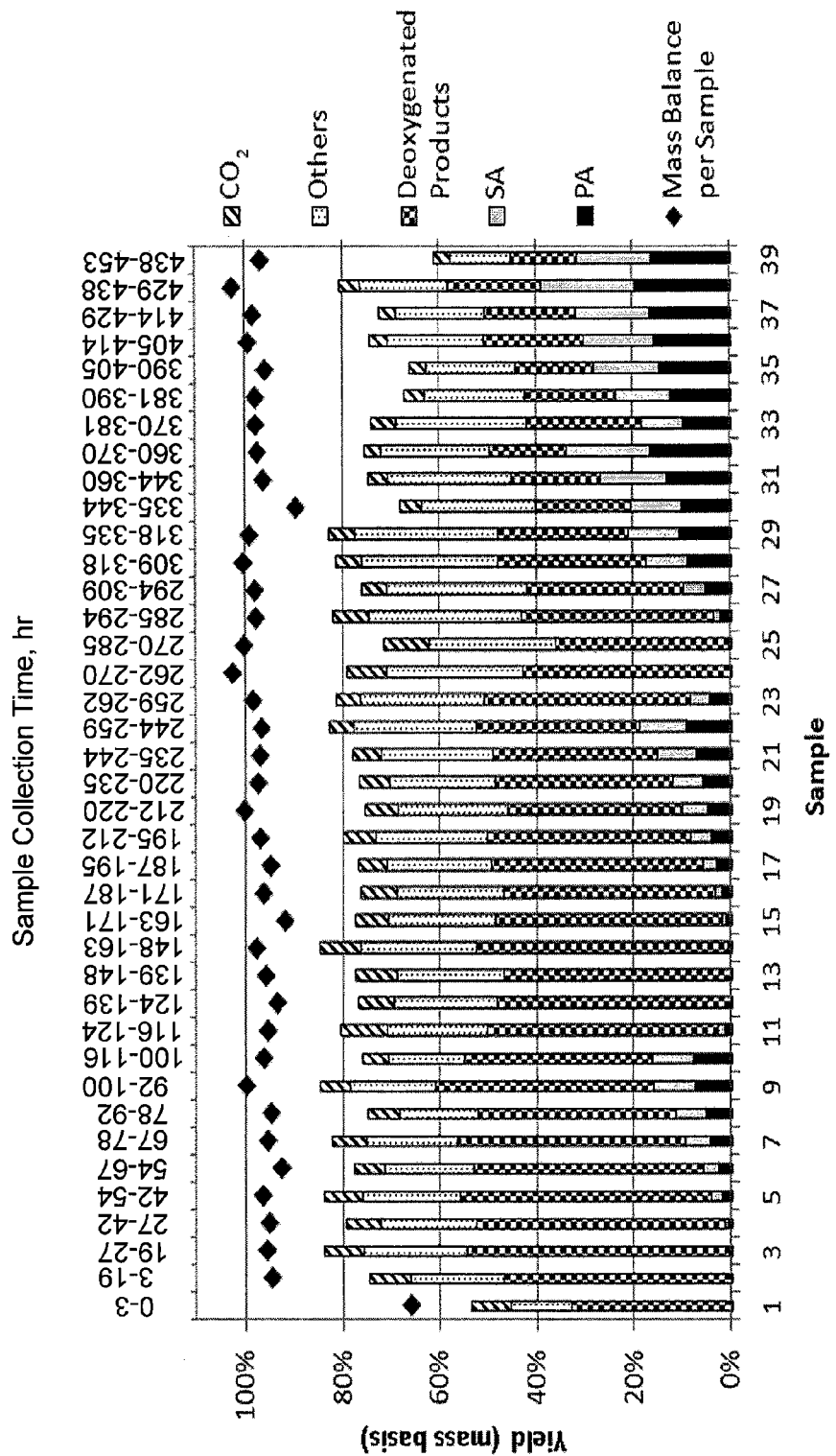
FIGS. 28a-b are a bar graph (FIG. 28a) illustrating products formed and mass balance recovered when a mixture of stearic acid (SA) and palmitic acid (PA) was exposed to one embodiment of the disclosed catalysts under the conditions of Run 7 (FIG. 28b) as described in the Examples.
Figure 28B:
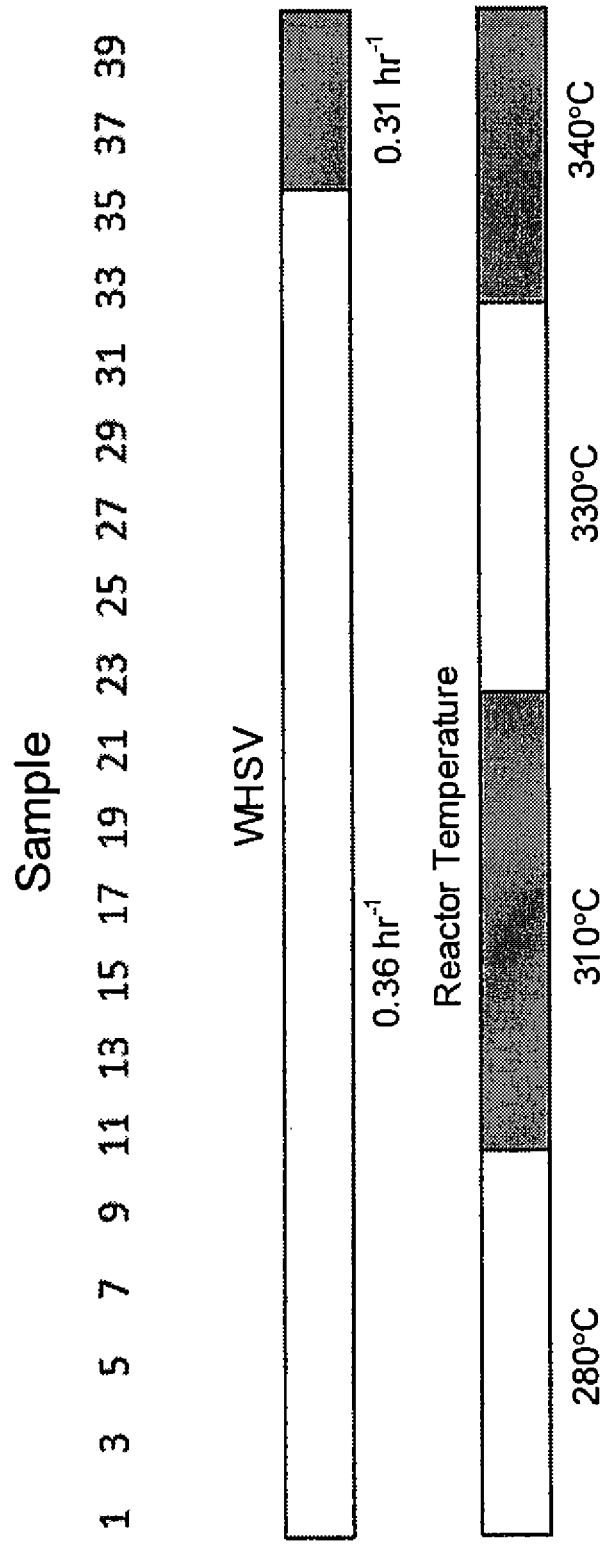
Figure 29:
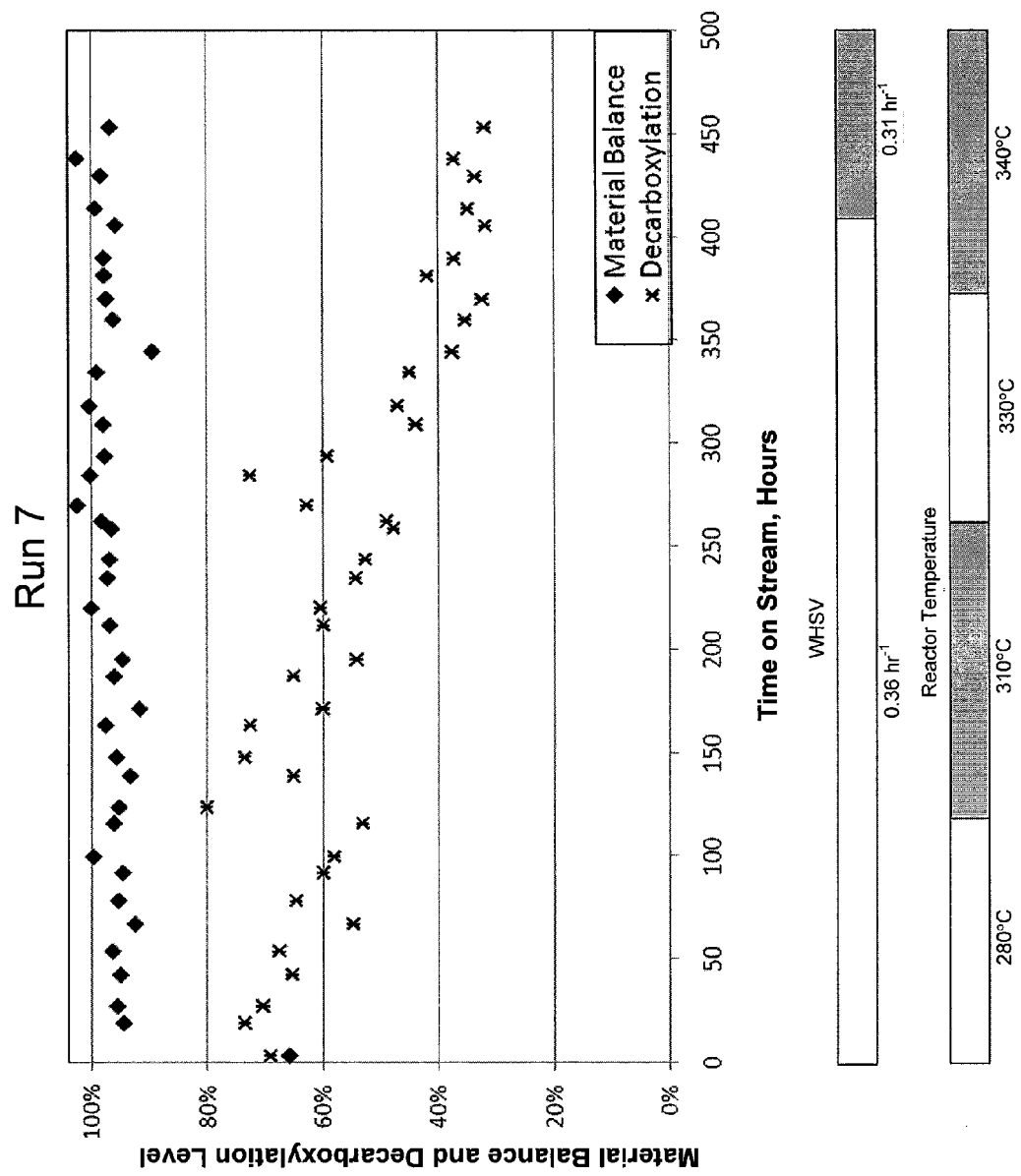
FIG. 29 is a graph of percent material balance recovered and overall percent decarboxylation versus time-on-stream for Run 7.

Liquid samples were analyzed using GC and a derivatization technique similar to the technique used in Example 1. Additionally, the gas effluent was also sampled and analyzed with GC. These results are illustrated in FIGS. 28a-b and 29 and Table 7. FIGS. 28a-b illustrate that at a given reactor temperature, the catalyst slowly deactivated such that palmitic acid and stearic acid eventually appeared in the liquid samples due to decreasing conversion. Raising the temperature of the reactor resulted in increased palmitic and stearic acid conversion as well as a greater yield of deoxygenated products (e.g. pentadecane and septadecane). FIG. 29 shows that raising the temperature resulted in higher decarboxylation rates to deoxygenated products. Table 6 shows the average gas composition of several samples at 330° C. and 340° C.

TABLE 7

Reactor Gas Effluent Concentrations, vol %[a]

| Feed | 50/50 Palmitic/Stearic | 50/50 Palmitic/Stearic |
|---|---|---|
| Temp, ° C. | 330 | 340 |
| $H_2$ | 29 | 36 |
| CO | 10 | 8 |
| $CO_2$ | 60 | 54 |
| Light Alkanes | 1 | 3 |

[a]$N_2$ concentration present from the carrier gas has been omitted and the results normalized.

Example 3

Platinum/Carbon Catalysts

Catalyst Synthesis:
Catalyst 1 (5 wt % Pt and 0.5 wt % Sn on C):
A catalyst was prepared with 5 wt % Pt and 0.5 wt % Sn on an engineered carbon support (Hyperion Catalysis International, Inc., Cambridge, Mass.). The Pt and Sn were impregnated simultaneously. First, the calculated amount of $SnCl_2.2H_2O$ to give the desired percentage of tin (0.5 wt %) on the catalyst was dissolved in a sufficient amount of HCl to prevent precipitation. The concentration of HCl is not critical, but is sufficient to solubilize the $SnCl_2.2H_2O$. To this solution, the calculated amount of chloroplatinic acid was added to give the desired percentage of platinum (5 wt %) on the catalyst. The solution was then diluted with an appropriate amount of deionized water such that the solution volume would cause the support to reach incipient wetness upon impregnation. The solution was then added to the support. The catalyst was then dried in an oven set to 120° C. Next, the catalyst was heated to 300° C. at 5° C./min in flowing nitrogen for batch testing or helium for flow testing. When 300° C. was reached, the gas flow was changed to 100% hydrogen for batch testing or a mixture of 8% $H_2$ in He for flow testing. The temperature ramp was continued to 500° C. and then held at 500° C. for 2-3 hr. The catalyst was then cooled to room temperature under flowing hydrogen or 8% $H_2$/He gas mixture. When the catalyst was returned to room temperature, the catalyst was passivated with 2 vol % air in He. Immediately prior to usage, the catalyst was activated by reduction in a flowing stream of pure hydrogen for 2 hours for batch testing or 8% $H_2$ in Ar overnight for flow testing at 150° C.

Catalyst 2 (5 wt % Pt and 0.5 wt % Ge on C):
A catalyst was prepared with 5 wt % Pt and 0.5 wt % Ge on an engineered carbon support (Norit ROX 0.8, Norit Americas Inc., Marshall, Tex.). The Pt and Ge were impregnated simultaneously. First, the calculated amount of $GeCl_4$ to give 0.5 wt % Ge on the catalyst was dissolved in a sufficient concentration of HCl to prevent precipitation. To this solution, chloroplatinic acid was added to give 5 wt % platinum on the catalyst. The solution was then diluted with an appropriate amount of concentrated HCl such that the solution volume would cause the support to reach incipient wetness upon impregnation. The solution was then added to the support and then dried at 120° C. in air. The catalyst was calcined, reduced, and activated before use or testing as described above for batch testing.

Catalyst 3 (5 wt % Pt on C):
A catalyst was prepared with 5 wt % Pt on an engineered Norit ROX 0.8 carbon support. Platinum ethanolamine (Pt-A) was used as the catalyst precursor. The Pt-A solution volume calculated to result in 5 wt % Pt on the catalyst was diluted with deionized water such that the solution would cause the carbon support to reach incipient wetness upon adding all of the impregnation solution. The catalyst was then dried at room temperature for 15 minutes, followed by hot air drying for 15 minutes, and finally dried at 120° C. overnight. The catalyst was calcined, reduced, and then activated before use or testing as earlier described for batch testing.

Catalyst 4 (5 wt % Pt and 0.5 wt % Ge on C):
A 5% Pt/0.5% Ge catalyst was prepared using a previously prepared 5% Pt on an engineered Hyperion carbon support. A solution of $GeCl_4$ in an amount sufficient to give 0.5 wt % Ge on the catalyst was prepared in anhydrous ethanol of sufficient volume to reach incipient wetness of the catalyst support. The ethanolic $GeCl_4$ solution was added to the catalyst until the incipient wetness point of the catalyst was reached. The catalyst was then dried in an oven set to 120° C. A sample of the dried catalyst was calcined and reduced as previously described for batch testing. Prior to use the catalyst was activated as described for batch testing.

Catalyst 5 (5 wt % Pt and 0.5 wt % Sn on C):
A 5% Pt/0.5% Sn catalyst was prepared using a previously prepared 5% Pt on an engineered Hyperion carbon support. A solution of $SnCl_2.2H_2O$ in an amount sufficient to give 0.5 wt % Sn on the catalyst was prepared with a sufficient amount of 6M HCl to prevent precipitation. The impregnation solution was then diluted with HCl (2-6M) to a volume such that upon addition of the solution the incipient wetness point of the catalyst was reached. The catalyst was then dried at in an oven set to 120° C. A sample of the catalyst was calcined and reduced under the same conditions as described for the batch testing. Prior to use the catalyst was activated as previously described for batch testing.

Catalyst Analysis:

Catalyst 1 was evaluated for its ability to decarboxylate oleic acid as well as a linoleic acid/oleic acid mixture in Run 8. An up-flow reactor with a nominal volume of 6 cm$^3$ was packed with 2.90 g of Catalyst 1. For this experiment, the temperature was monitored by a thermocouple placed into the aluminum block encompassing the reactor tube. Additionally, the temperature of an aluminum block encompassing the feed pre-heater was also monitored. The pre-heater block and reactor block were brought to an initial temperature of 260° C. and 328° C., respectively. The column was purged with 2.5 mL/min of $N_2$ before beginning the oleic acid feed. The $N_2$ remained on at 2.5 mL/min for the duration of the experiment. The initial WHSV was 2.0 hr$^{-1}$. Samples 1 and 2 were then taken, each with a collection time of 3 hr. The WHSV was then decreased to 1.7 hr$^{-1}$. Sample 3 was drawn after a collection time of 12 hr. Next, the pre-heater block temperature was decreased to 54° C. and the reactor block temperature was increased to 352° C. Samples 4-7 were subsequently collected with collection times ranging from 4 to 17 hrs. After Sample 7 was collected, the WHSV was decreased to 1.4 hr$^{-1}$. Samples 8-10 were then collected with collection times ranging from 6 to 17 hr. After Sample 10 was collected, the reactor block temperature was increased to 372° C. Samples 11-19 were then collected, with collection times ranging from 5 to 15 hr. The pre-heater block temperature was then increased from 62° C. to 75° C. Sample 20 was collected after 8 hr. The WHSV was then decreased to 1.0 hr$^{-1}$. Sample 21 was collected after 19 hr. The pre-heater block temperature was then increased to 75° C. Sample 22 was drawn after 26 hr. The pre-heater block temperature was then decreased to 70° C. Samples 23 through 31 were drawn with collection times ranging from 22 to 26 hr. At the beginning of the collection of Sample 32, linoleic acid was added to the oleic acid feed such that the nominal composition of the feed was 50/50 by weight. Sample 32 was then collected after 24 hr. Samples 1-32 were analyzed via GC with a derivatization method similar to that in Example 1. Additionally, the gas phase effluent from the reactor was analyzed with GC.

Figure 30A:
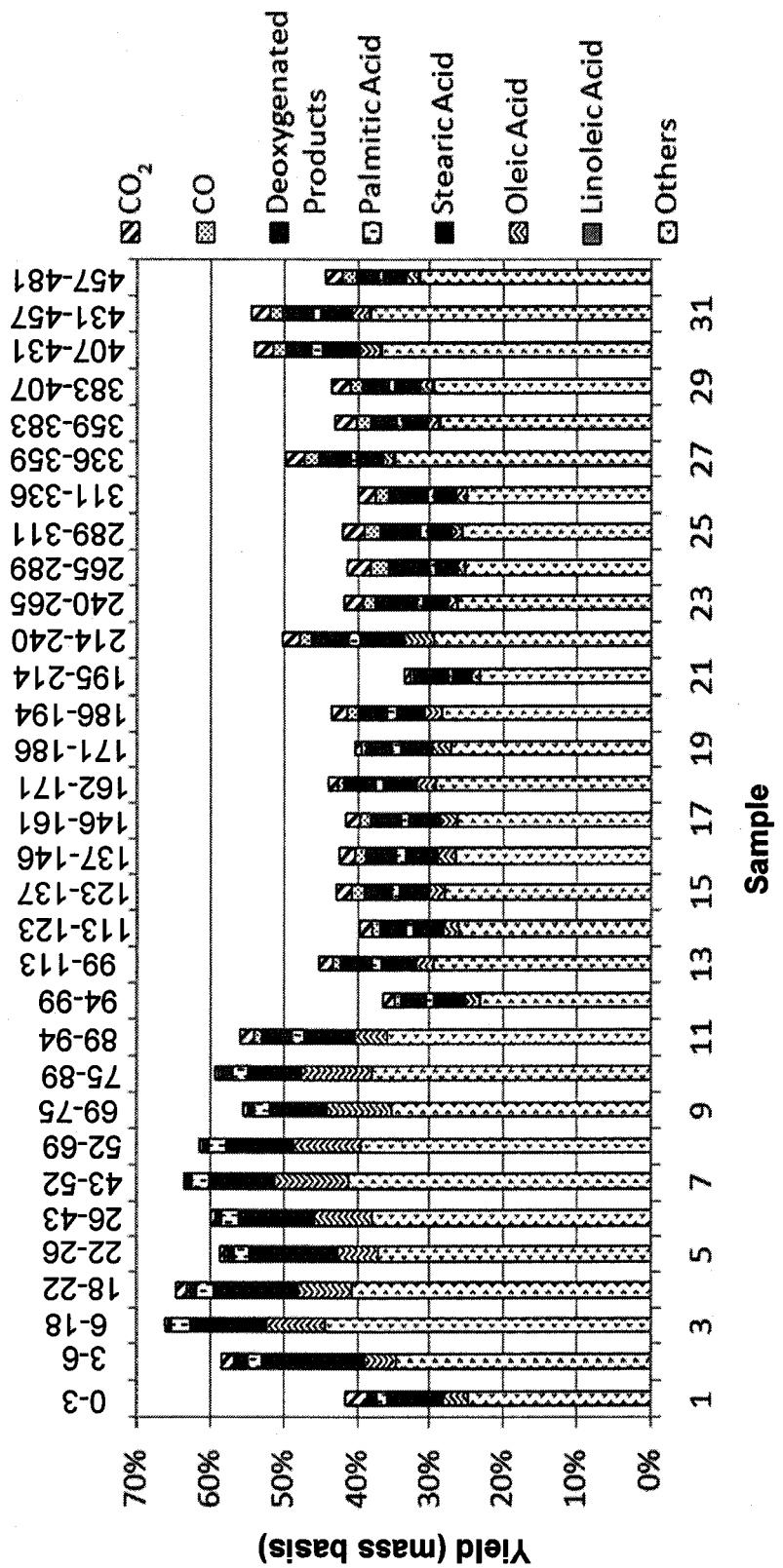
FIGS. 30a-b are a bar graph (FIG. 30a) illustrating products formed and mass balance recovered when oleic acid followed by a mixture of linoleic acid and oleic acid was exposed to one embodiment of the disclosed catalysts under the conditions of Run 8 (FIG. 30b) as described in the Examples.
Figure 30B:
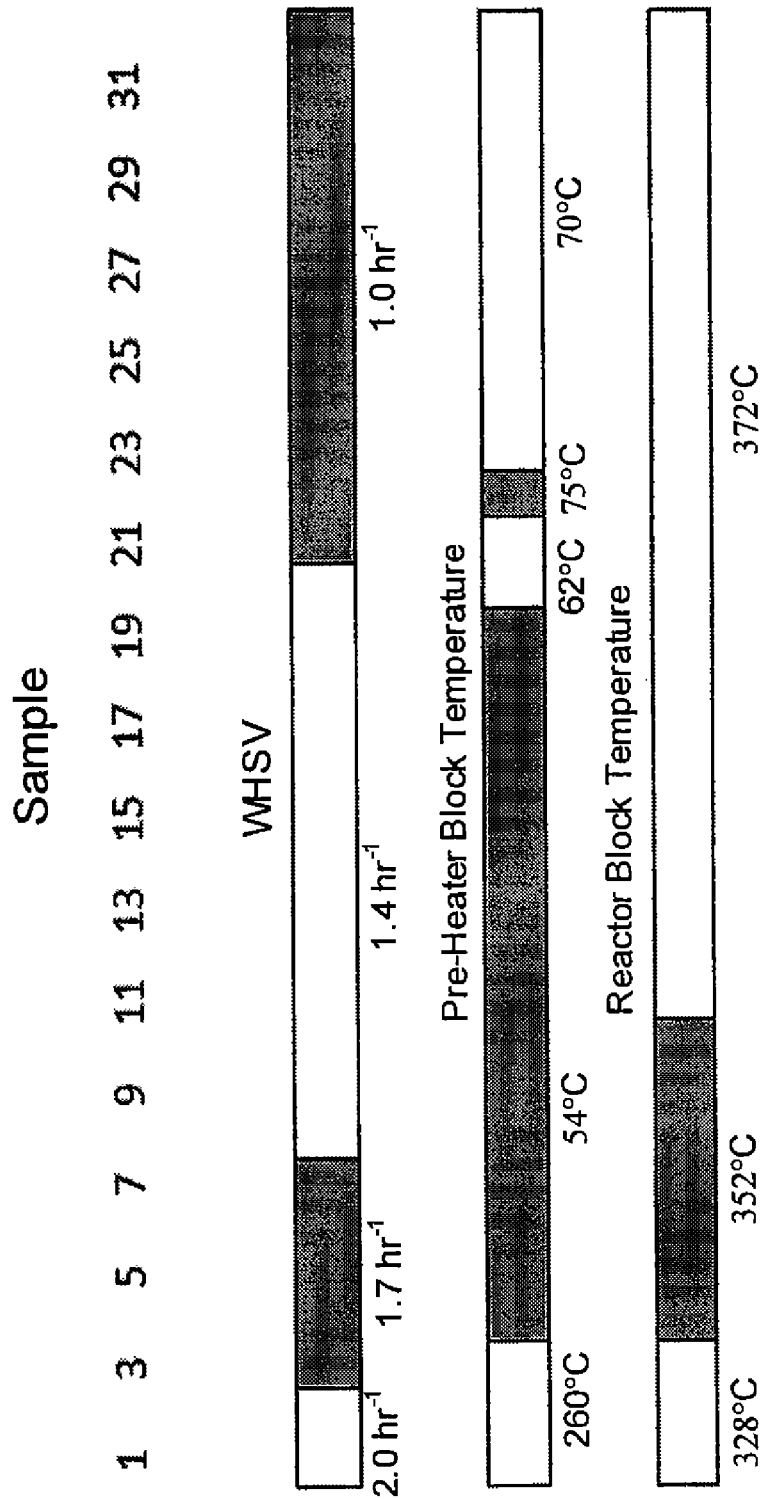
Figure 31:
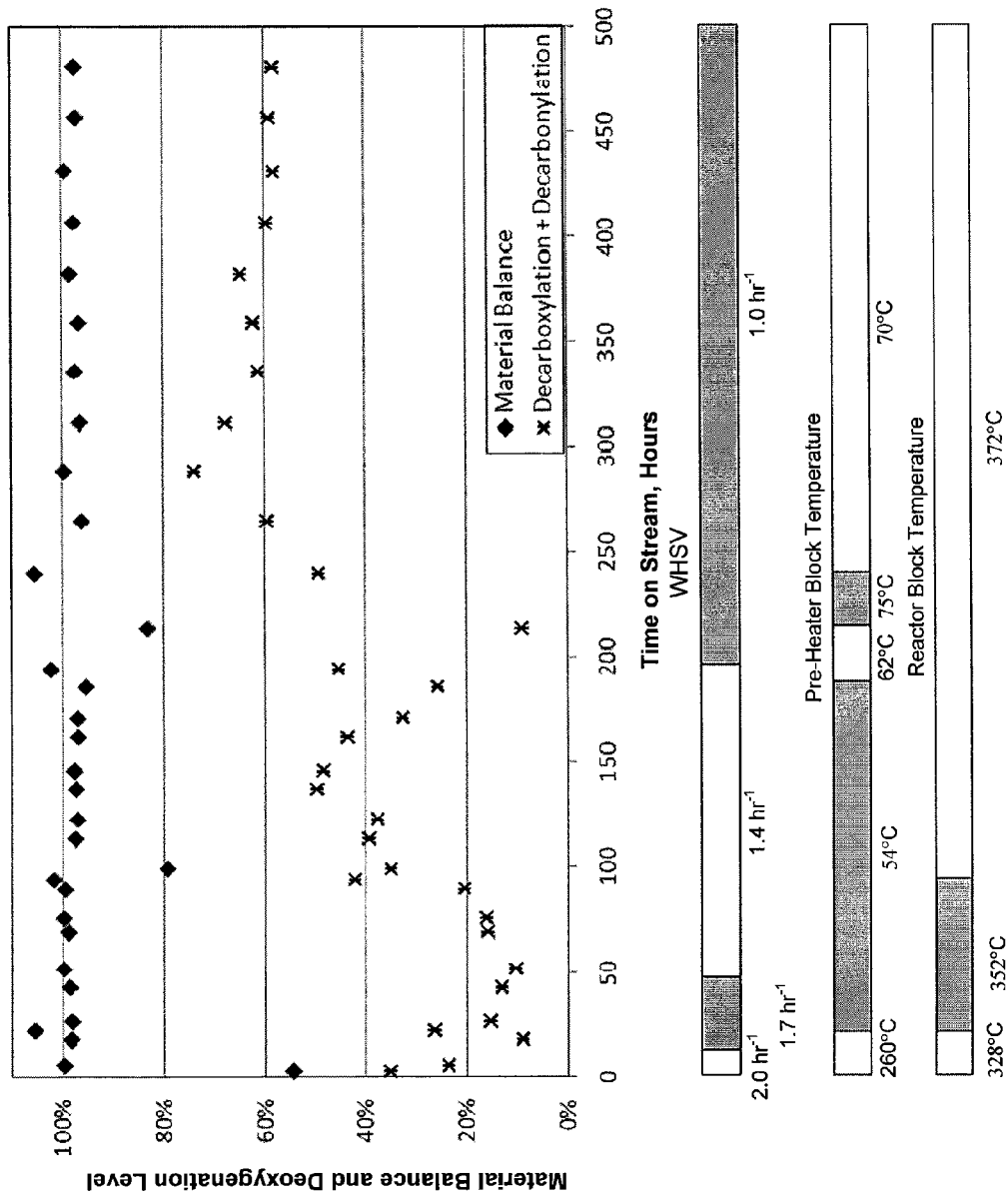
FIG. 31 is a graph of percent material balance recovered and overall combined percent decarboxylation and decarbonylation versus time-on-stream for Run 8.

The results of Run 8 are presented in FIGS. 30 and 31 as well as Table 8. As shown in FIGS. 30*a-b*, a large yield of "Others" was observed in the liquid products. The "Others" category includes, but is not limited to, cracking products, aromatics and branched products of the oleic acid feed. FIGS. 30*a-b* also show that decreasing the WHSV and pre-heater block temperature and increasing the reactor block temperature resulted in a higher yield of deoxygenated products as well as greater conversion of oleic acid. The results for Sample 32 in FIG. 30*a* reveal that all of the linoleic acid fed was converted. FIG. 31 gives the combined level of decarboxylation and decarbonylation since CO and $CO_2$ were observed as major gaseous products. FIG. 31 reveals that the combined level of decarboxylation and decarbonylation remained reasonably steady between approximately 300 and 500 hr time-on-stream. Table 7 reveals the average gas composition of Samples 26-31.

TABLE 8

| Reactor Gas Effluent Concentrations, vol % | | |
|---|---|---|
| Feed | Oleic Acid | 50/50 Oleic Acid/Linoleic Acid |
| Sample Number | 26-31* | 32 |
| $H_2$ | 14 | 13 |
| CO | 22 | 22 |
| $CO_2$ | 20 | 19 |
| $N_2$ | 42 | 42 |
| Light Alkanes | 2 | 4 |

*The average concentrations of the samples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A mixture comprising:
   a composition suitable for use as a renewable fuel, comprising
      hydrocarbons in a liquid state, and
      at least 1 part per million (ppm) Pt, W, Mo, and/or Zr.

2. The mixture of claim 1, comprising a) at least 1 ppm Pt, b) at least 1 ppm Zr, and c) at least 1 ppm W, Mo, or a combination of W and Mo.

3. The mixture of claim 1, comprising a) at least 1 ppm Pt, b) at least 10 ppm Zr, and/or c) at least 10 ppm W, Mo, or a combination of W and Mo.

4. The mixture of claim 1, comprising a) at least 1 ppm Pt, b) at least 50 ppm Zr, and/or c) at least 10 ppm W, Mo, or a combination of W and Mo.

5. The mixture of claim 1, comprising at least 1 ppm Pt, at least 1 ppm Zr, and at least 1 ppm W.

6. The mixture of claim 1, comprising at least 1 ppm Pt, at least 1 ppm Zr, and at least 1 ppm Mo.

7. The mixture of claim 1, comprising at least 1 ppm Pt, at least 1 ppm Zr, and at least 1 ppm of a combination of W and Mo.

8. The mixture of claim 1 wherein greater than 70% of the hydrocarbons are C15-C17 hydrocarbons.

9. The mixture of claim 1 wherein greater than 80% of the hydrocarbons are C15-C17 hydrocarbons.

10. The mixture of claim 1 wherein greater than 90% of the hydrocarbons are C15-C17 hydrocarbons.

11. The mixture of claim 1 wherein the composition is suitable for use as a renewable diesel fuel.

12. The mixture of claim 1 wherein the composition is substantially oxygen-free.

13. The mixture of claim 1 wherein the hydrocarbons comprise mono-methyl branched hydrocarbons.

14. The mixture of claim 1 wherein the hydrocarbons comprise branched, cyclic, and/or aromatic hydrocarbons.

15. A mixture comprising:
   a substantially oxygen-free composition suitable for use as a renewable diesel fuel, comprising
      hydrocarbons in a liquid state, wherein greater than 70% of the hydrocarbons are C15-C17 hydrocarbons,
      at least 1 ppm Pt,
      at least 1 ppm Zr, and
      at least 1 ppm W, Mo, or a combination of W and Mo.

16. The mixture of claim 15 wherein the hydrocarbons comprise branched, cyclic, and/or aromatic hydrocarbons.

* * * * *